(12) United States Patent
Hockey et al.

(10) Patent No.: US 11,120,158 B2
(45) Date of Patent: Sep. 14, 2021

(54) SECURE PERMISSIONING OF ACCESS TO USER ACCOUNTS, INCLUDING SECURE DISTRIBUTION OF AGGREGATED USER ACCOUNT DATA

(71) Applicant: Plaid Inc., San Francisco, CA (US)

(72) Inventors: William Hockey, San Francisco, CA (US); Joy Zheng, San Francisco, CA (US); Baker Shogry, San Francisco, CA (US); Michael Kelly, San Francisco, CA (US)

(73) Assignee: Plaid Inc.

( * ) Notice: Subject to any disclaimer, the term of this patent is extended or adjusted under 35 U.S.C. 154(b) by 39 days.

(21) Appl. No.: 16/384,810

(22) Filed: Apr. 15, 2019

(65) Prior Publication Data

US 2019/0318122 A1    Oct. 17, 2019

Related U.S. Application Data

(60) Provisional application No. 62/657,377, filed on Apr. 13, 2018.

(51) Int. Cl.
*H04L 29/06* (2006.01)
*G06F 21/62* (2013.01)
*G06Q 40/00* (2012.01)
*G06Q 20/32* (2012.01)

(52) U.S. Cl.
CPC ..... *G06F 21/6245* (2013.01); *G06Q 20/3221* (2013.01); *G06Q 40/12* (2013.12); *H04L 63/0853* (2013.01); *H04L 63/102* (2013.01)

(58) Field of Classification Search
CPC .......... G06F 21/6245; G06Q 40/12; G06Q 20/3221; H04L 63/0853; H04L 63/102
See application file for complete search history.

(56) References Cited

U.S. PATENT DOCUMENTS

| | | | |
|---|---|---|---|
| 2008/0195534 A1* | 8/2008 | Landis | G06Q 20/10 705/39 |
| 2009/0254476 A1* | 10/2009 | Sharma | G06Q 20/3224 705/39 |
| 2012/0030125 A1* | 2/2012 | RamaKrishnanNair | G07C 1/12 705/319 |
| 2012/0150742 A1 | 6/2012 | Poon et al. | |

(Continued)

*Primary Examiner* — Ghodrat Jamshidi
(74) *Attorney, Agent, or Firm* — Alpine Patents LLC; Brian Van Osdol

(57) ABSTRACT

A system and method for secure permissioning of access to user accounts, including secure distribution of aggregated user account data can include generating a financial report based on account information associated with one or more user accounts; receiving a financial report request for the financial report of the user account, wherein the financial report request is identified as being received from a third-party system; generating an audit report token associated with the financial report; sharing the audit token with the first third-party system in response to the financial report request; and providing the first third-party system account access to the financial report through the report token, where the audit report token can be shared with a second third-party system and provided by the second third-party system in order to confirm authorization to the report and integrity of the report.

21 Claims, 50 Drawing Sheets

(56) References Cited

U.S. PATENT DOCUMENTS

| | | | |
|---|---|---|---|
| 2014/0081667 A1* | 3/2014 | Joao | G16H 40/63 |
| | | | 705/3 |
| 2014/0330732 A1* | 11/2014 | Grignon | G06Q 50/01 |
| | | | 705/319 |
| 2015/0066805 A1* | 3/2015 | Candee | G06Q 30/0282 |
| | | | 705/347 |
| 2015/0249660 A1 | 9/2015 | Bailey et al. | |
| 2015/0317613 A1* | 11/2015 | Clark | G06Q 20/4014 |
| | | | 705/44 |
| 2016/0350747 A1* | 12/2016 | Pruthi | H04L 63/061 |
| 2017/0041963 A1* | 2/2017 | Edge | H04W 12/08 |
| 2017/0068954 A1* | 3/2017 | Hockey | H04L 9/3213 |
| 2018/0005316 A1 | 1/2018 | Robbin et al. | |
| 2018/0039988 A1 | 2/2018 | Gupta | |
| 2018/0064609 A1* | 3/2018 | Hines | A61J 7/0445 |
| 2018/0095997 A1* | 4/2018 | Beveridge | H04L 67/10 |
| 2019/0012647 A1 | 1/2019 | Bouey et al. | |
| 2020/0211002 A1* | 7/2020 | Steinberg | H04L 9/3213 |

* cited by examiner

NEW USER WITH STATE SUBMIT

```
curl -X POST https://bankAPI.example/auth \
  -d client_id={CLIENT_ID} \
  -d secret={SECRET} \
  -d credentials='{
    "username":"plaid_test",
    "password":"plaid_good",
    "state":"tx"}' \
  -d type={TYPE}
```

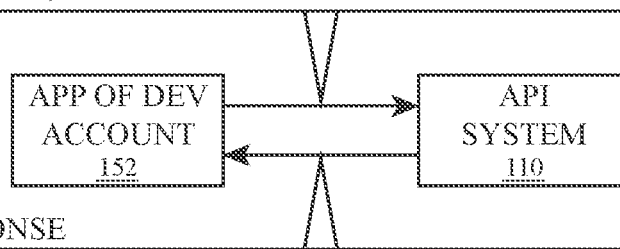

AUTH RESPONSE

```
http code 200
{"accounts": [{
    "_id": "52db1be4be13cbXXXXXXXXXX",
    "_item": "52af631671c3bdXXXXXXXXXX",
    "_user": "52af630f71c3bdXXXXXXXXXX",
    "balance": {
      "available": 1400,
      "current": 1230
    },
    "meta": {
      "name": "My Savings",
      "number": "31015"
    },
    "numbers": {
      "routing": "0000000",
      "account": "1111111",
      "wireRouting": "2222222"
    },
    "institution_type": "chase",
    "type": "depository",
    "status": "normal",
},
...], "access_token": "xxxxx"}
```

*FIG. 7*

NEW USER WITH STATE SUBMIT

```
curl -X POST https://bankAPI.example.com/transaction \
  -d client_id={CLIENT_ID} \
  -d secret={SECRET} \
  --d transaction='{
    "withdrawal_account_token":"jasdlkfjio34i29",
    "deposit_account_token":"Bjsklaidf9djanjk",
    "amount":"515.15"}' \
  -d type={TYPE}
```

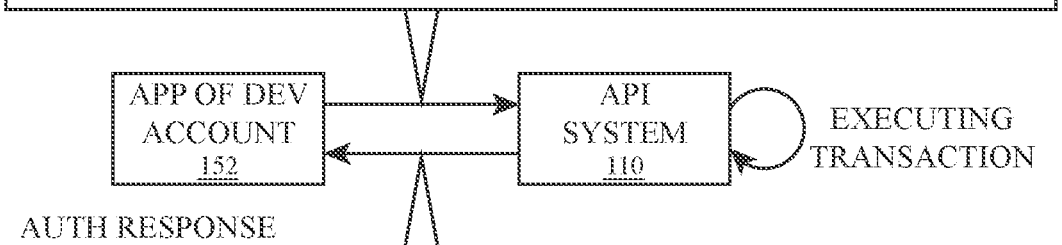

AUTH RESPONSE

```
http code 200
{"transaction": [{
    "_id": "52db1be4be13cbXXXXXXXXXX",
    "status": "processing"
  },
  ...], "transaction_access_token": "xxxxx"}
```

*FIG. 8*

Create Report Request - Call to '/asset_report/create'

```
var client = new dataPlaform.Client(
  'DATAPLATFORM_CLIENT_ID',
  'DATAPLATFORM_SECRET',
  'DATAPLATFORM_PUBLIC_KEY',
);

...

const daysRequested = 60;
const options = {
  client_report_id: '123',
  webhook: 'https://www.example.com',
  user: {
    client_user_id: '789',
    first_name: 'Jane',
    middle_name: 'Leah',
    last_name: 'Doe',
    ssn: '123-45-6789',
    phone_number: '(555) 123-4567',
    email: 'jane.doe@example.com',
  },};

// ACCESS_TOKENS is an array of Item access tokens.
// Note that the assets product must be enabled for all Items.
// All fields on the options object are optional.
client.createAssetReport(ACCESS_TOKENS, daysRequested, options,
  (error, createResponse) => {
  if (error != null) {
    // Handle error. } const assetReportId = createResponse.asset_report_id;
  const assetReportToken = createResponse.asset_report_token;
});
```

Create Report Request Response

```
http code 200
{
   "asset_report_token": "assets-6f12f-22dd-4855-b918-47ec439198a",
   "asset_report_id": "1f414183-220c-44f5-b0c8-bc0e6d4053bb",
   "request_id": "Iam3b"
}
```

FIG. 26

Retrieve JSON Report request – Call to '/asset_report/get'

```
var client = new dataPlaform.Client(
  'DATAPLATFORM_CLIENT_ID',
  'DATAPLATFORM_SECRET',
  'DATAPLATFORM_PUBLIC_KEY',
);
...

// ASSET_REPORT_TOKEN is the token from the createAssetReport response.
client.getAssetReport(ASSET_REPORT_TOKEN, false, (error,
getResponse) => {
  if (error != null) {
    if (error.status_code === 400 &&
        error.error_code === 'PRODUCT_NOT_READY') {
      // Asset report is not ready yet. Try again later.
    } else {
      // Handle error.}} const report = getResponse.report;
});
```

FIG. 27A

Retrieve JSON Report Request Response

```
http code 200
{
"report": {
  "asset_report_id": "c5b638f9-02b8-45c6-9093-552195149b0c",
  "client_report_id": "123456",
  "date_generated": "2018-04-12T03:32:11Z", "days_requested": 730,
  "items": [
    { "accounts": [
        {
          "account_id": "jW4r4QvdeXcAZNj8J3Dni68DqxQ3laHZwGyBD",
          "balances": { "available": 100, "current": 110 },
          "days_available": 730,
          "historical_balances": [...],
          "name": "ACME Checking",
          "official_name": "ACME Gold Standard 0% Interest Checking",
          "owners": [... ], // names, addresses, emails, phone #s, etc.
          "subtype": "checking","type": "depository",
          "transactions": [
            {
              "account_id": "jW4r4QvdeXcAZNj8J3Dni68DqxQ3laHZwGyBD",
              "amount": -500, "date": "2018-03-25",
              "original_description": "United Airlines  REFUND ",
              "pending": false,
              "transaction_id": "wPkQknvpz9HV8bPK465rC6GnyrnlrXCMr9vgm",
              "iso_currency_code": "USD", "unofficial_currency_code": null
            },
            {
              "account_id": "jW4r4QvdeXcAZNj8J3Dni68DqxQ3laHZwGyBD",
              "amount": 5.4, "date": "2018-03-27",
              "original_description": "Uber 063015 SFPOOL",
              "pending": false,
              "transaction_id": "GM4K4LJqGBu5g8yqjkQJuVnry6rz6zh8Qwkv9",
              "iso_currency_code": "USD", "unofficial_currency_code": null
            },
            ...
          ],},],
      "date_last_updated": "2018-04-12T03:32:10Z",
      "institution_id": "ins_109511", "institution_name": "Tartan Bank",
      "item_id": "zeWoWyv84xfkGg1w4ox5iQy5k6j75xu8QXMEm"
    }
  ],
  "user":{"client_user_id": "123456789", "email":"actholder@example.com",
    "first_name": "Alberta","last_name": "Charleson",
    "phone_number": "111-222-3333", "ssn": "123-45-6789"
  }
},
"request_id": "pdwYD", "warnings": []}
```

FIG. 27B

SECURE PERMISSIONING OF ACCESS TO USER ACCOUNTS, INCLUDING SECURE DISTRIBUTION OF AGGREGATED USER ACCOUNT DATA

CROSS-REFERENCE TO RELATED APPLICATIONS

This application claims the benefit of U.S. Provisional Patent Application No. 62/657,377, filed Apr. 13, 2018 and titled "Secure Permissioning of Access to User Accounts, Including Secure Distribution of Aggregated User Account Data", which is incorporated in its entirety by this reference.

TECHNICAL FIELD

This invention relates generally to the field of financial data management, and more specifically to a new and useful system and method for secure permissioning of access to user accounts, including secure distribution of aggregated user account data.

BACKGROUND

There are many scenarios where a person must share private data with some other party. Financial data in particular is a type of sensitive data that often has to be shared for review by others. Accessing such financial data is time consuming, possibly insecure, and overall a bad user experience for the sender of information and the receiver of information.

This problem is common in the lending space where financial information of a person must be compiled and shared with a lender. The loan space has other problems in that loans are often transferred from the initial lender to other lenders. This transfer of the loan will usually mean that third-parties receive the financial record information of a person without that person's knowledge and/or permission.

Thus, there is a need in the financial data management field to create a new and useful system and method for secure permissioning of access to user accounts, including secure distribution of aggregated user account data. This invention provides such a new and useful system and method.

BRIEF DESCRIPTION OF THE FIGURES

FIGS. 7-8 illustrate examples of API request and response flows of the system, according to an embodiment;

FIG. 26 is an exemplary request and response for creating a report token

FIG. 27A and FIG. 27B are representations of an exemplary request and response for accessing a financial report;

DESCRIPTION OF THE EMBODIMENTS

Figure 1:
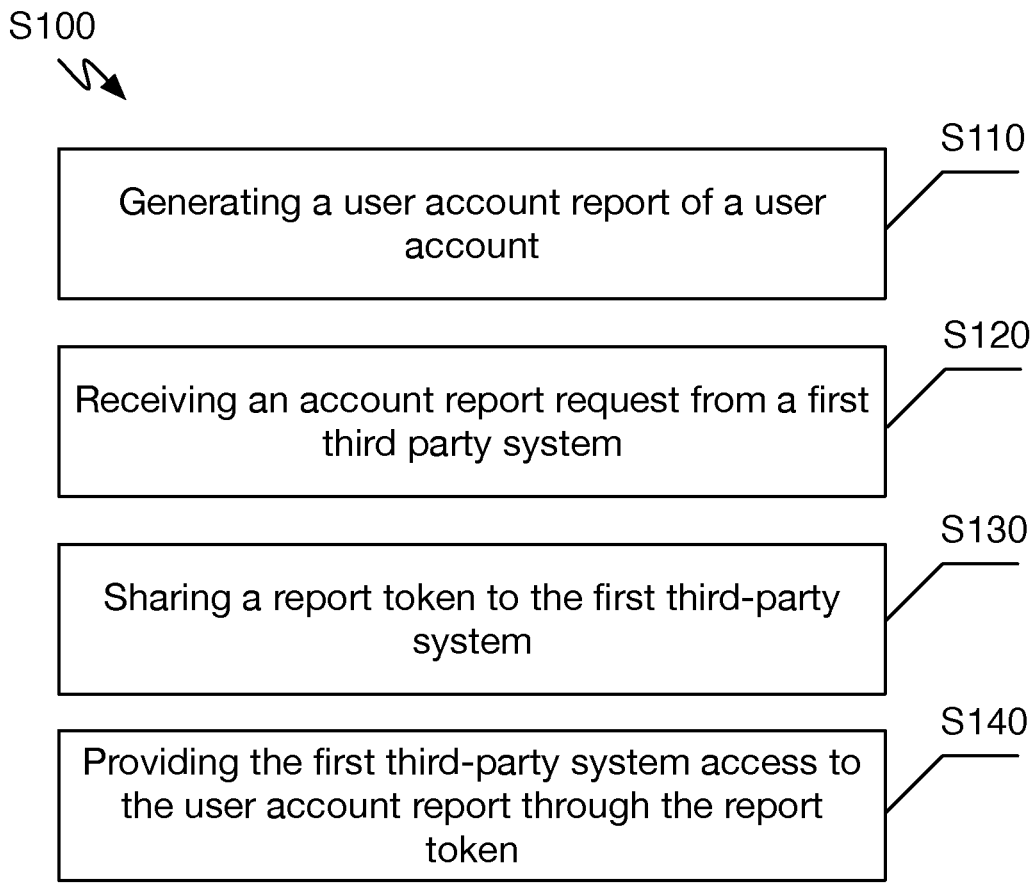
FIG. 1 is a flowchart illustrating a method for secure permissioning of access to user accounts and the secure distribution of aggregated user account data of a preferred embodiment.

The following description of the embodiments of the invention is not intended to limit the invention to these embodiments but rather to enable a person skilled in the art to make and use this invention.

A system and method for secure permissioning of access to user accounts, functions as a technology-driven solution for securing and automating the process of reporting financial information. A system and method for secure permissioning preferably additionally includes secure distribution of aggregated user account data. In one preferred variation, an example of aggregated user data includes a data representation of a financial record compatible with computer and data operations. Accordingly, the method may additionally be applied to managing access to financial records of a preferred embodiment.

The system and method can be applied in particular use cases to streamline a borrower experience and drive efficiencies through digital asset verification. The system and method can be used to facilitate retrieval of a consolidated asset or financial report showing account balances, historical transactions, account holder identity information, financial fitness analysis, and/or other financial or asset related reports or data.

The system and method can be used within a host digital system to moderate access of a financial report by outside, third-party entities (e.g., digital or electronic systems of banks, lenders, regulatory bodies, and the like).

There are generally three primary roles that are involved in interactions of the system and method: roles of a managing system, a financial data source, and a third-party system.

The managing system role is preferably a role of a system managing access to financial records, which can function as a data management or transfer platform. A managing system is preferably the primary operator and executor of the system and method. Though, as discussed herein, alternative embodiments of the system may characterize operations performed by financial data sources and/or third-party systems. For example, the method for managing access to financial records may alternatively be characterized by processes performed by the third-party.

The financial data source role, or more generally the external data source role, is preferably a role of a system from which financial data, asset data, and/or any suitable data or information originates or is obtained. In some instances, there may be a plurality of systems or entities serving as financial data sources. In some implementations, the managing system may additionally be a financial data source.

The third-party system role is preferably a role of a system requesting financial report information or data. A third-party system could be a computer system of a lender trying to qualify a user for a potential loan. A third-party system could also be a secondary lender evaluating acquiring a loan from an initial lender. A third-party system could be a regulatory body performing an audit of financial activity of one or more individuals, lenders, banks, or other entities. The third-party system could alternatively be any suitable type of entity requesting access to financial reports. As is described herein, different instances of the system and method may involve one, two, or more third-party systems.

In some variations, the system and method may be implemented in connection with a financial data platform implementation. A financial data platform is generally characterized as a network- or web-accessible software platform that provides tools or access to financial data. A financial data platform is preferably one that offers an application programming interface by which other entities can programmatically interact. The financial data platform implementation may not be the primary source of financial data, and instead the financial data platform may interface with external financial institutions and access financial data originating outside of the financial data platform. In some variations, the system and method may include a proxy service configured to interface with and access data from an external financial institution.

In an alternative variation, the system and method may be implemented in connection with a financial institution system such as a digital platform of a bank, a payment service, a credit card system, an investment system, and/or any type of financial institution. The financial institution will generally include at least some amount of financial data that originates through operation of the financial institution system. For example, a bank's digital platform will include financial records of its account holders. In some variations, a financial institution system could additionally access external financial institution systems in a manner as the financial data platform described above.

The system and method is preferably implemented within multitenant computing systems wherein multiple users and entities are served by shared computing resources and infrastructures. In some variations, collective operations on behalf of multiple distinct entities may be used to alter and/or impact operations performed for an individual entity. For example, monitoring of financial report requests by multiple lending entities for a variety of users can be analyzed and monitored for expected behavior and suspect behavior, and then used in automatically regulating (e.g., permitting, restricting, or preventing) financial record requests.

As one aspect of the system and method, the transfer of private data, and more specifically financial reports, can be cryptographically facilitated. Preferably, the use of cryptographic keys or tokens are generated, distributed to third-parties, and verified when permitting access to financial records. Tokens may additionally be generated and shared in association with various entities such that a second token can be generated and shared such that an auditing body or second third-party may be granted access.

As a related aspect, the system and method facilitate the collection and sharing of financial reports that act as a point-in-time snap shot of a person's finances. The financial reports preferably characterize financial data as it was valid at the time of generating the financial reports. This may be important in many situations such as loan approval where an audit would want to review the state of information on which a loan decision was based.

The sharing of a financial report can be facilitated through a variety of mediums. In one variation, the financial report is shared as a report document (e.g., PDF, image, etc.), as raw data (e.g., JSON, CSV, etc.), and/or any suitable format. In another variation, the financial report can be shared within a user interface serving as a user management access portal. For example, a user interface can be provided through which the financial report can be viewed and explored. Additionally, in providing access through a user interface, access to a financial report can be expired, revoked, and/or altered in some way after being granted.

The managing system may additionally expose visibility to and control of financial report access to end users. Where before users had no way of controlling traditional financial reports once they were shared, the system and method can enable a user to see who access financial reports and potentially have an impact on who and when financial reports can be accessed.

As another potential aspect, the system and method may involve the creation of a financial report. In one preferred implementation, the system and method facilitates accessing financial data and generating a financial report from one or more systems of external financial institutions. As one potential benefit, the way of accessing the different financial institutions can additionally be normalized for a user thereby preferably creating an enhanced user experience. As another potential benefit, the system and method normalized the financial data across a variety of different information sources. In some variations, the system and method can automate selection of appropriate accounts and/or data.

The system and method may additionally provide new forms of financial reporting that can perform forms of financial data filtering, analysis, and/or other suitable enhancements to standard financial data. Normalizing the financial data from a variety of data sources can enable the system and method to perform forms of higher level financial analysis across two or more sources.

The system and method may be used in a variety of use cases that may involve the access and distribution of private data like financial data. As mentioned, the field of loan approval in particular may potentially benefit from such a system and method. In one exemplary implementation, the system and method may be integrated into a data management platform such that an asset report can be easily obtained by lenders. A lender can integrate the data management platform into a digital loan application system. The digital loan application system can use a programmatic interface (e.g., API service) of the data management platform to allow a client device of the user to authenticate with one or more external user account systems. The data management platform will preferably authenticate with one or more banks or other types of financial institutions and collect account-specific financial data. The private financial data can then be normalized to a standard format of the asset report. The asset report can detail various financial account details such as cleaned and normalized transaction data. The asset report can include additional supplementary metadata such as categories, locations, merchant names, user information, and the like.

As one potential benefit to the end-user, the process of authenticating with their various accounts provided through the system and method can be a simpler, faster, and safer process when compared to manually collecting and uploading various financial documents. Additionally, the data management platform can sanitize the financial reports such that only the desired information is exposed and shared such as by excluding unnecessary accounts and account information. Furthermore, the asset report is accessed directly from a trusted financial institution, which can act to help verify the identity of the user as well as verify the authenticity of the financial records.

A cryptographic token shared with the third-party is preferably used by the third-party in accessing the asset report from the data management platform. In some cases, such as when a second lender wants to take over a loan, the second lender will want to review the asset report. In other cases, a regulatory body may want to perform an audit or review of a loan. In such cases the system and method can facilitate creation of a second cryptographic token (e.g., an "audit token"). Typically, the original third-party transmits a request for the second token to be associated with an identifier of the second third-party. The data management platform in return can create and share the second token with the original third-party, who in turn can share the second token with the second third-party. A system of the second third-party can then use the second token in requesting access to the asset report. As the asset reports are stored as a historical record at specified point in time. The information of the asset report will be consistent regardless of when and who accesses the report. Though in some variations, the information may be modified or redacted by the data management system based on who is accessing the asset report and set access permissions.

As another aspect, the user may be provided some level of visibility into and in some cases control over the asset report. The data management platform can provide a management user interface to the user such that they can view when and who accesses a financial report and/or requests access. Additionally, a user can set one or more rules or directives that alter permissions for accessing the financial report. In one variation, secondary tokens are granted and/or validated to allow access only after the user submits approval, which functions to allow a user to control who the financial report is shared with.

Some variations of the system and method may relate to systems and techniques for securely and efficiently obtaining user account data via instantiation of virtualized or simulated instances of first-party software applications. For example, the system may include generation of proxy, virtualized, or simulated instances of software applications that are configured to interface with external systems via public or non-public (e.g., proprietary) application programming interfaces (APIs). The virtualized or simulated instances of the software applications may be authenticated with the external systems as if the virtualized/simulated instances are actually first-party software applications executing on a user computing device. Via the public/non-public APIs user account information may be obtained and processed, such that the data may be normalized and provided to other software systems via a normalized API of the system. Accordingly, the systems of the present disclosure may be significantly more efficient at obtaining user account data and thereby financial data from external systems than previous techniques. Further, the user account data may be normalized and requested and/or provided via a normalized API, enabling others to efficiently access such data (originally obtained from multiple external systems) from a single standardized interface in a highly efficient manner. In this way normalized and more consistent financial reports can be generated from user accounts from various financial institutions.

Some variations may also relate to systems (e.g., a permissions management system) and techniques for enabling a user to securely authorize a third-party system to initiate transactions related to an account, without disclosing to the third-party system the account credentials (e.g., an identity of the account). Such transactions may include, for example, initiating an electronic payment, or the like. Further, the systems and techniques of the present disclosure may enable the user to securely de-authorize the third-party system from initiating transactions related to the account. The disclosure includes, in some embodiments, automatic generation of electronic records that securely store account information. In some implementations the electronic records may include one or more permissions related to the account and the third-party. A token (e.g., a unique identifier associated with the electronic record, also referred to herein as a "unique record identifier") may be shared with the third-party system, but in some implementations neither the electronic record itself, nor the user account credentials, may be shared with the third-party. Accordingly, the third-party (e.g., a merchant system or a software application developed by a developer) may request user account data and/or initiate transactions by providing the token, but does not itself know, e.g., account number, etc. Further, in some implementations the user may set various permissions related to the token/electronic record, and may also revoke permissions associated with the token/electronic record (e.g., de-authorize the third-party), thus providing increased security to the user's account. The disclosure further includes various interactive user interfaces to facilitate the above-described functionality. In the context of providing financial reports, initiation of transactions or direct access to transaction data is not made. Instead financial reports are generated and report tokens are used in permitting access to the financial reports.

In various embodiments, large amounts of data are automatically and dynamically retrieved and processed in response to application programming interface (API) requests and other user inputs, and the retrieved data is efficiently and compactly accessible to a customer or user also via normalized API responses from the system or in the form of asset/financial reports. The data may be retrieved in an efficient way via instantiation of virtualized/simulated instances of mobile applications, for example. Thus, in some embodiments, the API interfaces described herein are more efficient as compared to previous interfaces in which data is not normalized and compactly and efficiently provided to the customer user in response to such requests. Advantageously, using the system, the customer or user may access data from multiple disparate data sources (e.g., data stores) and/or systems, each of which may use a proprietary interface, in a standardized way.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The interactive and dynamic user interfaces preferably include improved human-computer interactions that may provide reduced mental workloads, improved decision-making, reduced work stress, and/or the like, for a user. For example, user interaction with the interactive user interface via the inputs described herein may provide an optimized display of, and interaction with, transaction and account data and may enable a customer user to more quickly and accurately access, navigate, assess, and digest the account data than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various aspects and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as mentioned above, existing account and/or transaction data retrieval technology is limited in various ways (e.g., interfaces differ for each system or source, data is provided in different formats, etc.), and various embodiments of the disclosure provide significant improvements over such technology. Additionally, various embodiments of the present disclosure are inextricably tied to computer technology. In particular, various embodiments rely on receipt of computer-based API requests, accessing of transaction and/or other data via, e.g., virtualized/simulated instances of mobile applications, normalization of retrieved data, and responses to the requests via the API in a standardized way. Such features and others are intimately tied to, and enabled by, computer technology, and would not exist except for computer technology. For example, the API request and responses, and instantiation of virtualized/simulated instances of e.g., mobile applications, described below in reference to various embodiments, cannot reasonably be performed by humans alone, without the computer technology upon which they are implemented. Further, the implementation of the various embodiments of the present disclosure via computer technology enables many of the advantages described herein, including more efficient interaction with, various types of data.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and combination and are not necessarily limited to any particular disclosed sequence.

Various operations may be described as multiple discrete operations in turn, in a manner that may be helpful in understanding certain embodiments. However, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Embodiments described herein generally reference systems and methods for programmatic verification of third-party-stored data and, additionally, for distributing, routing, or otherwise disclosing a subset of the programmatically verified transactions (or other financial or private data) to one or more third parties.

For example, some embodiments include one or more server or computer network systems (referred to herein as a "data management platform", "data transfer platform" or, more generally, a "platform"), optionally authenticated by a certificate authority or other similar organization, for securely aggregating and routing data between account servers, software applications, and third-party servers each operated, managed, and controlled by different entities or persons.

More specifically, an example data management platform includes a database that stores aggregate data obtained from numerous sources (herein, the "remote data sources") about an individual or entity, herein referred to as the "subject." As used herein the term "aggregate data" generally refers to the product of an operation to merge, format, normalize, structure, and/or coalesce formatted or unformatted data obtained from one or more discrete data sources into one or more structured databases such that a query of the one or more structured databases can return matching results—if any—from each of the one or more discrete data sources.

Returning to the example above, in some embodiments, the subject can query the database for convenient single-source access to its own data. An example context is an aggregation of financial or banking data about the subject. In this example, the subject can query the data management platform (e.g., via a software application operating on a mobile device) for convenient access to all of the subject's aggregate financial or banking data, obtained from multiple discrete financial or banking institutions, presented in a single user interface.

In addition, for embodiments described herein, the data management platform is configured to provide an interface to accept requests from third-party servers (operated by a "third-party") for data about the subject (the "requested private data"). As discussed third-party systems may be enabled to access financial data and more specifically financial reports when permitted. In one variation, before disclosing the requested private data to the third-party, the data management platform offers the subject the opportunity to approve, modify, or deny the request. More specifically, in one example, the data management platform sends a request over an encrypted and authenticated channel to a software application operated by the subject to solicit permission from the subject to disclose the requested private data to the third-party. If the subject denies the request, no data is disclosed to the third-party and the subject's data privacy is maintained.

Alternatively, if the subject approves or modifies the report access request (e.g., approving only part of the request, denying only part of the request, adding supplemental information, adding comments or context to particular data points, redacting individual data points, and so on), a subset of data matching the request (or the modification)—and only that subset of data—is transmitted to the third-party over an encrypted and authenticated channel in a structured format (e.g., JSON, XML, xBRL, HTML, PDF, XLS, CSV, and so on). Alternative approaches to providing access are disclosed herein. This data is referred to herein as the "disclosed private data." It may be appreciated that the disclosed private data may be different from the requested private data if the request is modified by the subject.

In this manner, the third-party obtains all the data it requires about the subject from a single, trusted source and additionally, the subject retains control over the disclosure and routing of its data without having to independently review data obtained from multiple discrete sources to prevent over-disclosure of private information.

In some embodiments, the data management platform supplements data stored in the database with additional information or data (e.g., tags, categories, and so on). In other embodiments, the data management platform periodically or automatically examines the data stored in the database to recognize patterns, relationships, or associations between different data points or transactions, data irregularities or errors, and so on. In still further embodiments, the data management platform can be configured to determine, estimate, and/or calculate metadata across a set or subset of data stored in the database.

In further examples, the disclosed private data may not be distributed to the third-party by the data management platform, but instead may be packaged, encrypted, or otherwise prepared and sent to the subject as a digital copy or a physical copy for routing to the third-party. In other examples, the disclosed private data may not be transmitted to the third-party or the subject by the data management platform, but instead may be packaged, encrypted, or otherwise prepared as a digital or physical copy and held in a data escrow (managed or implemented by the data management platform or by a third-party data escrow agent) to be distributed/transmitted to the third-party after an occurrence of an event.

As a result of these communication architectures, private data of one party (the subject/user) can be collected from multiple trusted sources (the remote data sources), aggregated, and securely and privately transmitted to another party (the third-party) in a manner that allows both the subject and the third-party to retain confidence that the disclosed private data is accurate, true, and current.

The third-party can use the disclosed private data for any purpose approved by the first party. As in one preferred use case, the requested private data is financial data (e.g., transactions, balances, account numbers, and so on) possibly organized into a financial report that the third-party uses to assess default risk, financial health, creditworthiness, leverage position, net worth, net income, and so on. In another embodiment, the private data is identity data (e.g., names, addresses, employment information, and so on) that the third-party uses to confirm ownership of real or personal property or employment. In another alternative use case, the private data is health data (e.g., prescriptions, blood type, sex, age, and so on) that the third-party uses to determine qualification for a clinical trial, potential interactions between medications, health insurance premiums, and so on.

For simplicity of description, however, many embodiments that follow reference network and communication architectures that facilitate programmatic verification of transactions (e.g., "private financial data") and, additionally or optionally, transmission of that programmatically-verified private financial data of a potential debtor (e.g., a "borrower") to a potential creditor (e.g., a "lender"). In this example, the financial data disclosed to the lender can be used by the lender to comprehensively determine default risk of the borrower, or for another purpose related to a debt or credit transaction. However, as noted above, it is appreciated that this is merely one example transaction type and one example of private data that may be disclosed between parties; the embodiments described herein may be equivalently applicable to other transactions, transaction types, and parties, and may involve exchange and disclosure of other private data and/or other private data types.

According to one embodiment, a method is disclosed comprising: at a financial platform system constructed to programmatically access financial data: creating an application proxy instance that simulates an application of an external financial service system; receiving a normalized account request for financial data of the external financial service system for a specified account, the normalized account request being provided by an external financial application system by using a financial data API of the financial platform system; responsive to the normalized account request: negotiating communication with the external financial service system by using the application proxy instance to access the requested financial data from the external financial service system by using a proprietary Application Programming Interface (API) of the external financial service system; and providing the financial data to the external financial application system as a response to the normalized account request.

According to an aspect, the method further comprises setting up a session through the proxy instance.

According to another aspect, the normalized account request is a request in accordance with the financial data API of the financial platform system, and the financial data API is constructed to provide a normalized interface for accessing financial data from external financial service systems having different proprietary APIs.

According to yet another aspect, negotiating communication comprises: forming a request in accordance with the proprietary API based on information specified by the normalized account request.

According to another aspect, the financial platform system includes an institution interface module for the external financial service system, the institution interface module models the proprietary API of the external financial service system, and the institution interface module is used to access the requested financial data from the external financial service system.

According to yet another aspect, the financial platform system generates the institution interface module by at least one of: parsing source code of the application of the external financial service system; and parsing communication between the application and the external financial service system.

According to another aspect, the institution interface module defines headers of messages sent to the external financial service system.

According to yet another aspect, the specified account is an account of the external financial service system.

According to another aspect, the specified account is a user account of the financial application system, and the financial data accessed from the external financial service system is financial data corresponding to at least one account of the external financial service system that is associated with user credentials of the application proxy instance.

According to yet another aspect, the specified account is a user account of the financial application system, wherein a plurality of application proxy instances corresponding to the specified user account are used to access financial data from a plurality of external financial service systems, and wherein financial data provided to the application system corresponds to accounts of the external financial service systems that are associated with user credentials of the application proxy instances.

According to another embodiment, a method is disclosed comprising: at a multi-tenant financial platform system constructed to programmatically access at least one financial service system external to the financial platform system, and responsive to a normalized financial service request provided by an external application system associated with an account of the financial platform system: for each external financial service system corresponding to the normalized financial service request, using an application proxy instance associated with the account of the financial platform system to provide a proprietary Application Programming Interface (API) request to the financial service system in accordance with a proprietary API of the financial service system; and providing a normalized financial service response to the external application system based on at least one proprietary API response received from an external financial service system, wherein using an application proxy instance comprises using an application proxy instance that is constructed to provide a proprietary API request to the respective external financial service system on behalf of a user account of the external application system by simulating an application of the external financial service system.

According to an aspect, the financial platform system includes an institution interface module for each external financial service system, wherein each institution interface module models the proprietary API of the associated external financial service system, wherein each proprietary API request is provided to the corresponding financial service system by using the institution interface module for the financial service system, and an application proxy instance corresponding to the financial service system and the user account, and wherein the financial platform system generates each institution interface module by at least one of: parsing source code of the application of the corresponding financial service system; and parsing communication between the application and the corresponding financial service system.

According to another aspect, a primary application proxy instance and at least one secondary application proxy instance are associated with a financial service system corresponding to the normalized financial service request, and wherein responsive to a determination that the normalized financial service request cannot be processed by using the primary application proxy instance, the secondary application proxy instance is used to process the normalized financial service request.

According to yet another aspect, the primary application proxy instance corresponds to a mobile application of a respective financial service system and the secondary application proxy instance corresponds to at least one of a web-based application and a desktop application of the respective financial service system.

According to another aspect, proprietary API requests of a proprietary API of a financial service system include at least one of: a request for a list of transactions for at least one account of the financial service system; a request for details of a transaction associated with an account of the financial service system; a financial transfer request, a payment scheduling request; an electronic check deposit request; an account update request; a fraud reporting request; and a services request, and wherein normalized API requests of an API of the financial platform system include at least one of:

a request for a list of transactions for a user account of an external application system; a request for details of a transaction associated with the user account; a financial transfer request; a payment scheduling request; an electronic check deposit request; an account update request; a fraud reporting request; and a services request.

According to yet another aspect, the normalized financial service request is a request for a list of transactions for the user account, wherein financial service systems corresponding to the normalized financial service request include financial service systems corresponding to application proxy instances for the user account of the external application system, and wherein each proprietary API request is a request for financial data of accounts corresponding to user credentials of the associated application proxy instance used to provide the proprietary API request.

According to another aspect, providing the normalized financial service response comprises transforming the received financial data into a normalized form, and wherein transforming the received financial data comprises at least one of processing the financial data, cleaning the financial data, supplementing the financial data with additional information, and enhancing the financial data, and wherein additional information includes at least one of categorical labels, tags, and geo location information.

According to yet another aspect, the normalized financial service request is a request for details of a transaction associated with the user account, wherein the normalized financial service request specifies information identifying the transaction, the associated financial service system, and the associated account of the financial service system, and wherein the proprietary API request is a request for details of the transaction of the specified account of the specified financial service system.

According to another aspect, the normalized financial service request is a financial transfer request, wherein the normalized financial service request specifies information identifying a source financial service system, a source account of the source financial service system, a destination financial service system, a destination account of the destination financial service system, and a transaction amount, and wherein at least one of an application proxy instance of the source financial service system and an application proxy instance of the destination financial service system is used to initiate the financial transfer request to transfer the specified transaction amount from the source account to the destination account by providing a proprietary transfer API request to the respective financial service system.

According to yet another aspect, the financial platform system selects one of the application proxy instance of the source financial service system and the application proxy instance of the destination financial service system for initiation of the financial transfer request based on at least one of capabilities and transaction fees of the source financial service system and the destination financial service system.

According to yet another embodiment, a method is disclosed comprising a financial platform system receiving a normalized financial API request associated with at least one financial account endpoint, the normalized financial API request being provided by an external financial application system by using a financial platform API of the financial platform system, the normalized financial API request specifying account credentials of each financial account endpoint of the normalized financial API request; responsive to the normalized financial API request: collecting transaction information of each financial account endpoint of the normalized financial API request by using an application proxy instance associated with the financial account endpoint to collect the transaction information from a corresponding financial institution system by using the associated account credentials specified by the normalized financial API request and a proprietary Application Programming Interface (API) of the financial institution system; and providing a normalized financial API response to the external financial application system, the normalized financial API response providing the transaction information of each financial account endpoint of the normalized financial API request, wherein each application proxy instance is constructed to simulate an application of the corresponding external financial institution system.

According to an aspect, the collected transaction information for each financial account endpoint includes at least an account number and a corresponding routing number for use in automated clearing house (ACH) transactions.

According to another aspect, the transaction information is collected by processing at least one financial statement accessed from the corresponding external financial institution system.

According to yet another aspect, the financial platform system includes an institution interface module for each external financial institution system, each institution interface module models the proprietary API of the external financial institution system, and each application proxy instance uses a corresponding institution interface module to collect the transaction information from the external financial institution system.

According to another aspect, the financial platform system generates each institution interface module by at least one of: parsing source code of the application of the associated external financial institution system; and parsing communication between the application and the associated external financial institution system.

According to yet another aspect, each institution interface module defines headers of messages sent to the associated external financial institution system, and wherein the proprietary API is different from a web browser interface.

According to another embodiment, a method is disclosed comprising: at a financial platform system: receiving a normalized financial API request associated with at least one financial account endpoint, the normalized financial API request being provided by an external financial application system by using a financial platform API of the financial platform system, the normalized financial API request specifying a financial transaction and at least one of an account token and account credentials of each financial account endpoint of the normalized financial API request; responsive to the normalized financial API request: collecting transaction information of each financial account endpoint of the normalized financial API request by using an application proxy instance associated with the financial account endpoint to collect the transaction information from a corresponding financial institution system by using at least one of an associated account token and associated account credentials specified by the normalized financial API request and by using a proprietary API of the financial institution system; executing the transaction specified by the normalized financial API request by using the collected transaction information; and providing a normalized financial API response to the external system, the normalized financial API response providing at least one of a status of the transaction and results of the transaction, wherein each application proxy instance is constructed to simulate an application of the corresponding external financial institution system.

According to yet another embodiment, a method is disclosed comprising a financial platform system constructed to programmatically access at least one external financial institution system external to the financial platform system, and responsive to a normalized financial API request provided by a financial application system by using a financial platform API of the financial platform system, the normalized financial API request specifying user information corresponding to at least one financial account endpoint of the at least one external financial institution system: using at least one application proxy instance associated with the normalized API request to collect transaction information from a corresponding financial institution system by providing the financial institution system with a proprietary financial API request that specifies at least account credentials associated with the user information specified by the normalized financial API request, the transaction information being included in at least one proprietary financial API response provided by the financial institution system; generating a normalized financial API response based on the collected transaction information; and providing the normalized financial API response to the financial application system, wherein each application proxy instance is constructed to simulate an application of the corresponding financial institution system on behalf of a user associated with the application proxy instance.

According to an aspect, each proprietary API is a private API of the respective financial institution system, and wherein each proprietary API is different from a web browser interface.

According to another aspect, the normalized financial API request is provided on behalf of a user account of the financial application system, and wherein the specified user information includes information associated with the user account.

According to yet another aspect, the normalized financial API request is provided on behalf of a user account of the financial application system, and wherein the specified user information includes information associated with a user that is different from a user of the user account of the financial application system.

According to another aspect, the normalized financial API request is a request for financial account endpoint information, wherein the collected transaction information includes financial account endpoint information, and wherein generating the normalized financial API response comprises including the financial account endpoint information in the normalized financial API response.

According to yet another aspect, the normalized financial API request is a request to transfer funds from at least one withdrawal account endpoint to at least one deposit account endpoint and the normalized financial API request specifies an amount of funds to be transferred, wherein the user information indicates the at least one withdrawal account endpoint and the at least one deposit account endpoint, wherein a transaction engine of the financial platform system is used to execute an ACH transaction to transfer the specified amount of funds from the at least one withdrawal account endpoint to the at least one deposit account endpoint by using the collected transaction information, and wherein generating the normalized financial API response comprises including at least one of a status of the transfer and results of the transfer in the normalized financial API response.

According to another aspect, the normalized financial API request specifies an originating financial institution system for executing the transfer.

According to yet another aspect, the financial platform system is a multi-tenant financial platform system, wherein the application system is an external application system associated with an account of the financial platform system, wherein each application proxy instance is associated with the account of the financial platform system, and wherein each application proxy instance is constructed to provide a proprietary financial API request to the respective external financial institution system on behalf of a user of the external application system by simulating an application of the external financial institution system.

According to another aspect, the financial platform system is a single-tenant financial platform system, wherein the application system is an application system of the financial platform system, and wherein each application proxy instance is constructed to provide a proprietary financial API request to the respective external financial institution system on behalf of a user of the application system by simulating an application of the external financial institution system.

According to yet another aspect, the user information includes a user account identifier for at least one user account of the application system corresponding to the normalized financial API request, each user account identifier is used to select at least one of the at least one application proxy instance, and each at least one application proxy instance includes user credentials to access the associated financial institution system, and wherein each proprietary financial API request specifies the corresponding user credentials.

According to another aspect, the user information includes at least one set of user credentials for at least one user account of the application system corresponding to the normalized financial API request, and wherein at least one proprietary financial API request specifies a corresponding set of user credentials of the user information.

According to yet another aspect, the user information includes at least one account token for at least one user account of the application system corresponding to the normalized financial API request, and wherein at least one proprietary financial API request specifies user credentials associated with a corresponding account token of the user information.

According to another aspect, the method further comprises at least one of: selecting at least one of the at least one withdrawal account endpoint for the transfer based on at least one of capabilities of at least one withdrawal account endpoints, availability of at least one withdrawal account endpoint, configuration for at least one withdrawal account endpoints, and parameters of the normalized financial API request, and selecting at least one of the at least one deposit account endpoint for the transfer based on at least one of capabilities of at least one deposit account endpoint, availability of at least one deposit account endpoint, configuration for at least one deposit account endpoint, and parameters of the normalized financial API request.

According to another embodiment, a computer system is disclosed comprising: one or more computer readable storage devices configured to store a plurality of computer executable instructions; and one or more hardware computer processors in communication with the one or more computer readable storage devices and configured to execute the plurality of computer executable instructions in order to cause the computer system to: execute an Application Programming Interface (API) of the computer system, the API of the computer system configured to receive and provide responses to requests from a developer computing device according to a normalized format of the API of the computer system; receive, via the API and according to the normalized format, a request from the developer computing device for transaction data associated with a user, the request including at least: a username associated with the user, a password associated with the user, and an external institution identifier; determine, based on the external institution identifier, an external institution associated with the request; in response to the request: access an institution interface module of the computer system, wherein: the institution interface module is uniquely configured to enable communication with an external computing device of the external institution via a non-public API of the external computing device of the external institution, and the institution interface module is generated based on an analysis of interactions between an actual instance of a mobile device application associated with the external institution and the external computing device of the external institution; and instantiate a virtualized instance of the mobile device application associated with the external institution, wherein: the virtualized instance of the mobile device application is configured to communicate with the institution interface module of the computer system so as to interface with the external computing device of the external institution via the non-public API of the external computing device of the external institution, the non-public API of the external computing device of the external institution is configured to interact with the mobile device application, and the virtualized instance of the mobile device application is generated based on an analysis of the mobile device application; authenticate, via the institution interface module, the virtualized instance of the mobile device application with the external computing device of the external institution based on at least one of: an mobile device identifier code, an mobile device authentication token, or a mobile device Media Access Control (MAC) address; request, by the virtualized instance of the mobile device application and via the non-public API of the external computing device of the external institution, the transaction data associated with the user from the external computing device of the external institution by: providing the username associated with the user and the password associated with the user to the external computing device of the external institution; receiving a request for second factor authentication information from the external computing device of the external institution; requesting, via the API of the computer system, the second factor authentication information from the developer computing device; receiving, via the API of the computer system, the second factor authentication information from the developer computing device; providing the second factor authentication information to the external computing device of the external institution; receiving, from the external computing device of the external institution, a response indicating acceptance of the second factor authentication information; requesting the transaction information from the external computing device of the external institution; and receiving the transaction data associated with the user from the external computing device of the external institution; enhance the transaction data associated with the user to generate enhanced transaction data by: augmenting, based on an analysis of the transaction data, a plurality of transaction data items of the transaction data with respective category labels; augmenting, based on a further analysis of the transaction data, the plurality of transaction data items of the transaction data with respective geolocation information; and standardizing a format of the transaction data such that the enhanced transaction data may be provided by the computer system in the normalized format; provide, via the API of the computer system and in the normalized format, the enhanced transaction data to the developer computing device; and persist, in the one or more computer readable storage devices of the computer system, the virtualized instance of the mobile device application such that future requests for transaction data associated with the user may be obtained via the virtualized instance of the mobile device application.

According to an aspect, the one or more hardware computer processors are configured to execute the plurality of computer executable instructions in order to further cause the computer system to: further in response to the request: determine a second external institution from which second transaction data associated with the user is to be obtained to fulfill the request; access a second institution interface module of the computer system, wherein: the second institution interface module is uniquely configured to enable communication with an external computing device of the second external institution via a non-public API of the external computing device of the second external institution, the non-public API of the external computing device of the second external institution is different from the non-public API of the external computing device of the external institution, and the second institution interface module is generated based on an analysis of interactions between an actual instance of a second mobile device application associated with the second external institution and the external computing device of the second external institution; and instantiate a virtualized instance of the second mobile device application associated with the second external institution, wherein: the virtualized instance of the second mobile device application is configured to communicate with the second institution interface module of the computer system so as to interface with the external computing device of the second external institution via the non-public API of the external computing device of the second external institution, the non-public API of the external computing device of the second external institution is configured to interact with the second mobile device application, and the virtualized instance of the second mobile device application is generated based on an analysis the second mobile device application; authenticate, via the second institution interface module, the virtualized instance of the second mobile device application with the external computing device of the second external institution based on at least one of: an identifier code associated with a mobile device, an authentication token associated with a mobile device, or a Media Access Control (MAC) address associated with a mobile device; request, by the virtualized instance of the second mobile device application and via the non-public API of the external computing device of the second external institution, the second transaction data associated with the user from the external computing device of the second external institution by: providing the username associated with the user and the password associated with the user to the external computing device of the second external institution; requesting the second transaction information from the external computing device of the second external institution; and receiving the second transaction data associated with the user from the external computing device of the second external institution; enhance the second transaction data associated with the user to generate second enhanced transaction data by: augmenting, based on an analysis of the second transaction data, a plurality of transaction data items of the second transaction data with respective category labels; augmenting, based on a further analysis of the second transaction data, the plurality of transaction data items of the second transaction data with respective geolocation information; and standardizing a format of the second transaction data such that the second enhanced transaction data may be provided by the computer system in the normalized format; combine the enhanced transaction data and the second enhanced transaction data to generate combined enhanced transaction data; provide, via the API of the computer system and in the normalized format, the combined enhanced transaction data to the developer computing device; and persist, in the one or more computer readable storage devices of the computer system, the virtualized instance of the second mobile device application such that future requests for transaction data associated with the user may be obtained via the virtualized instance of the second mobile device application.

According to another aspect, the institution interface module is further generated based on at least one of: parsing source code of the mobile device application or parsing communication between the mobile device application and the external computing device of the external institution.

According to yet another aspect, the institution interface module defines headers of messages sent to the external computing device of the external institution.

According to another aspect, the one or more hardware computer processors are configured to execute the plurality of computer executable instructions in order to further cause the computer system to: receive, via the API and according to the normalized format, a request from the developer computing device for at least one of: a list of transactions associated with an account of the user at the external institution, details of a transaction associated with an account of the user at the external institution, a financial transfer from or to and account of the user at the external institution, payment scheduling at the external institution, an electronic check deposit to an account of the user at the external institution, an update of an account of the user at the external institution, a fraud report at the external institution, or a service request at the external institution.

According to yet another aspect, in response to receiving, from the developer computing device, a request for financial transfer from or to and account of the user at the external institution, the one or more hardware computer processors are configured to execute the plurality of computer executable instructions in order to further cause the computer system to: request, by the virtualized instance of the mobile device application and via the non-public API of the external computing device of the external institution, a transfer from or two, based on the request for financial transfer, the account of the user at the external financial institution.

According to yet another embodiment, a computer-implemented method is disclosed comprising: by one or more hardware computer processors executing a plurality of computer executable instructions: executing an Application Programming Interface (API) of the computer system, the API of the computer system configured to receive and provide responses to requests from a developer computing device according to a normalized format of the API of the computer system; receiving, via the API and according to the normalized format, a request from the developer computing device for transaction data associated with a user, the request including at least: a username associated with the user, a password associated with the user, and an external institution identifier; determining, based on the external institution identifier, an external institution associated with the request; in response to the request: accessing an institution interface module of the computer system, wherein: the institution interface module is uniquely configured to enable communication with an external computing device of the external institution via a non-public API of the external computing device of the external institution, and the institution interface module is generated based on an analysis of interactions between an actual instance of a mobile device application associated with the external institution and the external computing device of the external institution; and instantiating a virtualized instance of the mobile device application associated with the external institution, wherein: the virtualized instance of the mobile device application is configured to communicate with the institution interface module of the computer system so as to interface with the external computing device of the external institution via the non-public API of the external computing device of the external institution, the non-public API of the external computing device of the external institution is configured to interact with the mobile device application, and the virtualized instance of the mobile device application is generated based on an analysis of the mobile device application; authenticating, via the institution interface module, the virtualized instance of the mobile device application with the external computing device of the external institution based on at least one of: an mobile device identifier code, an mobile device authentication token, or a mobile device Media Access Control (MAC) address; requesting, by the virtualized instance of the mobile device application and via the non-public API of the external computing device of the external institution, the transaction data associated with the user from the external computing device of the external institution by: providing the username associated with the user and the password associated with the user to the external computing device of the external institution; in response to receiving a request for second factor authentication information from the external computing device of the external institution: providing the second factor authentication information to the external computing device of the external institution; and receiving, from the external computing device of the external institution, a response indicating acceptance of the second factor authentication information; requesting the transaction information from the external computing device of the external institution; and receiving the transaction data associated with the user from the external computing device of the external institution; enhancing the transaction data associated with the user to generate enhanced transaction data by: augmenting, based on an analysis of the transaction data, a plurality of transaction data items of the transaction data with respective category labels; augmenting, based on a further analysis of the transaction data, the plurality of transaction data items of the transaction data with respective geolocation information; and standardizing a format of the transaction data such that the enhanced transaction data may be provided by the computer system in the normalized format; providing, via the API of the computer system and in the normalized format, the enhanced transaction data to the developer computing device; and persisting, in the one or more computer readable storage devices of the computer system, the virtualized instance of the mobile device application such that future requests for transaction data associated with the user may be obtained via the virtualized instance of the mobile device application.

According to an aspect, the computer-implemented method further comprises: by one or more hardware computer processors executing a plurality of computer executable instructions: further in response to the request: determining a second external institution from which second transaction data associated with the user is to be obtained to fulfill the request; accessing a second institution interface module of the computer system, wherein: the second institution interface module is uniquely configured to enable communication with an external computing device of the second external institution via a non-public API of the external computing device of the second external institution, the non-public API of the external computing device of the second external institution is different from the non-public API of the external computing device of the external institution, and the second institution interface module is generated based on an analysis of interactions between an actual instance of a second mobile device application associated with the second external institution and the external computing device of the second external institution; and instantiating a virtualized instance of the second mobile device application associated with the second external institution, wherein: the virtualized instance of the second mobile device application is configured to communicate with the second institution interface module of the computer system so as to interface with the external computing device of the second external institution via the non-public API of the external computing device of the second external institution, the non-public API of the external computing device of the second external institution is configured to interact with the second mobile device application, and the virtualized instance of the second mobile device application is generated based on an analysis the second mobile device application; authenticating, via the second institution interface module, the virtualized instance of the second mobile device application with the external computing device of the second external institution based on at least one of: an identifier code associated with a mobile device, an authentication token associated with a mobile device, or a Media Access Control (MAC) address associated with a mobile device; requesting, by the virtualized instance of the second mobile device application and via the non-public API of the external computing device of the second external institution, the second transaction data associated with the user from the external computing device of the second external institution by: providing the username associated with the user and the password associated with the user to the external computing device of the second external institution; requesting the second transaction information from the external computing device of the second external institution; and receiving the second transaction data associated with the user from the external computing device of the second external institution; enhancing the second transaction data associated with the user to generate second enhanced transaction data by: augmenting, based on an analysis of the second transaction data, a plurality of transaction data items of the second transaction data with respective category labels; augmenting, based on a further analysis of the second transaction data, the plurality of transaction data items of the second transaction data with respective geolocation information; and standardizing a format of the second transaction data such that the second enhanced transaction data may be provided by the computer system in the normalized format; combining the enhanced transaction data and the second enhanced transaction data to generate combined enhanced transaction data; providing, via the API of the computer system and in the normalized format, the combined enhanced transaction data to the developer computing device; and persisting, in the one or more computer readable storage devices of the computer system, the virtualized instance of the second mobile device application such that future requests for transaction data associated with the user may be obtained via the virtualized instance of the second mobile device application.

According to another aspect, the institution interface module is further generated based on at least one of: parsing source code of the mobile device application or parsing communication between the mobile device application and the external computing device of the external institution.

According to yet another aspect, the institution interface module defines headers of messages sent to the external computing device of the external institution.

According to another aspect, the computer-implemented method further comprises: by one or more hardware computer processors executing a plurality of computer executable instructions: receiving, via the API and according to the normalized format, a request from the developer computing device for at least one of: a list of transactions associated with an account of the user at the external institution, details of a transaction associated with an account of the user at the external institution, a financial transfer from or to and account of the user at the external institution, payment scheduling at the external institution, an electronic check deposit to an account of the user at the external institution, an update of an account of the user at the external institution, a fraud report at the external institution, or a service request at the external institution.

According to yet another aspect, the computer-implemented method further comprises: by one or more hardware computer processors executing a plurality of computer executable instructions: in response to receiving, from the developer computing device, a request for financial transfer from or to and account of the user at the external institution: requesting, by the virtualized instance of the mobile device application and via the non-public API of the external computing device of the external institution, a transfer from or two, based on the request for financial transfer, the account of the user at the external financial institution.

According to another embodiment, a computer readable storage medium storing software instructions is disclosed that, in response to execution by one or more hardware computer processors, configure the one or more hardware computer processors to perform operations comprising: executing an Application Programming Interface (API) of the computer system, the API of the computer system configured to receive and provide responses to requests from a developer computing device according to a normalized format of the API of the computer system; receiving, via the API and according to the normalized format, a request from the developer computing device for transaction data associated with a user, the request including at least: a username associated with the user, a password associated with the user, and an external institution identifier; determining, based on the external institution identifier, an external institution associated with the request; in response to the request: accessing an institution interface module of the computer system, wherein: the institution interface module is uniquely configured to enable communication with an external computing device of the external institution via a non-public API of the external computing device of the external institution, and the institution interface module is generated based on an analysis of interactions between an actual instance of a mobile device application associated with the external institution and the external computing device of the external institution; and instantiating a virtualized instance of the mobile device application associated with the external institution, wherein: the virtualized instance of the mobile device application is configured to communicate with the institution interface module of the computer system so as to interface with the external computing device of the external institution via the non-public API of the external computing device of the external institution, the non-public API of the external computing device of the external institution is configured to interact with the mobile device application, and the virtualized instance of the mobile device application is generated based on an analysis of the mobile device application; authenticating, via the institution interface module, the virtualized instance of the mobile device application with the external computing device of the external institution based on at least one of: an mobile device identifier code, an mobile device authentication token, or a mobile device Media Access Control (MAC) address; requesting, by the virtualized instance of the mobile device application and via the non-public API of the external computing device of the external institution, the transaction data associated with the user from the external computing device of the external institution by: providing the username associated with the user and the password associated with the user to the external computing device of the external institution; in response to receiving a request for second factor authentication information from the external computing device of the external institution: providing the second factor authentication information to the external computing device of the external institution; and receiving, from the external computing device of the external institution, a response indicating acceptance of the second factor authentication information; requesting the transaction information from the external computing device of the external institution; and receiving the transaction data associated with the user from the external computing device of the external institution; enhancing the transaction data associated with the user to generate enhanced transaction data by: augmenting, based on an analysis of the transaction data, a plurality of transaction data items of the transaction data with respective category labels; augmenting, based on a further analysis of the transaction data, the plurality of transaction data items of the transaction data with respective geolocation information; and standardizing a format of the transaction data such that the enhanced transaction data may be provided by the computer system in the normalized format; providing, via the API of the computer system and in the normalized format, the enhanced transaction data to the developer computing device; and persisting, in the one or more computer readable storage devices of the computer system, the virtualized instance of the mobile device application such that future requests for transaction data associated with the user may be obtained via the virtualized instance of the mobile device application.

According to an aspect, further in response to execution by one or more hardware computer processors, the software instructions configure the one or more hardware computer processors to perform operations comprising: further in response to the request: determining a second external institution from which second transaction data associated with the user is to be obtained to fulfill the request; accessing a second institution interface module of the computer system, wherein: the second institution interface module is uniquely configured to enable communication with an external computing device of the second external institution via a non-public API of the external computing device of the second external institution, the non-public API of the external computing device of the second external institution is different from the non-public API of the external computing device of the external institution, and the second institution interface module is generated based on an analysis of interactions between an actual instance of a second mobile device application associated with the second external institution and the external computing device of the second external institution; and instantiating a virtualized instance of the second mobile device application associated with the second external institution, wherein: the virtualized instance of the second mobile device application is configured to communicate with the second institution interface module of the computer system so as to interface with the external computing device of the second external institution via the non-public API of the external computing device of the second external institution, the non-public API of the external computing device of the second external institution is configured to interact with the second mobile device application, and the virtualized instance of the second mobile device application is generated based on an analysis the second mobile device application; authenticating, via the second institution interface module, the virtualized instance of the second mobile device application with the external computing device of the second external institution based on at least one of: an identifier code associated with a mobile device, an authentication token associated with a mobile device, or a Media Access Control (MAC) address associated with a mobile device; requesting, by the virtualized instance of the second mobile device application and via the non-public API of the external computing device of the second external institution, the second transaction data associated with the user from the external computing device of the second external institution by: providing the username associated with the user and the password associated with the user to the external computing device of the second external institution; requesting the second transaction information from the external computing device of the second external institution; and receiving the second transaction data associated with the user from the external computing device of the second external institution; enhancing the second transaction data associated with the user to generate second enhanced transaction data by: augmenting, based on an analysis of the second transaction data, a plurality of transaction data items of the second transaction data with respective category labels; augmenting, based on a further analysis of the second transaction data, the plurality of transaction data items of the second transaction data with respective geolocation information; and standardizing a format of the second transaction data such that the second enhanced transaction data may be provided by the computer system in the normalized format; combining the enhanced transaction data and the second enhanced transaction data to generate combined enhanced transaction data; providing, via the API of the computer system and in the normalized format, the combined enhanced transaction data to the developer computing device; and persisting, in the one or more computer readable storage devices of the computer system, the virtualized instance of the second mobile device application such that future requests for transaction data associated with the user may be obtained via the virtualized instance of the second mobile device application.

According to yet another aspect, the institution interface module is further generated based on at least one of: parsing source code of the mobile device application or parsing communication between the mobile device application and the external computing device of the external institution.

According to another aspect, the institution interface module defines headers of messages sent to the external computing device of the external institution.

According to yet another aspect, further in response to execution by one or more hardware computer processors, the software instructions configure the one or more hardware computer processors to perform operations comprising: receiving, via the API and according to the normalized format, a request from the developer computing device for at least one of: a list of transactions associated with an account of the user at the external institution, details of a transaction associated with an account of the user at the external institution, a financial transfer from or to and account of the user at the external institution, payment scheduling at the external institution, an electronic check deposit to an account of the user at the external institution, an update of an account of the user at the external institution, a fraud report at the external institution, or a service request at the external institution.

According to another aspect, further in response to execution by one or more hardware computer processors, the software instructions configure the one or more hardware computer processors to perform operations comprising: in response to receiving, from the developer computing device, a request for financial transfer from or to and account of the user at the external institution: requesting, by the virtualized instance of the mobile device application and via the non-public API of the external computing device of the external institution, a transfer from or two, based on the request for financial transfer, the account of the user at the external financial institution.

According to yet another embodiment, a computer-implemented method of authorizing electronic user account access is disclosed, the computer-implemented method comprising: by one or more hardware processors executing program instructions: receiving account credentials associated with a user account; receiving one or more permissions associated with the user account; receiving an indication of an external application associated with the one or more permissions; determining an external user account associated with the user account; determining a first-party application configured to interface with the external user account; instantiating a virtualized instance of the first-party application; authenticating, using the account credentials, the virtualized instance of the first-party application with the external user account to establish communication with the external user account; accessing, via the virtualized instance of the first-party application, one or more items of user account data associated with the user account; and generating an electronic token including: the one or more items of user account data, the one or more permissions, and the indication of the external application.

According to an aspect the computer-implemented method further comprises: by the one or more hardware processors executing program instructions: generating a unique token identifier; associating the unique token identifier with the electronic token; and communicating the unique token identifier to the external application.

According to another aspect the computer-implemented method further comprises: by the one or more hardware processors executing program instructions: receiving, from a third-party processor: one or more transaction details associated with a transaction, and the unique token identifier; identifying, based on the unique token identifier, the electronic token; comparing the one or more transaction details with the one or more permissions; determining, based on the comparing, whether or not the external application is authorized to initiate the transaction; and communicating, based on determining whether or not the external application is authorized to initiate the transaction, an authorization indication to the third-party processor.

According to yet another aspect the computer-implemented method further comprises: by the one or more hardware processors executing program instructions: determining, based on the comparing, that the external application is authorized to initiate the transaction, wherein the authorization indication indicates that the external application is authorized to initiate the transaction; and communicating, to the third-party processor, the one or more items of user account data.

According to another aspect, the one or more items of user account data includes at least: an account number, or a routing number.

According to yet another aspect the computer-implemented method further comprises: executing, by the third-party processor and based on the one or more items of user account data, the transaction with the external user account; and communicating, to the external application, an indication that the transaction has been executed.

According to another aspect the computer-implemented method further comprises: causing, based on the one or more items of user account data, the third-party processor to execute the transaction with the external user account; and communicating, to the external application, an indication that the transaction has been executed.

According to yet another aspect the computer-implemented method further comprises: by the one or more hardware processors executing program instructions: determining, based on the comparing, that the external application is not authorized to initiate the transaction, wherein the authorization indication indicates that the external application is not authorized to initiate the transaction.

According to another aspect, the one or more transaction details and the unique token identifier were communicated to the third-party processor from the external user account.

According to yet another aspect, the one or more transaction details include at least one of: an amount of the transaction or a frequency of the transaction.

According to another aspect, the electronic token further includes a history of transactions associated with the external application, and wherein the comparing further comprises comparing the one or more transaction details with the history of transactions.

According to yet another aspect the computer-implemented method further comprises: by the one or more hardware processors executing program instructions: generating a unique token identifier; associating the unique token identifier with the electronic token; communicating the unique token identifier to the external application; receiving an indication of a change to the one or more permissions; and updating the electronic token to reflect the change to the one or more permissions.

According to another aspect, the change to the one or more permission comprises a revocation of the electronic token, and wherein the computer-implemented method further comprises: by the one or more hardware processors executing program instructions: receiving, from a third-party processor: one or more transaction details related to a transaction, and the unique token identifier; identifying, based on the unique token identifier, the electronic token; comparing the one or more transaction details with the one or more permissions; determining, based on the comparing, that the external application is not authorized to initiate the transaction due to the revocation of the electronic token; and communicating, an indication that the external application is not authorized to initiate the transaction. 14. The computer-implemented method of Claim 1, wherein the account credentials include at least a username and a password associated with the user account.

According to yet another aspect, the one or more permissions include at least one of: an indication of an allowable frequency of transactions, an indication of an allowable amount of a transaction, an indication of a type of an allowable transaction, an indication of an allowable amount of transactions within a time period, or an indication of an allowable use of a transaction.

According to another aspect, the external application comprises at least one of: an application configured to run on a computing device of a user, or an application accessible via a computer device of a user.

According to yet another aspect, the one or more items of user account data includes at least: an account number, or a routing number.

According to another aspect the computer-implemented method further comprises: by the one or more hardware processors executing program instructions: securely storing the electronic token.

According to another embodiment, a computer-implemented method of authorizing electronic user account access is disclosed, the computer-implemented method comprising: by one or more hardware processors executing program instructions: receiving account credentials associated with a user account; receiving one or more permissions associated with the user account; receiving an indication of an external application associated with the one or more permissions; determining an external user account associated with the user account; determining a first-party application configured to interface with the external user account; instantiating a virtualized instance of the first-party application; authenticating, using the account credentials, the virtualized instance of the first-party application with the external user account to establish communication with the external user account; accessing, via the virtualized instance of the first-party application, one or more items of user account data associated with the user account; communicating, to a third-party processor: the one or more items of user account data, the one or more permissions, and the indication of the external application; causing the third-party processor to: generate an electronic token including: the one or more items of user account data, the one or more permissions, and the indication of the external application; generate a unique token identifier; associate the unique token identifier with the electronic token; and communicate the unique token identifier to the external application; receiving, from the external application: one or more transaction details associated with a transaction, and the unique token identifier; and causing the third-party processor to further: identify, based on the unique token identifier, the electronic token; compare the one or more transaction details associated with the transaction with the one or more permissions; determine, based on the comparing, that the external application is authorized to initiate the transaction; execute the transaction by interaction with the external user account; and communicate, to the external application, an indication that the transaction has been executed.

According to an aspect the computer-implemented method further comprises: by the one or more hardware processors executing program instructions: receiving an indication of a change to the one or more permissions, wherein the change to the one or more permission comprises a revocation of the electronic token; causing the third-party processor to further: update the electronic token to reflect the change to the one or more permissions; receiving, from the external application: one or more transaction details related to a second transaction, and the unique token identifier; and causing the third-party processor to further: identify, based on the unique token identifier, the electronic token; compare the one or more transaction details associated with the second transaction with the one or more permissions; determine, based on the comparing of the one or more transaction details associated with the second transaction with the one or more permissions, that the external application is not authorized to initiate the transaction due to the revocation of the electronic token; and communicate, to the external application, an indication that the external application is not authorized to initiate the transaction.

According to yet another embodiment, a computer system is disclosed comprising: one or more computer-readable storage devices configured to store a plurality of computer executable instructions; and one or more hardware computer processors in communication with the one or more computer-readable storage devices and configured to execute the plurality of computer executable instructions in order to cause the computer system to: receive, from a first computing device, a request for data associated with a user, the request including authentication credentials associated with the user; identify an institution associated with the request; instantiate a simulated instance of a software application associated with the institution, wherein: the simulated instance of the software application is configured to interface, via an API, with a second computing device that is associated with the institution, and the simulated instance of the software application is configured to appear, from the perspective of the second computing device, to be the software application executing on a physical computing device of the user; request, by the simulated instance of the software application and via the API, data associated with the user from the second computing device; receive the data associated with the user from the second computing device; and provide, to the another computing device, the data.

According to an aspect, the one or more hardware computer processors are configured to execute the plurality of computer executable instructions in order to further cause the computer system to: authenticate the simulated instance of the software application with the second computing device based on at least one of: an identifier code, an authentication token, or a Media Access Control (MAC) address.

According to another aspect, the authentication credentials associated with the user include at least a username associated with the user, and a password associated with the user; and requesting the data associated with the user further includes providing, to the second computing device, the username associated with the user and the password associated with the user.

According to yet another aspect, the one or more hardware computer processors are configured to execute the plurality of computer executable instructions in order to further cause the computer system to: further request, by the simulated instance of the software application and via the API, the data associated with the user from the second computing device by: receiving, from the second computing device, a request for second factor authentication information; requesting, from the first computing device, the second factor authentication information; receiving, from the first computing device, the second factor authentication information; and providing, to the second computing device, the second factor authentication information.

According to another aspect, the one or more hardware computer processors are configured to execute the plurality of computer executable instructions in order to further cause the computer system to: augment, based on an analysis of the data, a plurality of data items of the data with respective category labels; and augment, based on a further analysis of the data, the plurality of data items of the data with respective geolocation information.

According to yet another aspect, the one or more hardware computer processors are configured to execute the plurality of computer executable instructions in order to further cause the computer system to: standardize a format of the data such that the data may be provided in the normalized format.

According to another aspect, the simulated instance of the software application is generated based on at least one of: an analysis of an actual instance of the software application, or interactions between an actual instance of the software application and the second computing device.

According to yet another aspect, the one or more hardware computer processors are configured to execute the plurality of computer executable instructions in order to further cause the computer system to: store, in the one or more computer-readable storage devices, the simulated instance of the software application such that future requests for data may be obtained via the simulated instance of the software application.

According to another aspect, the another computing device is the first computing device.

According to yet another aspect, the another computing device is a third computing device different from the first computing device and the second computing device, wherein the third computing device is associated with a trusted third-party processor system.

According to yet another embodiment a computer-implemented method of providing user account data is disclosed, the computer-implemented method comprising: by one or more hardware processors executing program instructions: receiving, from a first computing device, information associated with an authorization request, wherein the information includes at least: account credentials associated with one or more user accounts; generating at least: an electronic record of the information, and a token associated with the electronic record; providing the token to the first computing device; receiving, from a second computing device, at least: the token, and a request for user account data associated with at least one of the one or more user accounts; and providing, to the second computing device and based on the account credentials, user account data associated with the at least one of the one or more user accounts.

According to an aspect, the computer-implemented method further comprises: by the one or more hardware processors executing program instructions: verifying authorization to access the user account data based on the token.

According to another aspect, the computer-implemented method further comprises: by the one or more hardware processors executing program instructions: providing, to the first computing device, a request for additional information.

According to yet another aspect, the additional information includes at least one of: multi-factor authentication information, a selection of a user account of a plurality of user accounts, or an indication of agreement to a document.

According to another aspect, the computer-implemented method further comprises: by the one or more hardware processors executing program instructions: receiving, from the first computing device, a response to the request for additional information, wherein the user account data is not provided to the second computing device until after the response is received.

According to yet another aspect, the information further includes at least one of: an indication of an external application, or an indication of an entity associated with the second computing device.

According to another aspect, the second computing device is configured to provide the user account data to a computing device associated with the external application.

According to yet another aspect, the computer-implemented method further comprises: by the one or more hardware processors executing program instructions: receiving a request to deauthorize access to the user account data by the external application; and in response to the request to deauthorize access, revoking the token or access to the user account associated with the token.

According to another aspect, the information further includes one or more permissions.

According to yet another aspect, the computer-implemented method further comprises: by the one or more hardware processors executing program instructions: in response to receiving the request for user account data, determining, based on the one or more permissions, an authorization of an external application to access the user account data.

According to another aspect, the first computing device includes program instructions that, when executed by a processor of the first computing device, cause the first computing device to provide the token to the second computing device.

According to another embodiment a computer-implemented method of providing user account data is disclosed, the computer-implemented method comprising: by one or more hardware processors executing program instructions: receiving, from a first computing device, a token associated with an authorization request, wherein the token is further associated with an institution, an external application, and a user account held by the institution; receiving a request for user account data from a second computing device, wherein the second computing device is associated with the external application; providing, to a computing device associated with the institution: the token, and a request for user account data associated with the user account; and receiving user account data from a computing device associated with the institution.

According to an aspect, the token is received from a computing device associated with the institution.

According to another aspect, the token is received from the first computing device.

According to yet another aspect, the token is generated by a computing device of the institution based on account credentials provided via the first computing device to a computing device associated with the institution.

According to another aspect, the computer-implemented method further comprises: by the one or more hardware processors executing program instructions: providing, to the first computing device, instructions to provide the account credentials to a computing device associated with the institution.

According to yet another aspect, the token is used by the institution to authorize access to the user account data based on account credentials associated with the token.

According to another aspect, the computer-implemented method further comprises: by the one or more hardware processors executing program instructions: providing a unique identifier associated with the token to a computing device associated with the external application, wherein the request for user account data includes the unique identifier.

According to yet another aspect, the unique identifier associated with the token is provided to the computing device associated with the external application by at least: providing a public token or key to the computing device associated with the external application; receiving, from the computing device associated with the external application, authentication information including the public token or key, a secret key, and an identifier associated with the external application; and verifying the validity of the authentication information.

According to another aspect, the second computing device is configured to provide the user account data to the first computing device.

According to yet another aspect, the computer-implemented method further comprises: by the one or more hardware processors executing program instructions: receiving a request to deauthorize access to the user account data by the external application; and in response to the request to deauthorize access, revoke the token or access to the user account data associated with the token.

According to another aspect, the information further includes one or more permissions.

According to yet another aspect, the computer-implemented method further comprises: by the one or more hardware processors executing program instructions: in response to receiving the request for user account data, determining, based on the one or more permissions, an authorization of the external application to access the user account data.

According to another aspect, the computer-implemented method further comprises: by the one or more hardware processors executing program instructions: providing the user account data to at least one of: the second computing device, or a computing device associated with a trusted third-party transaction processor.

According to yet another embodiment a computer-implemented method of providing user account data is disclosed, the computer-implemented method comprising: by one or more hardware processors executing program instructions: providing, to a first computing device associated with an institution, information associated with an authorization request, wherein the information includes at least: account credentials associated with one or more user accounts; receiving, from the first computing device, a request for additional information, wherein the additional information includes at least one of: multi-factor authentication information, a selection of a user account of a plurality of user accounts, or an indication of agreement to a document; receiving, from a computing device associated with the institution, a token associated with the institution, an external application, and at least one of the one or more user accounts; and providing the token to a second computing device.

According to an aspect, the computer-implemented method further comprises: by the one or more hardware processors executing program instructions: rendering a graphical user interface; and receiving, via the graphical user interface, the account credentials, wherein the account credentials are securely received and provided to the first computing device and are not accessible by the second computing device or the third computing device.

According to another aspect, the information further includes at least one of: an indication of an external application, or an indication of an entity associated with the second computing device.

According to yet another aspect, the computer-implemented method further comprises: by the one or more hardware processors executing program instructions: receiving, from a third computing device associated with the external application, user account data associated with the at least one of the one or more user accounts.

According to another aspect, the computer-implemented method further comprises: by the one or more hardware processors executing program instructions: receiving, from a computing device associated with a trusted third-party transaction processor, user account data associated with the at least one of the one or more user accounts.

According to another embodiment a computer-implemented method of interacting with a user account is disclosed, the computer-implemented method comprising: by one or more hardware processors executing program instructions: receiving, from a first computing device, information associated with an authorization request, wherein the information includes at least: account information associated with a user account that is associated with an institution, and an identifier associated with an external application; generating at least: an electronic record of the information, and a token associated with the electronic record; causing at least one of a unique identifier associated with the token or the token to be provided to a second computing device, wherein the second computing device is associated with the external application; receiving, from the second computing device, at least: the at least one of the unique identifier associated with the token or the token, and a request to cause a transaction related to the user account to be executed; and initiating the transaction via communication with a third computing device, wherein the third computing device is associated with the institution or another institution or transaction processor.

According to an aspect, the at least one of the unique identifier associated with the token or the token is provided to the second computing device via the first computing device.

According to another aspect, the at least one of the unique identifier associated with the token or the token is provided to the second computing device directly.

According to yet another aspect, the computer-implemented method further comprises: by the one or more hardware processors executing program instructions: verifying authorization to cause the transaction to be executed based on the at least one of the unique identifier associated with the token or the token.

According to another aspect, the information further includes one or more permissions.

According to yet another aspect, the computer-implemented method further comprises: by the one or more hardware processors executing program instructions: in response to receiving the request to cause the transaction related to the user account to be executed, determining, based on the one or more permissions, an authorization of the external application to cause the transaction related to the user account to be executed.

According to another aspect, the computer-implemented method further comprises: by the one or more hardware processors executing program instructions: providing an indication to the second computing device whether or not there is an authorization of the external application to cause the transaction related to the user account to be executed.

According to yet another aspect, the information further includes at least one of: an indication of the external application, or an indication of the institution.

According to another aspect, the computer-implemented method further comprises: by the one or more hardware processors executing program instructions: receiving a request to deauthorize execution of transactions related to the user account by the external application; and in response to the request to deauthorize execution of transactions, revoking the at least one of the unique identifier associated with the token or the token.

According to yet another aspect, the computer-implemented method further comprises: by the one or more hardware processors executing program instructions: providing an indication to the second computing device whether or not execution of the transaction is successful.

According to another aspect, the account information associated with a user account includes at least one of: an account number, or a routing number.

According to yet another aspect, the generating is performed in response to a request received from a computing device associated with the external application.

According to yet another embodiment a computer-implemented method of providing user account data is disclosed, the computer-implemented method comprising: by one or more hardware processors executing program instructions: receiving, from a first computing device associated with an external application, an authorization request including an indication of a user account; receiving, from a second computing device associated with an institution, information associated with the user account held by the institution; providing at least a portion of the information associated with the user account to a third computing device associated with a third-party transaction processor; receiving a token associated with the institution, the external application, and the user account held by the institution; and providing at least one of a unique identifier associated with the token or the token to a computing device associated with the external application.

According to an aspect, the unique identifier associated with the token is provided to the computing device associated with the external application by at least: providing a public token or key to the computing device associated with the external application; receiving, from the computing device associated with the external application, authentication information including the public token or key, a secret key, and an identifier associated with the external application; and verifying the validity of the authentication information.

According to another aspect, the computing device associated with the external application is configured to send requests including the at least one of the unique identifier associated with the token or the token to a computing device associated with the third-party transaction processor.

According to yet another aspect, the token is received from a computing device associated with the third-party transaction processor.

According to another aspect, the token is received from a computing device associated with the institution.

According to yet another aspect, the token is generated by a computing device associated with the third-party transaction processor based on the portion of the information associated with the user account.

According to another aspect, the token or information associated with the token is used by the third-party transaction processor to authorize transactions related to the user account.

According to yet another aspect, the computer-implemented method further comprises: by the one or more hardware processors executing program instructions: receiving a request to deauthorize access to the user account by the external application; and in response to the request to deauthorize access, cause the token to be revoked or cause access to the user account associated with the token to be revoked According to another aspect, the token is further associated with one or more permissions.

According to yet another aspect, the computer-implemented method further comprises: by the one or more hardware processors executing program instructions: providing, to a fourth computing device, instructions to provide account credentials to the second computing device associated with the institution, wherein the information associated with the institution is received in response to the fourth computing device providing the account credentials to the second computing device.

According to another aspect, the computer-implemented method further comprises: by the one or more hardware processors executing program instructions: providing, to the fourth computing device, a request for additional information.

According to yet another aspect, the additional information includes at least one of: multi-factor authentication information, a selection of a user account of a plurality of user accounts, or an indication of agreement to a document.

According to another aspect, the computer-implemented method further comprises: by the one or more hardware processors executing program instructions: receiving, from the fourth computing device, a response to the request for additional information, wherein the portion of the information associated with the user account is not provided to the third computing device until after the response is received.

According to yet another aspect, the portion of the information associated with a user account includes at least one of: an account number, or a routing number.

According to another aspect, the computer-implemented method further comprises: by the one or more hardware processors executing program instructions: requesting, from the second computing device associated with the institution, the information associated with the user account held by the institution by at least: instantiating a simulated instance of a software application associated with the institution, wherein: the simulated instance of the software application is configured to interface, via an API, with a second computing device that is associated with the institution, and the simulated instance of the software application is configured to appear, from the perspective of the second computing device, to be the software application executing on a physical computing device of a user associated with the user account; and requesting, by the simulated instance of the software application and via the API, the information associated with the user account from the second computing device.

According to another embodiment a computer-implemented method is disclosed comprising: by one or more hardware processors executing program instructions: receiving, from a first computing device associated with an external application, at least: a request to execute a transaction, and account information associated with a user account that is associated with an institution; requesting, from a second computing device, at least an indication that the external application is authorized to cause the transaction to be executed; receiving, from the second computing device, the indication that the external application is authorized to cause the transaction to be executed; and initiating the transaction in response to receiving the indication.

According to an aspect, a token is also received from the first computing device.

According to another aspect, the token is generated by the second computing device and provided to the first computing device by the second computing device.

According to yet another aspect, the token is associated with the account information, the external application, and one or more permissions.

According to another aspect, requesting the indication that the external application is authorized to cause the transaction to be executed includes sending the token to the second computing device, and wherein the second computing device compares the request with the permissions associated with the token.

According to yet another aspect, the transaction via communication with a third computing device, wherein the third computing device is associated with the institution or another institution or transaction processor.

According to another aspect, the account information includes at least one of: an account number, or a routing number.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

In addition, some embodiments described herein reference a data management platform (or, more generally, a "computing system") including at least a memory and a processor. The memory stores a set of instructions and a database. When the instructions are executed by the processor, the processor instantiates three interfaces for communicating and/or interacting with three separate remote systems, devices, and/or software applications. In particular, in one embodiment, a first interface is instantiated for interacting with a software application (e.g., a user client), a second interface is instantiated for interacting with a remote data source server (e.g., a financial institution system), and a third interface is instantiated for interacting with a third-party server.

In this example, the three interfaces facilitate communication between the third-party server, the remote data source server, and the software application. In one example, the mutually trusted data management platform is configured to receive, via the first interface, a credential to access a remote data source server of an institution such as a financial institution, a utility, or a service provider. Typically, the credential includes a username and password manually input to a graphical user interface presented by the software application. Once the mutually trusted data management platform receives the credential, the remote data source server is accessed in order to obtain a set of data corresponding to the credential (e.g., financial data). Thereafter, the obtained data can be stored in the database of the mutually trusted data management platform.

In some embodiments, the mutually trusted data management platform is also configured to receive a request from the third-party server for one or more types of data that were obtained from the account server and stored in the database of the mutually trusted data management platform. Once the request is received, the mutually trusted data management platform may be configured to submit a request to the software application for permission to provide a subset of the stored data that corresponds to the requested private data type. If permission is received, the subset of data can be submitted to the third-party server, typically across an encrypted channel established by the third interface. In other cases, an operator of the software application can review and/or modify the subset of data prior to providing permission to submit the modified subset of data to the third-party server. In other variations, access is regulated and selectively permitted by the data management platform, possibly without requesting user input from the software application.

As mentioned above, according to various embodiments systems are disclosed for securely and efficiently obtaining user account data via instantiation of virtualized or simulated instances of first-party software applications. For example, the systems of the present disclosure include generation of proxy, virtualized, or simulated instances of software applications that are configured to interface with external systems via public or non-public (e.g., proprietary) application programming interfaces (APIs). The virtualized or simulated instances of the software applications may be authenticated with the external systems as if the virtualized/simulated instances are actually first-party software applications executing on a user computing device. Via the public/non-public APIs user account information may be obtained and processed, such that the data may be normalized and provided to other software systems via a normalized API of the system. Accordingly, the systems of the present disclosure may be significantly more efficient at obtaining user account data from external systems than previous techniques. Further, the user account data may be normalized and provided via a normalized API, enabling others to efficiently access such data (originally obtained from multiple external systems) from a single standardized interface in a highly efficient manner.

As also mentioned above, embodiments of the present disclosure also relate to systems (e.g., a permissions management system) and techniques for enabling a user to securely authorize a third-party system to initiate transactions related to an account, without disclosing to the third-party system the account credentials (e.g., an identity of the account). Such transactions may include, for example, initiating an electronic payment, or the like. Further, the systems and techniques of the present disclosure may enable the user to securely de-authorize the third-party system from initiating transactions related to the account. The disclosure includes, in some embodiments, automatic generation of electronic records that securely store account information. In some implementations the electronic records may include one or more permissions related to the account and the third-party. A token (e.g., a unique identifier associated with the electronic record, also referred to herein as a "unique record identifier") may be shared with the third-party system, but neither the electronic record itself, nor the user account credentials, may be shared with the third-party. Accordingly, the third-party (e.g., a merchant system or a software application developed by a developer) may request user account data and/or initiate transactions by providing the token, but does not itself know, e.g., account number, etc. Further, in some implementations the user may set various permissions related to the token/electronic record, and may also revoke permissions associated with the token/electronic record (e.g., de-authorize the third-party), thus providing increased security to the user's account. The disclosure further includes various interactive user interfaces to facilitate the above-described functionality.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Definitions

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

Permissions Management System (also referred to as or related to the data management platform): A computing system, the functionality of which is described in detail in the present disclosure. Functions of the permissions management system (which are described in further detail below) include, but are not limited to: accessing and/or extracting user account data from external user account systems; initiating execution of, or executing, transactions via external user account systems; generating secure electronic records and tokens (e.g., unique identifiers associated with the electronic records) based on user account data; enabling permissioning of access to, and execution of transactions on, user accounts on the user account systems; enabling revocation of permissions for, or de-authorization of, access to user accounts on the user account systems; and/or enabling revocation of permissions for, or de-authorization of, rights to execute transactions via user accounts on the user account systems. One or more of these functionalities may be implemented via the permissions management system, as described below, and may be accessible to customers via a standardized application programming interface (API). Accordingly, a customer may access any of the functionality of the permissions management system (including, e.g., accessing user account data, permissioning access to user account data, etc.), via the standardized application programming interface (API).

External User Account System: A computing system or service of an external institution. For ease of description, general references herein to external institutions (or more simply "institutions") may be understood to refer to the external user account systems of those institutions. Accordingly, external user account systems may also be referred to herein as "external institution system," "external bank systems," "bank systems," "banks," "institutions," "external services," and/or the like. As described below, external user account systems may provide public and/or non-public (e.g., proprietary) application programming interfaces (APIs) by which user account data may be accessed by first-party software applications (e.g., mobile device software applications) of the external institutions. However, as further described below, the system of the present disclosure may enable access to user account data via such public/non-public APIs of the external user account systems by, e.g., instantiating virtual and/or proxy instances of the first-party software applications of the external institutions. External user accounts may also be referred to herein as "user accounts."

External Institution: An entity that maintains a user account. Examples of external institutions (also referred to herein as "institutions") include, but are not limited to, banks, credit card providers, investment services, loan providers, and/or other suitable financial institutions or user account holding institutions.

Application Programming Interface (API): A set of routines, protocols, and/or tools for building a software application. Generally an API defines a standardized set of operations, inputs, outputs, and underlying types, such that functionality is accessible via the API in an efficient way. The system provides an API by which a customer may access any of the functionality of the system, as described herein. Accordingly, the system advantageously abstracts away (from a customer's perspective), much of the complexity that may be involved in the functionality of the system, and enables the customer to quickly and efficiently leverage the functionality of the system to build other systems and services. The format of an API is generally described herein as it may be implemented in a REST API, but the protocol and medium of an API can be any suitable variation such as a GraphQL API, Simple Object Access Protocol (SOAP), Remote Procedure Call (RPC), and/or any suitable type of protocol.

Customer: One who makes use of the API of the system to access functionality of the system in a software application of the customer, as described herein. Customers of the system may include, but are not limited to, software developers (who may be developing, e.g., a software application such as a store, or mobile app), third-party processors (e.g., third-party payment processors), external institutions, merchants, and/or the like.

External User-Facing System/Application: A software application and/or computing system of a customer (e.g., developed by a customer) that interacts with the system via the API of the system. Examples of external user-facing systems/applications include, but are not limited to, desktop software applications, mobile device software applications, server software applications, and/or the like. In general, external user-facing systems/applications provide goods or services to a user. In some instances, for ease of description, such software applications may be referred to herein as "apps." Additionally, external user-facing systems/applications may also be referred to herein as "developer systems," "developer computing devices," and/or the like. Examples of external user-facing systems/applications include apps for payment processing, account data review/analysis, budgeting, account monitoring, providing recommendations for savings, etc.

Third-Party Processor: An entity that processes transactions, e.g., financial transactions for a merchant. When provided with account information (e.g., credit/debit card information, bank account information, etc.) and payment information (e.g., how much to pay, to whom, and when, etc.), executes and processes a transaction. In some implementations, the system may interact with one or more third-party processor systems to execute and/or process payments. Alternatively, the system may include functionality to process transactions, and thus may effectively act as its own "third-party" processor (thus, "third-party" is somewhat of a misnomer in this context, but the term "third-party" is used in the present disclosure for clarity purposes). Third-party processors may be referred to herein as "trusted" third-party processors, because in some implementations the third-party processor is entrusted with user account data that, for example, an external user-facing system/application is not. Third-party processors may be referred to herein as "third-party transaction processors." As used herein, the term "transactions" may include any of various types of activities related to accounts, including but not limited to: financial transactions (e.g., ACH transfers, credit card transactions, debit card transactions, other types of payments or money transfers, etc.), updating account information, setting up alerts, etc. The system may additionally enable various other types of activities (e.g., updating account information, requesting services, etc.) that in some instances may be referred to herein as executing transactions, and/or the like.

User: A holder of a user account at an external institution. In general, a user maintains account credentials for accessing their user account, and provides authorizations and/or de-authorizations for an external user-facing system/application of a customer (e.g., an "app" of a developer) to limitedly and securely access the user account (e.g., to initiate payments for goods or services). Such authorizations and/or de-authorizations (among other functionality) are enabled by the system and via the API of the system, as described herein. Advantageously, according to some embodiments, the user's account credentials are never accessible to the external user-facing system/application. Rather, the system may securely enable the user to indicate authorizations and/or de-authorizations, without revealing the account credentials outside of the system (and/or trusted entities of the system, such as a trusted third-party processor).

User Input (also referred to as "input."): A person's (e.g., a user or customer) interactions with a computing system, such as any type of input provided by a user/customer that is intended to be received and/or stored by the system, to cause an update to data that is displayed and/or stored by the system, to cause an update to the way that data is displayed and/or stored by the system, and/or the like. Non-limiting examples of such user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Method for Managing Access to Financial Records

As shown in FIG. 1, a method S100 for secure permissioning of access to user accounts and the secure distribution of aggregated user account data can include generating a user account report of a user account S110, receiving an account report request from a first third-party system S120, sharing a report token to the first third-party system S130, providing the first third-party system access to the user account report through the report token S140, which functions to enable outside entities to access financial report information of a user.

The initial report token may be used for accessing the report. The report token may alternatively serve as an audit token. As an additional or alternative variation, the report token can be shared with a second third-party system and then provided by the second third-party system in order to confirm authorization to the report and integrity of the report. For example, the report token may serve as an audit token, in the event where a user account report is shared by the first third-party with a second third-part. The report token can accompany the report, and then the second third-party can use the report token to verify authenticity and integrity of the report.

Figure 2:
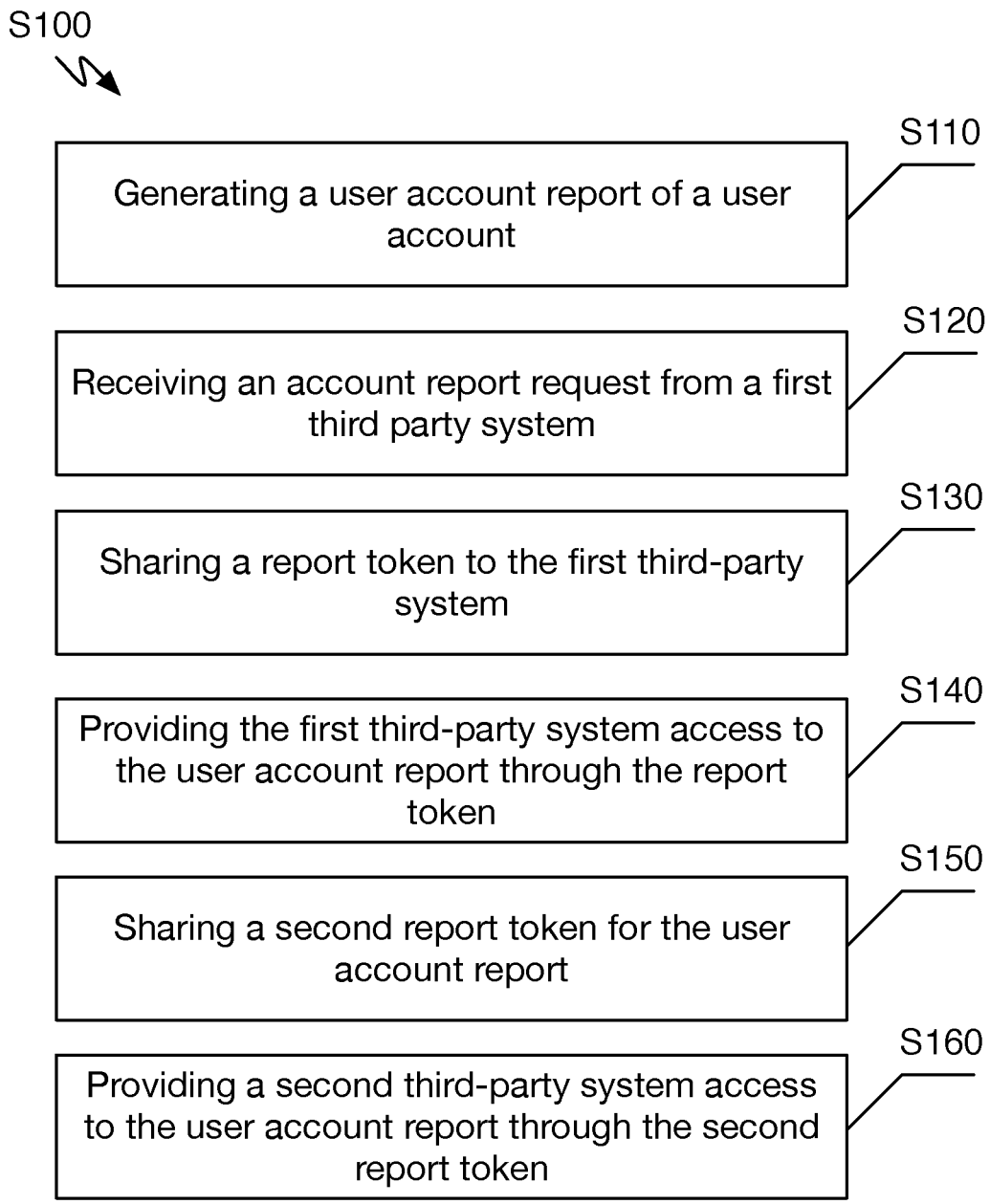
FIG. 2 is a flowchart illustrating a variation for providing access of aggregated user account data to a second third-party system.
Figure 3:
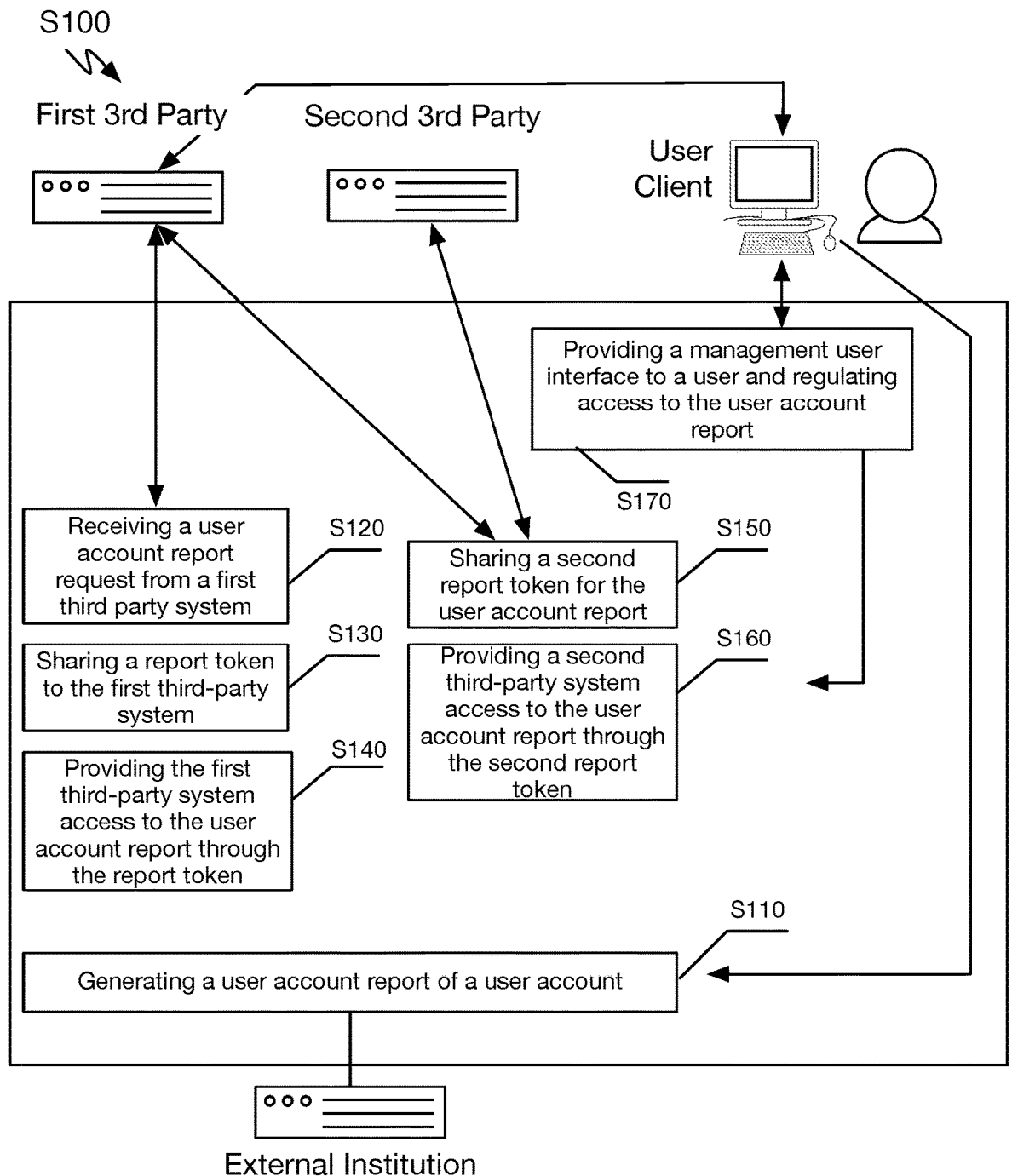
FIG. 3 is a schematic representation of a variation providing a management user interface.

Furthermore, as shown in FIG. 2, the method can include functionality to manage shared access of a user account report wherein the method can include sharing a second report token for the financial report S150, and providing a second third-party system access to the user account report through the second report token S160. Additionally, the method may include providing a management user interface to a user and regulating access to the user account report S170 as shown in FIG. 3.

A user account report is preferably aggregated user account data from an external institution. In a preferred application, the external institution is a financial institution and the user account report is characterized as a financial report, wherein the method functions to manage access to financial records.

Accordingly, a variation of the method for managing access to financial records of a preferred embodiment may be more specifically described as including: generating a financial report of a user account S110, receiving a financial report request from a first third-party system S120, sharing a report token to the first third-party system S130, providing the first third-party system access to the financial report through the report token S140, which functions to enable outside entities to access financial report information of a user. Furthermore, the method can include functionality to manage shared access of a financial report wherein the method can include sharing a second report token for the financial report S150, and providing a second third-party system access to the financial report through the second report token S160. Additionally, the method may include providing a management user interface to a user and regulating access to the financial report S170.

The method can be applied to secure distribution of any suitable aggregated user account data. The descriptions provided herein in reference to a financial report does not limit the method to use with financial reports and it will be apparent to one skilled in the art that the method described herein can be modified, adjusted, or otherwise adapted to other types of user account data in place of or in addition to financial reports such as medical records, personal data, and the like.

The financial report is preferably an asset report composed from aggregated financial data of a user account obtained from a financial institution server. The financial report will preferably include account/user information, historical transaction information, financial account balances, historical daily account balances, and/or any suitable related information. The first third-party system in some uses cases is part of a loan management system of a lender. The second third-party system may be another loan management system of a second lender, a computing system of an auditor, and/or any suitable system of another entity.

The method S100 is preferably implemented in connection with the system described herein. Primarily, the method is described as it may be implemented by a data management platform that interfaces with one or more external financial data sources. One or more financial data sources may be part of the data management platform such as when the method is implemented by a banking system.

The method S100 is primarily described herein as it applies to one or two third-party systems, but the method may be extended so that any number of third-party systems can be permitted access to the financial report through the use of multiple, distinct secondary token.

The method S100 is additionally described as it can be used for one user. However, the method can be implemented in multiple instances across a data management platform for one or more users. Often in a loan approval process, a user would need to provide access to multiple sources of financial data. Accordingly, the method may be implemented such that a user can be permitted to authenticate multiple financial user accounts through the data management platform such that multiple financial records can be accessed (or alternatively a single compiled financial record can be created). Additionally, within a data management platform, the method is preferably implemented such that multiple instances of the method can be performed across multiple users and third-parties.

The method S100 is preferably facilitated through a sequence of application programming interface (API) communications between various computer systems. The API is primarily described herein as a RESTful API, but any suitable type of API such as a graphQL, Simple Object Access Protocol (SOAP), Remote Procedure Call (RPC), and/or any suitable type of protocol.

Detailed description of various aspects of this method are additionally described herein, which may be used in combination with the method S100 or separately.

Block S110, which includes generating a financial report of a user account, functions to grant the data management platform access to private financial data of a user. The financial report is preferably a presentation of data based on data from at least one point in time. In other words, once created, the financial report preferably remains the same regardless of when it is accessed. Though some variations may enable processes through which the financial report can be refreshed. The original data is preferably obtained from a financial institution such as a checking or saving account at a bank or a credit card account. In one variation, a financial report corresponds to one account at a financial institution. In some variations, data may be obtained from multiple accounts and/or financial institutions, and the data can be compiled into a single financial report.

Generating a financial report preferably includes authenticating a user account, accessing financial data, and creating the financial report.

Authenticating a user account on an external system of a financial data source, functions to verify identity of a user with the indicated user account of the financial institution. The user will generally have a financial system user account that is independent of a user account at the third-party system. The financial system user account preferably has user credentials and various authentication mechanisms (e.g., two-factor authentication, authentication tokens, security questions, and the like). The user credentials are preferably received and/or directed to the financial data source to obtain access to the financial system user account.

As one variation, block Silo can include receiving user credentials through a proxy service configured to interface with and access data from the financial data source. The user credentials are preferably received through a second client, which is preferably distinct from a client or computing system of the first third-party system.

In one variation, a user may establish a connection between the data management platform and the financial data source through a separate application. In another variation, a user can establish a connection between the data management platform and the financial data source from an iframe widget/application embedded within an application of the third-party system. The embedded application is preferably sandboxed such that the third-party system does not have access to the user credentials. A user interface can be provided to facilitate selection of a financial institution and collection of user credentials, completion of follow-up authentication steps (e.g., two factor verification).

Preferably, an application proxy system may be employed by the data management platform to facilitate completing authentication of an external financial user account with a financial institution system and accessing private data of the financial user account. Depending on the financial institution, the method may include accessing through a provided programmatic interface (e.g., a bank account API) or by emulating user interface access of the financial institution system. Various institution interface modules can be used in modeling an internal interface of an application with access to the financial institution.

Figure 4:
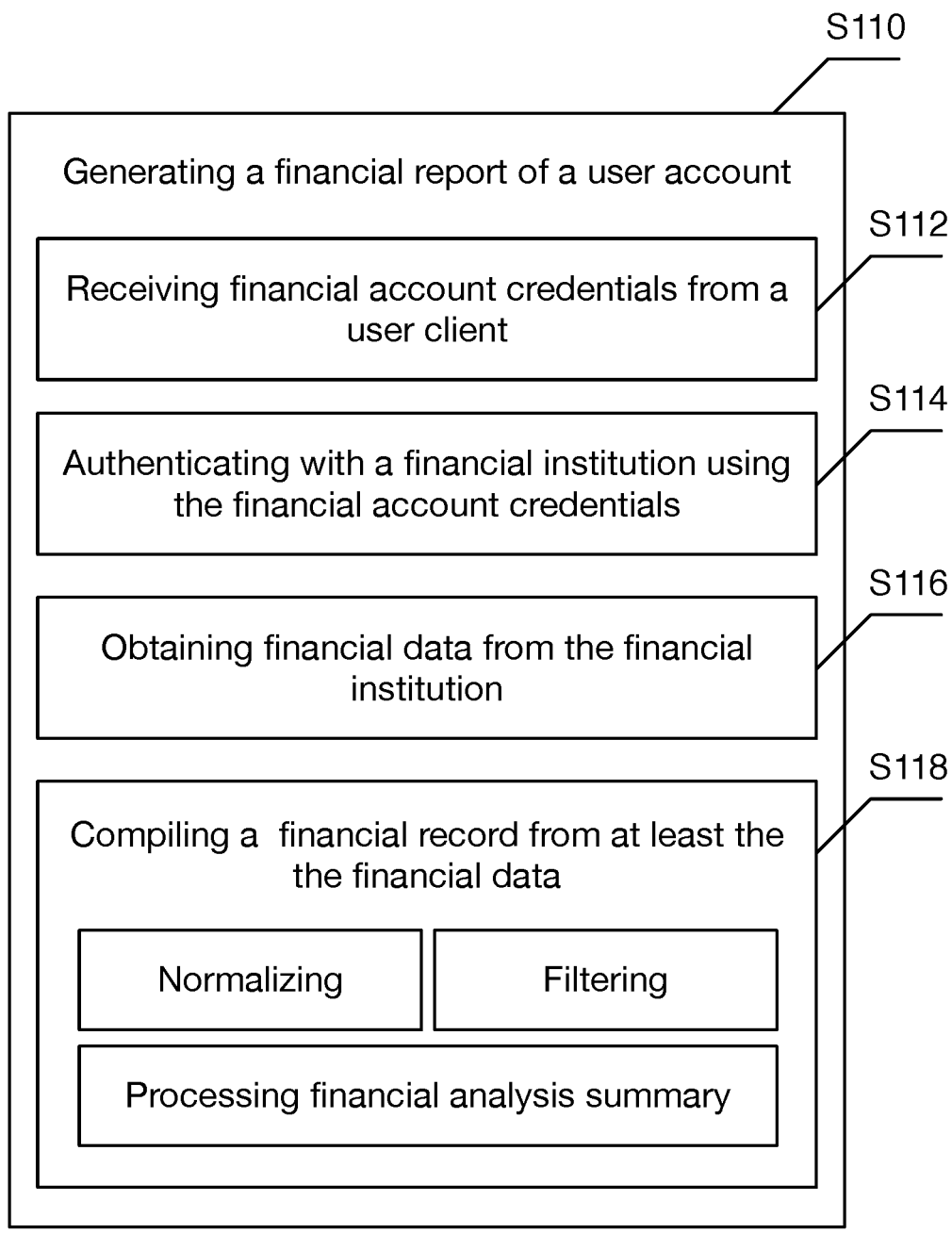
FIG. 4 is a detailed flowchart illustrating a variation for generating a financial report of a user account.

Accordingly, generating a financial report can include receiving financial account credentials from a user client S112, authenticating with a financial institution using the financial account credentials S114, obtaining financial data from the financial institution S116 and compiling a financial record from at least the financial data S118 as shown in FIG. 4. In some variations S112, S114 and S116 may be repeated multiple time for different financial user accounts of one or more financial institutions, and block S118 can include compiling one or more financial records from financial data from multiple financial user accounts. Blocks S114 and S116, in one variation, can include authenticating with the financial institution with a virtualized instance of a mobile device application; requesting, by the virtualized instance of the mobile device application and via a non-public API of the financial institution, the transaction data and account balance associated with the user account at the financial institution; and receiving the transaction data and account balance associated with the user from the external computing device of the external institution. The mode of access to a financial institution may additionally depend on the available institution interface module. Accordingly, based on the financial institution, an appropriate institution interface module can be selected.

As another variation, financial data may be directly accessible when the operator of the method is the holder of account financial data such as when a bank is facilitating access to a financial record. The banking system preferably authenticates permission from a user through some mechanism such as receiving banking credentials, by granting permission within an account management portal on the banking system, or through any suitable mechanism.

When authenticating a user account on an external system, the data platform preferably establishes the financial data source as an authenticated data channel associated with both a platform identifier of the user account and the first third-party. The third-party will preferably have initially registered with the data management platform and facilitates the sharing of their associated identifier. For example, when linking to financial accounts using an embedded application, the embedded application is supplied with the third-party identifier such that actions performed through the embedded application can be associated with and mapped to that third-party.

In one implementation, the process of a user authenticating their financial user account through a proxy service establishes an access token that is shared with a client of the third-party system. The access token can subsequently be communicated from the third-party system to the data management platform to establish permission of the data management platform to access the financial user account on behalf of requests of the third-party system.

Accessing financial data and creating the financial report functions to assemble the desired data and produce a digital resource that can be used in providing a financial report.

Accessing financial data functions to collect financial data from one or more financial user accounts. The financial data can be imported using a programmatic interface the financial institution if one exists. Alternatively, data can be obtained or scraped from reports, dashboards, data exports, and/or other sources of information.

The financial report preferably presents transaction data and/or account balances for a financial user account over a designated time period. The financial report preferably cleans the transaction data with category labels, locations, and merchant names. The financial report may additionally return account names and identity information, balances, historical daily balance information, historical transactions.

Creating the financial report preferably includes normalizing the financial data, which functions to clean the financial data and update it to a consistent format. Normalizing the financial data can address inconsistencies across different financial institution making it easier for the third-party system to process. Normalizing the financial data can include cleaning transaction and/or merchant names, mapping the original transaction record information to standard identifiers.

Creating the financial report may additionally include Consolidating, sanitizing, anonymizing, and/or otherwise altering representation of the raw private data. As one example, multiple transactions from similar types of merchants could be consolidated into a single transaction record to obscure behavior details of the user. Similarly, the merchant names could be converted to more generic placeholders.

Generating a financial report may additionally include filtering of financial data, which may be used in excluding various types of data. This may be used in providing a financial report that only represents a limited view of the full financial data. As one example, filtering financial data can include limiting the financial report to transaction data from within a specified time period such as the last 24 months. For example, a financial report configured for income verification may only compile information summarizing transaction data associated with income.

In some variations, creating the financial report may additionally include processing the financial data and providing one or more financial analysis summary. A financial analysis summary preferably functions as a higher level assessment or metric resulting from the financial data. A financial analysis summary may include one or more financial summary metrics, graphs, or datasets. It may be used as a supplementary property of the financial report, but could alternatively be used in place of some information. For example, a financial analysis summary could be used in place of individual transaction details. Various types of financial analysis summaries can be used. In one variation, the financial analysis can provide one or more risk measurements. In another variation, income can be measured by base income levels and/or separated by different income sources. In another variation, spending can be broken down into different categories of spending.

Creating the financial report may additionally include extracting account information such as name, address, location, duration of account, and/or other suitable type of data that is obtainable from the financial data source.

Accessing financial data and creating financial report is preferably performed in response to a financial report request from block S120. Alternatively, a financial report can be created in response to a user action. For example, a user may be permitted through a management user interface to manually initiate the creation of a financial report. The creation of a financial report is preferably performed in association with one or more third-party accounts who are permitted to access the report.

Block S120, which includes receiving a financial report request from a first third-party system, functions to initiate the establishment of a financial report. More specifically the financial report request is a creation request. The data management platform preferably initiates creation of a financial report for the relevant financial user accounts in response to a valid financial report request.

The financial report request is preferably received as a programmatic request received through an API. API requests from the third-party are preferably submitted from a computing system of the third-party system. More specifically a third-party client device makes the request. Alternatively, the financial report request can be received through a user interface provided to a user/administrator of the third-party.

The financial report request is preferably made with parameters indicating the requesting entity (e.g., the first third-party account ID and secret token), properties of the financial report such as the dates covered in the financial report, financial account identifiers, additional data to be added to the report (e.g., user information like legal name, SSN, contact information, and the like). The financial account identifiers may be supplied as access tokens generated in connection with establishing a link between the data management platform and a financial user account of the user. A set of financial account identifiers (e.g., access tokens) can be supplied, one for each financial data source to be included in the financial report. The request in some instance may indicate a callback URI (i.e., webhook URL) that the data management platform can call at appropriate times such as when the financial report is created and ready for access.

Internally, the data management platform will preferably initiate creation of the specified financial report, which can include accessing financial data and creating the financial report as described above.

In some variations, a new financial report can be generated from a prior financial report. In one variation, a request can be made to refresh an existing report. A financial report is a snapshot of a user's assets and financial status at a point in time and is preferably made immutable. Accordingly, the method may further include receiving an update request in association with the financial report, which functions to refresh or update the financial report. The method preferably includes, in response to the update request, creating a new updated financial report updated based on new financial data and the original financial report request and sharing or otherwise returning an updated report token for the updated financial report.

The settings for the refreshed financial report can be substantially the same as the previous one. Though, a request may specify different parameters to override previous request parameters. In another variation, a request can be made to narrow an existing financial report to only include a subset of financial data by limiting included accounts, transactions, or other suitable information. As with above, a new financial report is preferably created in response to a filter request. The filter request will preferably indicate the financial report token and filter object (e.g., a list of financial user accounts to exclude). Accessing the resulting financial report and sharing of the refreshed financial report or filtered financial report is preferably substantially similar to the process described herein for a newly created financial report.

Block S130, which includes sharing a report token to the first third-party system, functions to supply the third-party system with a cryptographic key usable to access an associated financial report. Sharing a report token preferably includes establishing the report token and communicating the secondary report token to the first third-party system. A financial report identifier is preferably generated or otherwise assigned in connection with creating a financial report. Additionally, a report token is created or generated and uniquely associated with the financial report (and its identifier). The report token may additionally be uniquely associated with a third-party account identifier such that only that account identity can access the financial report using that specific report token. The report token may alternatively be associated with multiple third-party accounts. A database storing the relevant report token information (e.g., a mapping of a financial report identifier, report token, and third-party account identifier) is preferably updated to store a record of the report token accordingly.

Upon creating a report token, the report token is preferably communicated to the third-party system. Preferably, the report token is communicated in a communication response to the financial report request of block S120 as shown in FIG. 26.

The third-party system preferably stores the account identifier in a secure and persistent data store for subsequent access to the financial report.

In yet another variation, the report token may be used as an audit token that can be used in verifying integrity of the financial report. In some variations, a financial report may be shared along with the report token. The report token can serve as a mechanism whereby the integrity of the financial report can be verified. For example, a second third-party system could submit the audit token to the data management platform would could provide an indication of the integrity of the report such as by verifying the shared financial report includes the same information or at least the information is verified as being consistent with at least a portion of the user account data and report of the data management platform.

Block S140, which includes providing the first third-party system access to the financial report through the report token, functions to deliver or expose access to the financial report to the first third-party system.

Access is preferably provided once the financial report is completed. In one variation, a callback URI of the third-party system is called by the data management platform when the financial report is completed. In another variation, the third-party system polls the data management platform periodically to check for when the financial report is completed. Alternatively, a websocket or other mechanism may be used in establishing a connection between the third-party system and the data management platform when the financial report is prepared.

Accordingly, providing the first third-party access of one preferred variation includes sending a communication to a specified URI when the financial report is completed, receiving a financial report access request from the third-party system, and returning the financial report. As mentioned other approaches may be used in notifying the third-party system the financial report is completed. Herein, receiving a communication from the third-party system indicates that a communication (e.g., a HTIP/S message) is received including authentication credentials or cryptographic tokens indicating the originating client is understood to be acting on behalf of the third-party. The received financial report access request will preferably additionally include or reference a report token as shown in FIG. 27A. The report token is preferably validated as belonging to the associated third-party. In one implementation, the report token can be used to query a report token database, a retrieved report token can then be used to identify a financial report and verify access permissions for the associated third-party identity.

In one variation, the financial report can be created as a sharable media file such as a PDF, data export (e.g., csv, json, xml, and the like), or other suitable media file. The financial report access request may specify a media format of the financial report and the corresponding format of the financial report is returned. As shown in FIG. 27B, a json data representation of the financial report can breakout various properties such as account information, balances, historical balances, transactions, and the like.

As one additional or alternative variation, the financial report may be shared through a controlled user interface and not delivered as digital data object. The controlled user interface is preferably a financial report access user interface that functions to present the financial report within a controlled medium. Accordingly, providing the first third-party system access to the financial report through the report token can include receiving access request accompanied with the report token and presenting a financial report access user interface. Within the financial report access user interface, presenting the financial report may include presenting a static document representation. Alternatively, presenting the financial report can include rendering an interactive interface to the financial report, wherein findings of the financial report may be queried and explored in an interactive user interface. The controlled computing environment may limit the opportunity of a third-party to download the financial report and share the financial report outside of control of the data management platform. In some cases, the financial report access user interface may be a selectable option along with other sharable media file formats. In some cases, the format of access may be controlled by some other factor. For example, a secondary lender accessing a financial report using an audit report token may be limited to only the user interface format.

As mentioned, the method may additionally include sharing a second report token for the financial report S150 and providing a second third-party system access to the financial report through the second token S160, which functions to allow additional report tokens to be generated for specified third-party entities. The additional report tokens are preferably uniquely associated with third-party entity identifiers, which may functionally be account identifiers within the data management platform. The first third-party system will preferably request the creation of additional report tokens. In some variations, other third-party entities may additionally request additional report tokens to be generated once they have a report token. In some variations, permissions to create new report tokens may be limited in various ways.

Block S150, which includes sharing a second token for the financial report, functions to supply the second third-party system with a cryptographic key usable to access an associated financial report. Block S150 operates in a similar manner to block S120 and S130. Block S150 varies from S120 and S130 in at least the fact that the report token is requested for a new third-party.

Preferably, sharing the second token for the financial report includes receiving a secondary report token request from the first third-party system, establishing a secondary report token, and communicating the secondary report token to the first third-party system.

The secondary report token request is preferably a request to create a new secondary report token. The secondary report token request preferably includes an identifier of the second third-party entity. In some variations, the list of available second third-party entities is a limited set of authorized third-parties. For example, a second third-party entity could be "Fannie Mae" when sharing financial report for oversight compliance.

In some variations, a request for a secondary report token is not required. In one alternative variation, the secondary report token may be generated automatically in response to generating a financial report. For example, the original request to create the financial report may specify one or more secondary third-party entities for whom secondary report tokens are desired. In another variation, indication of various auditing requirements may preconfigure the data management platform to provide access to specified auditing bodies.

Establishing a secondary report token preferably involves creating a new report token. In a similar manner to the original report token, the secondary report token is uniquely associated with the financial report (e.g., via the financial report identifier) and uniquely associated with the second third-party such that only that an account of the second third-party can access the financial report using that specific secondary report token. The new report token may be noted as being a secondary report token. Alternatively, the secondary report token may not be explicitly distinguished from the original report token. For example, the same report token database may be used to store the report tokens.

The secondary report token is preferably communicated to the associated second third-party entity through an outside communication channel. However, in some variations, the secondary report token can be directly delivered to the second third-party. For example, the secondary report token can be added to a repository of report tokens along with some identifying information. The second third-party may be notified of the newly added report token. In another variation, a callback URI is supplied (e.g., with the request for creating a secondary report token or by the second third-party when registering as a third-party account), and the secondary report token is delivered to the callback URI. If the callback URI is addressed to the second third-party system, then the second third-party entity is directly communicated the secondary report token.

The secondary report token may alternatively be referred to as an audit token but uses of the secondary report token are not limited to audits. For example, other lenders may be given access to original financial reports when evaluating taking over a loan.

Block S160, which includes providing a second third-party system access to the financial report through the second token, functions to deliver or expose access to the financial report to the second third-party system. Block S160 is preferably substantially similar to block S140 and many of the variations of block S140 may apply to S160.

Often the financial report is already created when a second third-party system is provided with a secondary report token to access the financial report. If the financial report is not created, a mechanism similar to one used in block S140 may be used in notifying the first and/or second third-party when the financial report is available.

Similar to block S140, block S160 may include receiving a financial report access request from the second third-party system, and returning the financial report. This second financial report access request is preferably sent from the second third-party system and is authenticated as being from the second third-party account. The financial report access request can additionally include the secondary report token, which is verified as mapping to the financial report and the second third-party account. The format of the financial report may similarly be requested.

Alternatively, providing the second third-party system access to the financial report through the secondary report token can include receiving access request accompanied with the secondary report token and presenting a financial report access user interface.

Block S170, which includes providing a management user interface to a user and regulating access to the financial report, functions to give users a mechanism to oversee by whom their financial report is handled. While the initial sharing of a financial report with the first third-party is typically understood by the user, subsequent actions taken with a financial report, especially when performed through traditional means, are often not exposed to the end user. Block S170 provides a variety of mechanisms by which a user can view activity related to their financial reports and/or take actions to express some measure of control over the financial report.

In one variation of block S170, regulating access to the financial report can includes providing access history of the financial report, which functions to provide an audit of access requests and instances of a third-party accessing the financial report. The access history is preferably presented within the management user interface along with details such as the time of the event along with third-party information. A user can review with whom the financial report has been shared.

In an additional or alternative variation of block S170, regulating access to the financial report can include receiving access permissions through the management user interface and permitting access to the financial report in accordance with the access permissions.

Permitting access to the financial report in accordance with the access permissions can include limiting who can access a financial report, when a financial report can be accessed, who can create new report tokens for other third-parties, who can view particular information within a financial report, and/or other regulating actions. The setting of access permissions can be performed pre-emptively within a management user interface. For example, a user may select an option to limit the sharing of the financial report with secondary third-parties.

Figure 29:
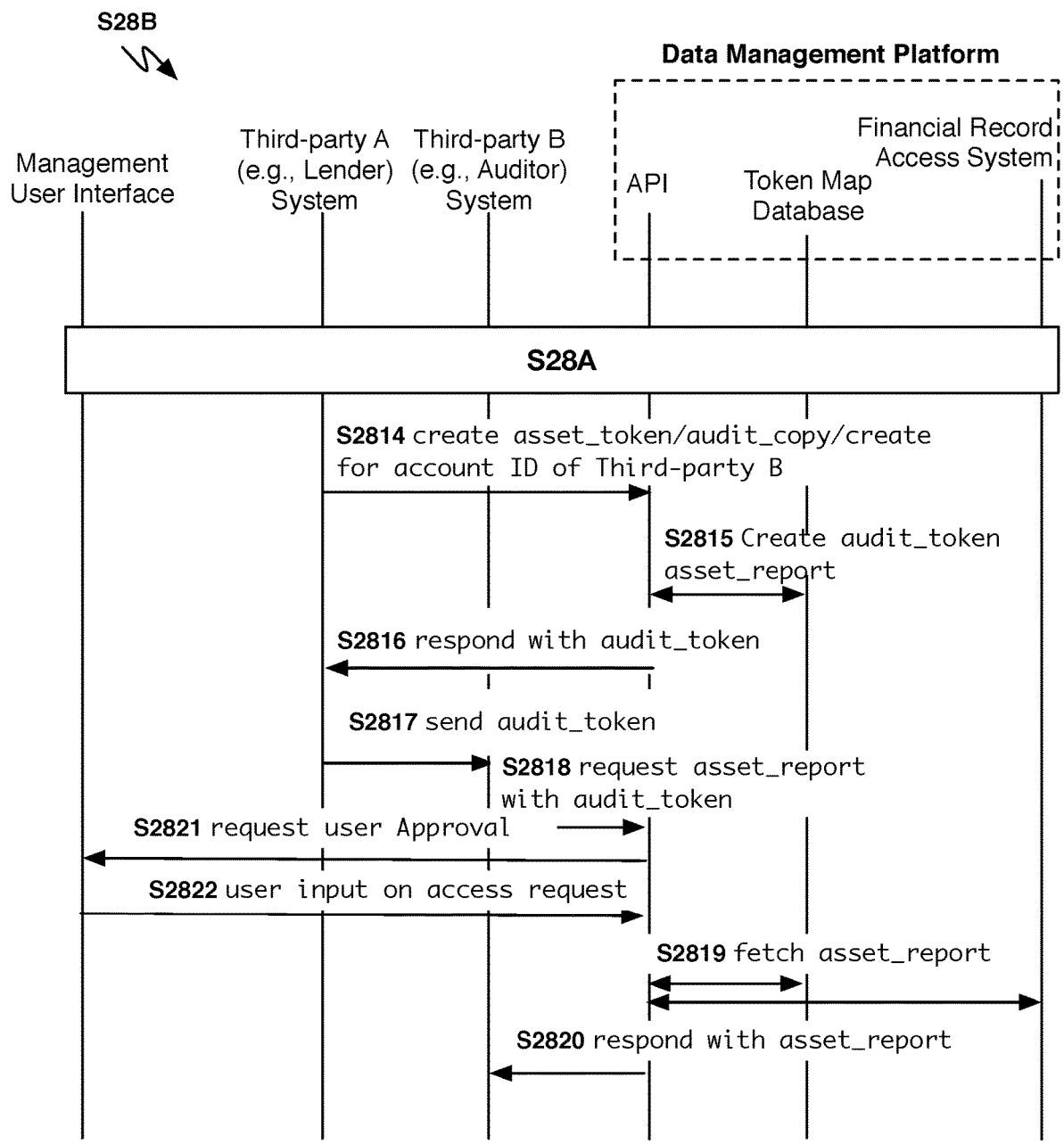
FIG. 29 is a variation of a communication flowchart requesting user input.

Additionally, settings for access processing is managed within the data management platform can be configured. In one example, initial access to the financial report by a new third-party may be permitted in response to input by the user. Response input by a user may alternatively be configured as default functionality as shown in FIG. 29 S2821 and S2822.

In one variation, receiving access permissions through the management user interface and permitting access to the financial report in accordance with the access permissions can include notifying a user through the management user interface of a new access request, receiving user input to the new access request, and permitting the access request in accordance with the user input. Notification of a new access request may be performed prior to creating a report token for a third-party, prior to providing access to the financial report, or at any suitable time. Similar user input verification may also be performed for other actions such as refreshing the financial report with more current financial data.

In one example, the data management platform sends a request over an encrypted and authenticated channel to the management interface of the user to solicit permission from the user to disclose the requested financial report to one or more specified third-parties. If the user denies the request, no data is disclosed to the third-party and the user's data privacy is maintained. If the user approves the request, the financial report can be accessed by the specified third-parties. In one implementation, a callback URI of a third-party system is notified when a user's response has been supplied.

In an additional or alternative variation of obtaining user input, the method may additionally include automatically regulating access by a third-party. Automatically regulating access by a third-party can include dynamically and selectively permitting valid access requests and denying invalid access requests. Validity of an access request may be based on a variety of factors. As the data management platform has visibility into the activity of the various third-parties. The data management platform may implement a process for analyzing financial report access across multiple users and third-parties using the platform. Effectively, the method may include evaluating platform interactions of a third-party. Evaluating platform interactions preferably involves analyzing history of requests and use of the data management platform and may additionally involve analyzing information external to the data management platform. A resulting evaluation of the platform interactions can generate a trust score for the third-party or may alternatively be used in flagging a particular pattern of use.

In automatically regulating access, standard or expected access requests may be automatically allowed. For example, regulatory bodies and trusted third-parties may be automatically permitted to use their report tokens to access the financial report. Atypical behavior by a third-party and/or activity indicative of illicit or unwanted behavior may have access requests be automatically denied. In some cases, the decision to permit or deny may be delegated to the user by obtaining user input. For example, instead of automatically denying questionable access request, the data management platform may notify a user through the management user interface and receive user input on the matter.

Exemplary Implementation of the Method

Figure 21A:
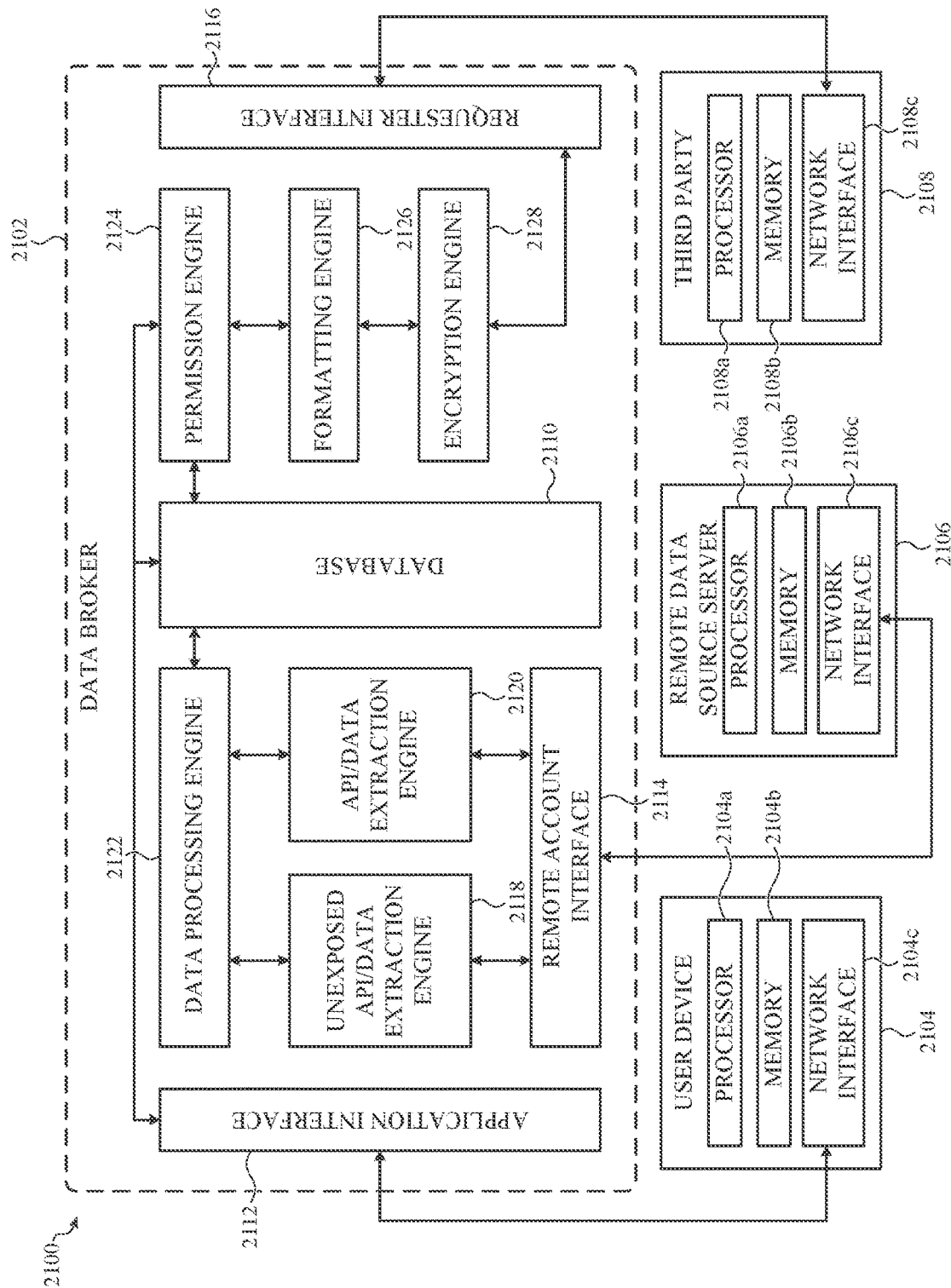
FIG. 21A depicts a simplified signal flow diagram of a system, such as described herein.
Figure 21B:
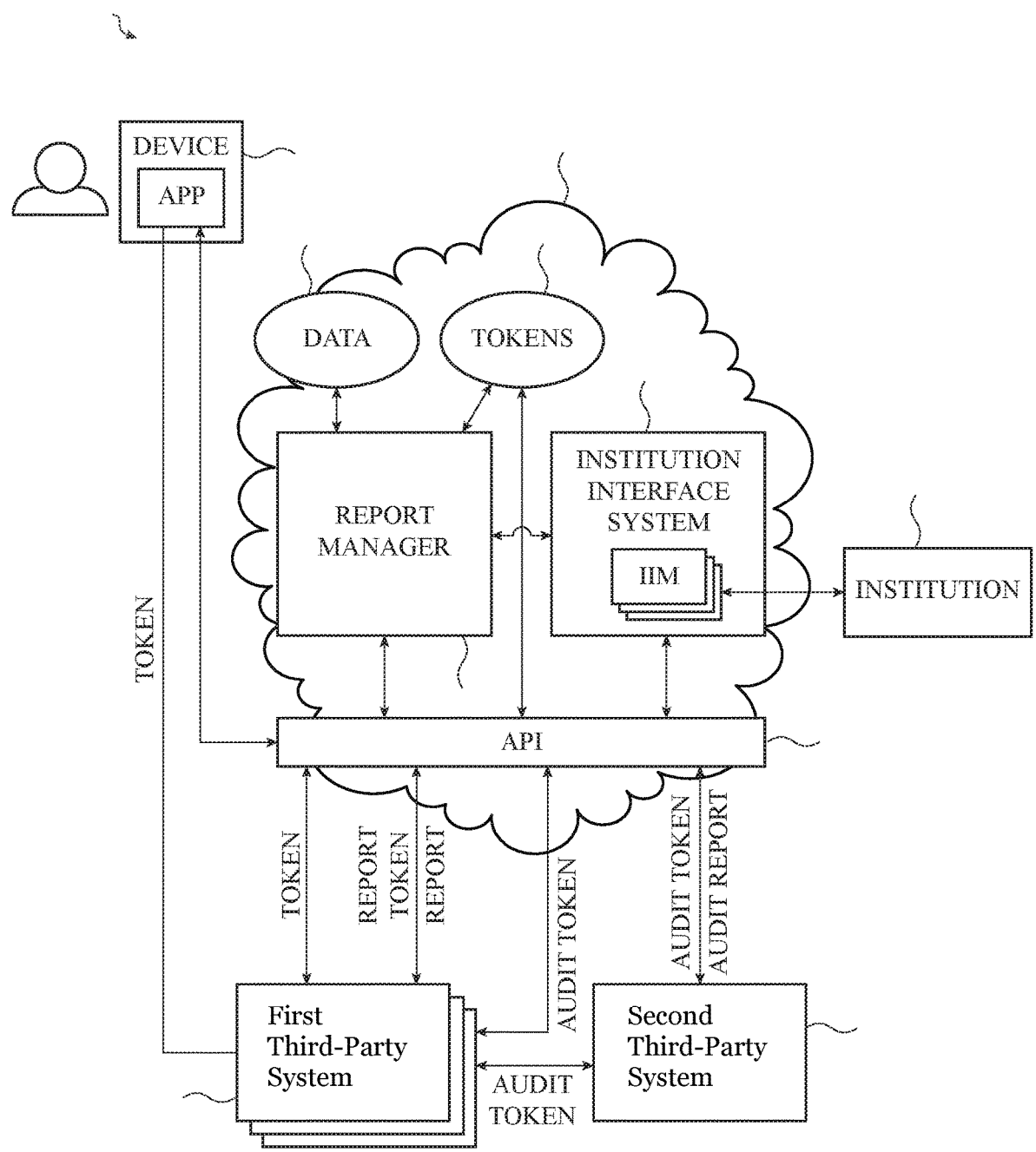
FIG. 21B depicts another simplified signal flow diagram of a system, such as described herein.
Figure 28A:
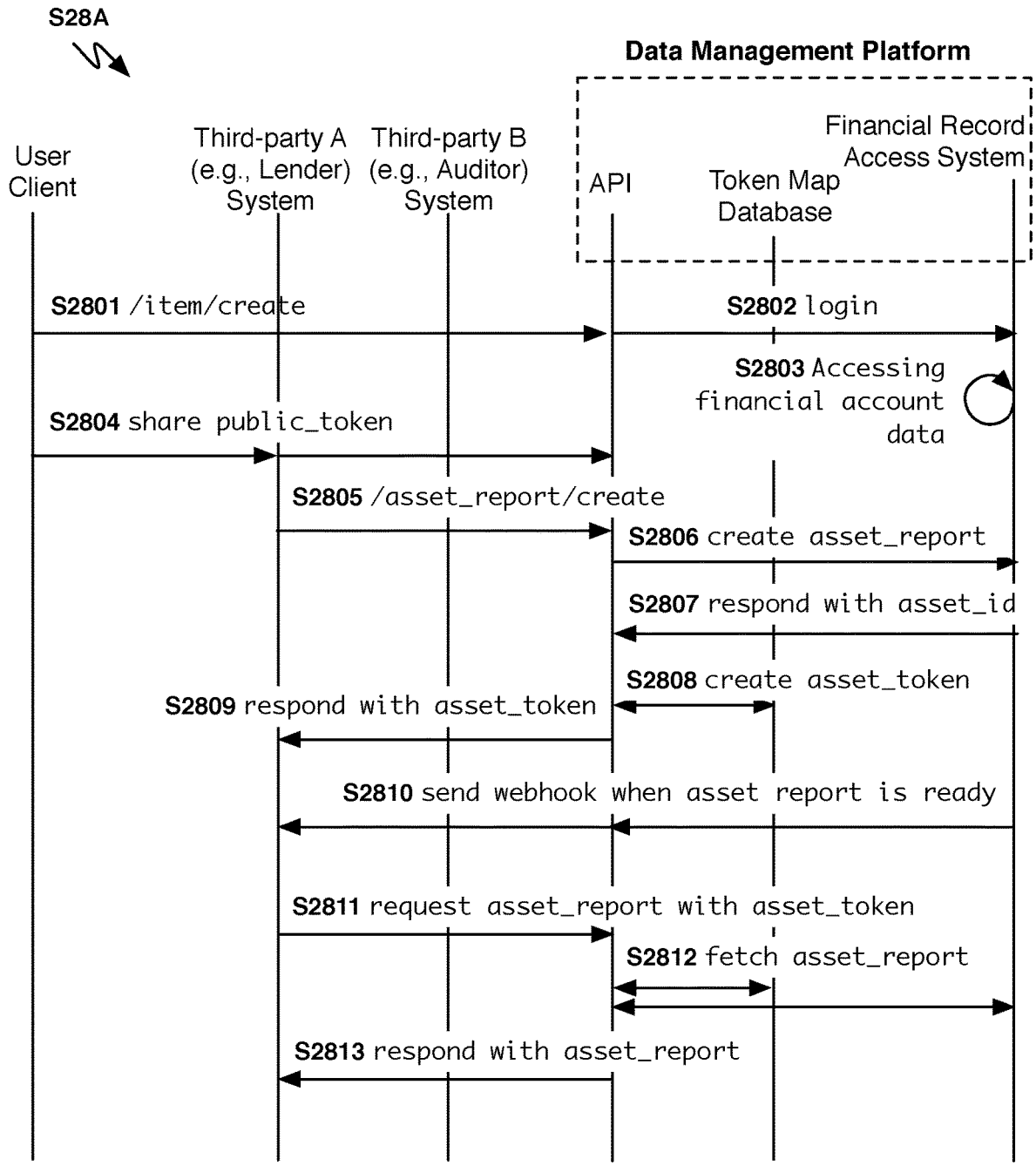
FIGS. 28A and 28B are communication flowcharts of an exemplary implementation of a method for managing access to financial record.
Figure 28B:
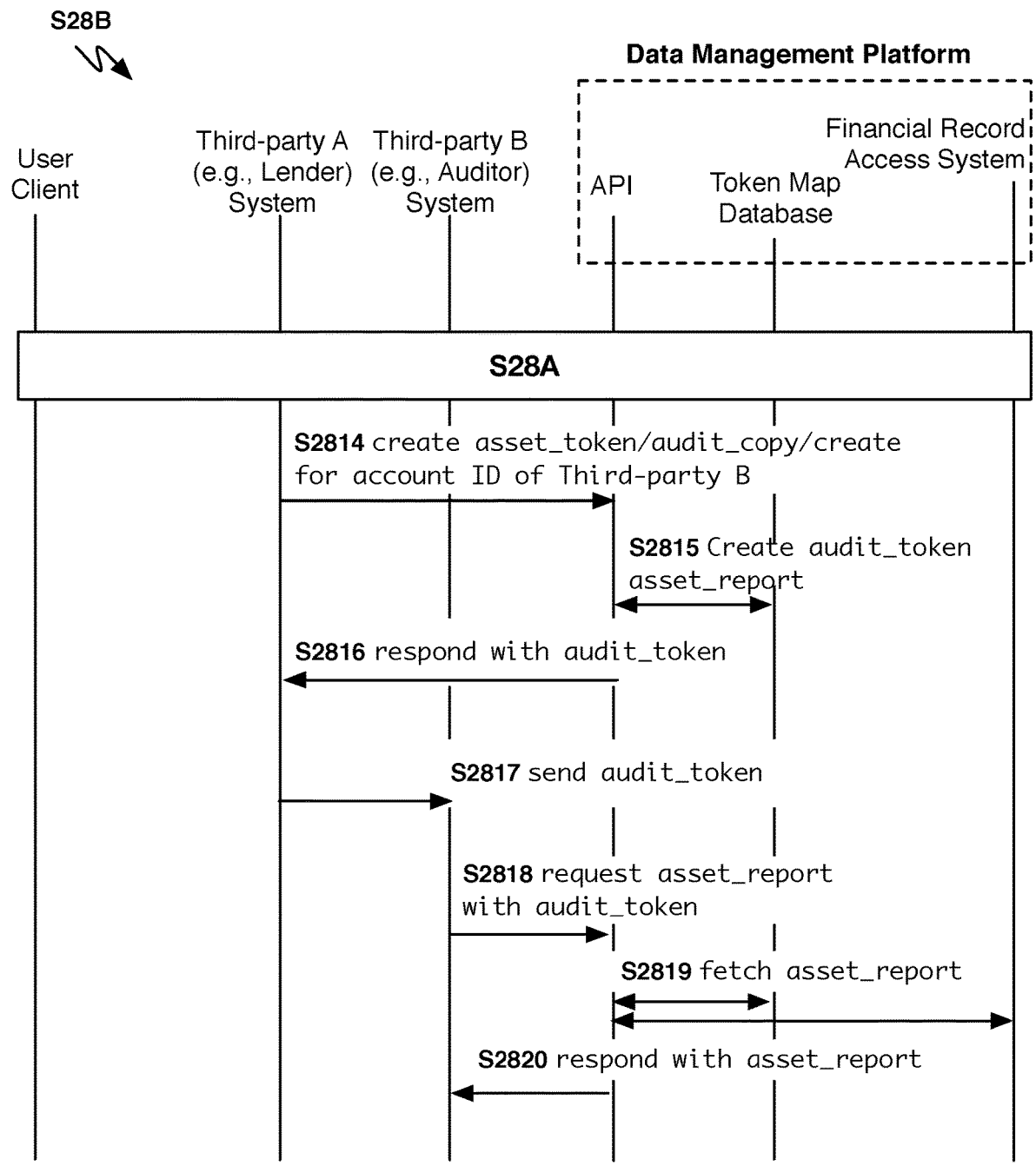

In the exemplary implementation shown in FIGS. 28A and 28B, the method can be implemented in combination with an API of a data management platform to manage creation and secure access of an asset report. As shown in FIG. 21B a first and second third-party system can interact with the API to access the report. As shown in FIG. 28A, the data management platform is initially setup to access a financial account of a user. A user preferably uses an account access interface of the data management platform. The account access interface is preferably a proxy service or a set of programmatic interfaces that a digital system can use to provide a secure authentication flow for configuring the data management to act as a trusted source for accessing private data of outside user accounts. For example, a user interface such as is shown in FIGS. 22A-22L can allow a user to authenticate with the banking credentials of their bank user account so that the data management platform can access financial data of that bank user account. Accordingly, the user will preferably initiate creation of an item S2801, wherein the item represents a set of credentials of an external user account. The item is used to authenticate with external systems such as external financial institution systems. The authentication credentials are then used in accessing a financial account and its associated private data S2802 and S2803. The linking of financial accounts to a user account can preferably repeated for any number of user accounts. For example, S2801-S2803 can be repeated for multiple banks from which a financial report is desired.

The user client can be a separate application or a component integrated into the lender system. An access token is preferably shared between the client and lender system and then between the lender system and the data management system S2804.

When the lender system is ready to create an asset report, they preferably send a request to create an asset report S2805. The data management system then initializes the creation of an asset report S2806, which serves a historical record of financial record from a point in time. An internal identifier is created within the data management system S2807 and then used in assigning an asset token S2808 which is shared with the lender system S2809.

An internal financial record access system preferably accesses the private data of one or more financial institutions if data is not current. Once the data is accessed an asset report is generated. One preferred implementation approach is to notify the lender system using a webhook S2810 (i.e., an HTTP/S communication communicated to a designated URI of the lender system), but any suitable mode of notifying the lending system may be used. Once notified, the lending system can reach out to the data management platform to request the completed asset report S2811. The request preferably includes the asset token. The asset token is mapped to a record and verified to correspond to the lender identifier and the asset identifier S2812. The corresponding asset report is then preferably returned to the lender system S2813. The data management platform may apply any sort of access policy when delivering asset reports. The access policy may be in part managed by an end user. Additionally, requests for access and/or provided access can be tracked and reported to users or other parties.

In some usage scenarios, the initial acquirer of the asset report may desire to provide others with access to information of the asset report as shown in FIG. 28B. For example, an auditor or another lender may be interested in accessing the financial report. For example, the access sharing process can be used to provide access to Fannie Mae. The lender preferably makes a request to create a new token that a designated party can use to also access the financial report S2814. Preferably, a second asset token is created S2815 and associated with an account identifier of the second third-party, which in the case of FIG. 28B is the account ID of the Auditor. The second asset token (e.g., an "audit token") can be returned to the lender S2816, who then preferably shares the audit token with the auditor S2817. With the audit token, the auditor can make their own request to the data management platform S2818. The platform can verify their account is associated with the audit token and access the asset report S2819, and then deliver the asset report to the lender S2820. Preferably, a unique report token is created and used by each third-party desiring access. In some cases, only the original third-party can generate secondary report tokens. In other cases, the user and/or holders of secondary report tokens may additionally or alternatively be enabled to permit new report tokens.

Example Systems and Methods for Programmatically Accessing User Account Data

Figure 30:
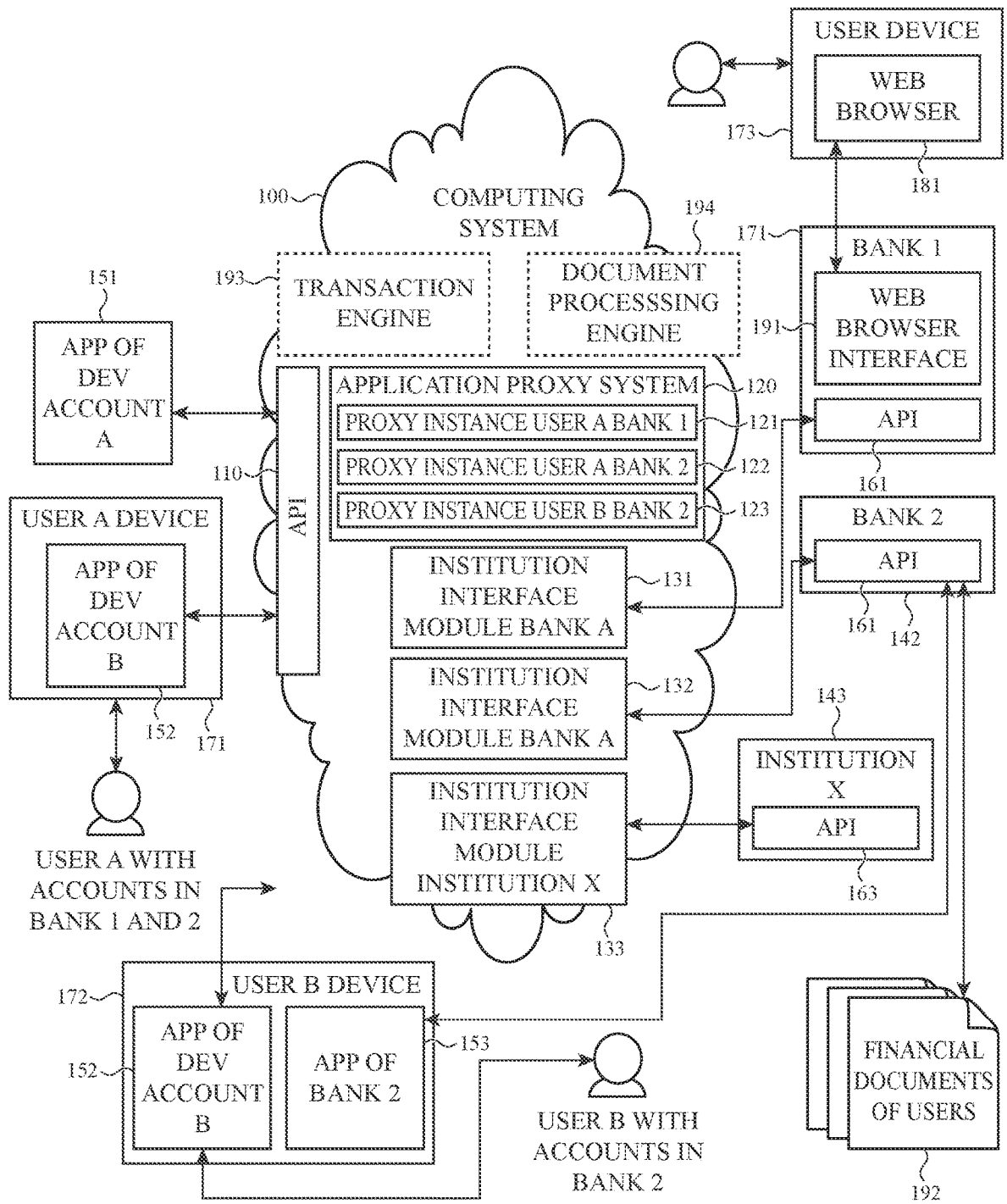
FIG. 30 is a block diagram illustrating various aspects of a computing system and network environment in which the computing system may be implemented, according to an embodiment.

FIG. 30 illustrates certain aspects of a computing system 10 (e.g., the system) that may access user account data from one or more external user account systems. The system 100 may include an application programming interface (API) service 110, an application proxy system 120, and at least one institution interface module (e.g., modules 131, 132, and 133). The system functions to provide programmatic access to one or more external user account systems (e.g., external user account systems 141, 142, and 143) that lack exposed programmatic access. The external user account systems may comprise proprietary and external financial services (e.g., financial institution services, among others, as described above). Such institutions may have first party software applications (e.g., mobile applications) that enable users to access user account data/information from a mobile or desktop device. Such first party applications commonly use proprietary or customized application programming interfaces (API) (e.g., APIs 161, 162, and 163). These APIs are commonly not public and not exposed. For example, a developer is commonly prevented from registering an account and using an open API authentication approach to arbitrarily access the API resources of such external user account systems. Additionally, the APIs (e.g., APIs 161, 162, and 163) of the external user account systems are a non-trivial customized interface protocols that may not be shared with other institutions; e.g., each external user account system conforms to its own interface.

The system 100 functions to provide a normalized interface (e.g., API service 110) to the one or more external user account systems (e.g., external user account systems 141, 142, and 143). The system 100 enables access to a user account within an external user account system by leveraging the application proxy system 120. A virtualized "image" or digital simulation of an application instance is maintained in the application proxy system 120 and used to access the unexposed API (e.g., APIs 161, 162, and 163) of the external user account system. While the system may be applied to financial institutions, the system may additionally or alternatively be applied to providing API access to other external systems with closed or limited API access.

The API 110 of the system functions to provide a normalized customer facing interface. The API 110 may be normalized in the sense that the underlying non-public (or public) API to the external user account system (e.g., external user account systems 141, 142, and 143) that acts as the source of the user account data is abstracted away, and the API 110 to various different external user account systems is substantially standardized. In some variations, various aspects of the API 110 may be limited when interfacing with external user account systems. For example, one institution may not support a feature such as digital check deposit, while a second institution does. In this case, the API 110 may define the API such that the API feature for check deposit is prevented for the first institution. The system 100, and more specifically the API 110, may be used to provide an accessible API service to customers, e.g., outside developers. As such, the system 100 is may be a multi-tenant system that allows numerous accounts to share use of the system 100. The system 100 and more particularly the API 110 may alternatively be a single tenant system. For example, the system may be used as an internal system to a website providing an online financial management product.

The API service 110 may be a RESTful API, but may alternatively be any suitable API such as SOAP or custom protocol. The RESTful API works according to an HTTP request and response model. HTTP requests (or any suitable request communication) to the system 100 may observe the principles of a RESTful design. RESTful is understood in this document to describe a Representational State Transfer architecture as is known in the art. The RESTful HTTP requests may be stateless, thus each message communicated contains all necessary information for processing the request and generating a response. The API service 110 can include various resources, which act as endpoints that act as a mechanism for specifying requested information or requesting particular actions. The resources can be expressed as URI's or resource paths. The RESTful API resources can additionally be responsive to different types of HTTP methods such as GET, PUT, POST and/or DELETE.

The API service 110 can provide an interface into a variety of information and action resources, as provided by the system 100. Information/data relating to a user account may be accessible through querying particular API resources via the API 110. For example, a list of transactions and information about each individual transaction may be accessible through different API calls of the API 110. Information can additionally relate to account summary information, account details such as address and contact information, information about other parties such as the entities involved in a transaction, and/or any suitable information. The API 110 may additionally be used to trigger or facilitate performing some action. For example, an API call may be used in transferring money, updating account information, setting up alerts, or performing any suitable action. Those skilled in the art will appreciate that such example API features that any suitable API feature possibilities and semantic architecture may be used.

In one example implementation, an API call via the API 110 can support adding a user, completing authentication, accessing transaction information, and other actions. For example, an application may POST to a "/connect" REST API resource of the API 110 to authenticate a user; if an institution includes multi-factor authentication, then a "/connect/step" resource can be submitted to complete multi-factor authentication credentials; and then performing a GET on the "/connect" resource can access transactional data related to the user/user's account. The API 110 may additionally include informational resources to access information about entities involved in transactions. For example, the API 110 may allow a particular business resource to be accessed to obtain contextual information about the business such as name, location, and classification. In a preferred use case of the system and method described herein, a set of APIs and API resources/endpoints exist for actions such as requesting creation of a financial report, accessing a financial report, creating a new report token for a second third-party, creating an updated financial report, and/or creating a filtered financial report.

The application proxy system 120 functions to manage a simulation of a first-party software application access to an institution. The application proxy system 120 operates in cooperation with one or more institution interface modules (e.g., institution interface modules 131, 132, and 133) to establish a data model and/or a data image that acts as a virtualized or simulated application instance (also referred to herein as an "application proxy instance," "proxy instance," "virtualized instance," "simulated instance," and/or the like) (e.g., proxy instances 121, 122, and 123). From the perspective of the institution, the proxy instance (e.g., proxy instances 121, 122, and 123) appears as a first-party application (e.g., Bank 2 application 153) installed on a physical user device (e.g., user devices 171 and 172) that is being used by a user. In other words, the requests received from the proxy instance are treated like requests from a first-party mobile app, desktop app, or web-based application of the user. The application proxy system 120 may store and maintain a plurality of application proxy instances (e.g., proxy instances 121, 122, and 123). The proxy instances may include configuration settings and properties that, when used according to a defined institution interface (e.g., an institution interface of an institution interface module 131, 132, and/or 133), will appear as requests from first-party applications (e.g., application 153) of the institution (e.g., institution 141, 142, and/or 143). A different proxy instance may be created and maintained for each user account-institution pair. A given user may have multiple user accounts with different institutions. A proxy instance may include a set of properties that can be used to authenticate the proxy instance with the institution system (e.g., institution 141, 142, and/or 143). The application proxy system 120 provides a method to programmatically create a proxy instance for a user. The user may provide some account credentials that can be used in an initial registration of the proxy instance with the non-public or public API of the institution. The proxy instance may be characterized as a set of properties that can be stored and maintained. Some of those properties may be automatically generated, may be provided from the institution during negotiating registration, may be properties of the application that is being simulated, and/or may include any suitable identifying and authenticating information. The properties may include a unique user identifier code, an authentication token, a MAC address (e.g., a MAC address of a user device 171 or 172), or any suitable information. When a request is made to a bank on behalf of a user, the properties of the proxy instance may be invoked to gain access to the institution on behalf of the associated user.

Figure 31:
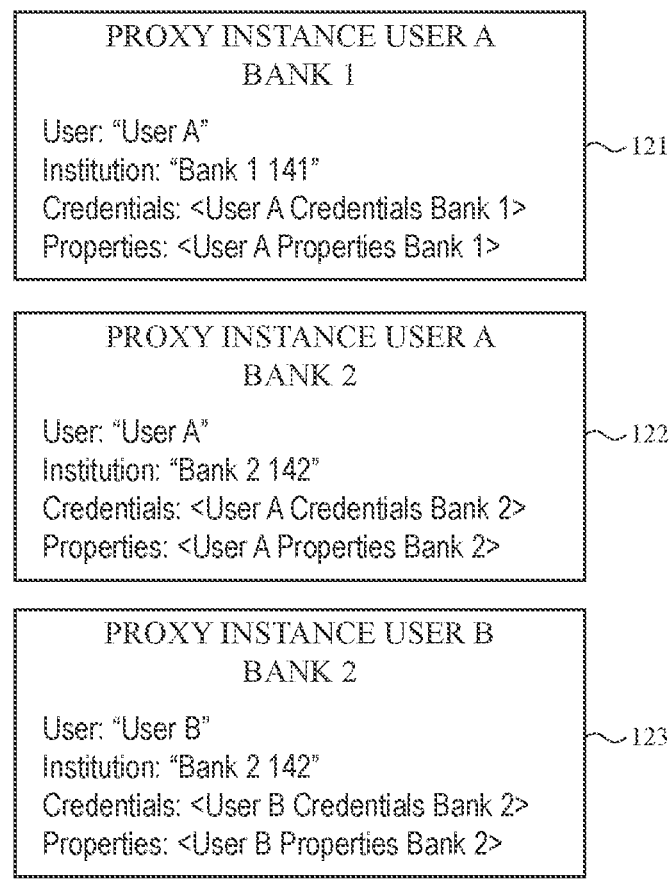
FIG. 31 illustrates aspects of some example proxy instances, according to an embodiment.

FIG. 31 depicts example proxy instances 121, 122, and 123 of FIG. 30. As shown in FIG. 31, User A has accounts in Bank 1 and Bank 2, and User B has accounts in Bank 2. As shown in FIG. 31, each proxy instance includes account credentials and properties.

An institution interface module (e.g., one of institution interface modules 131, 132, or 133) functions to model the internal interface (e.g., interaction with one of APIs 161, 162, or 163) of at least one application (e.g., the application 153) with an external institution (e.g., one of institutions 141, 142, or 143). An institution interface module may be established for each institution with which the system 100 can interface. For example, an institution interface module may exist for each bank and/or credit card company that is available in the system. The institution interface module may include a set of rules and processes of a particular institution. The institution interface module may include a proxy sub-module that defines how the institution recognizes and/or authenticates a particular application. Some banks may depend on the MAC address of a device (e.g., a MAC address of user devices 171 and/or 172), some may depend on asymmetric cryptography tokens, and others may generate encrypted tokens. The proxy sub-module is used in establishing the proxy instance information. The institution interface module can additionally include institution protocol sub-module, which defines a mapping between provided API 110 functionality and the form and mode of communication with the external institution (e.g., institutions 141, 142, or 143). The institution protocol sub-module can define the headers, body, and other properties of messages sent to the associated institution. The protocol sub-module may additionally define how data should be processed to form that message. In some cases, the data may be encrypted in a standard or proprietary format, which the protocol sub-module can define. Additionally, the protocol sub-module can define the communication flow to fulfill a request. In some cases, multiple requests may need to be made to complete a request objective. Other aspects of interacting with an interface (e.g., APIs 161, 162, and/or 163) of an external institution (e.g., institutions 141, 142, and/or 143) may additionally be built into the institution interface module such as multi-factor authentication rules.

An institution interface module may be constructed based on use of an actual first-party application (e.g., the application 153). For example, communication of, and/or source code of, the first-party application can be parsed and analyzed to establish some or all of an institution interface module. In some implementations, source code of a first-party application (e.g., the application 153) of an external institution is parsed and analyzed to establish some or all of an institution interface module for the external institution. In some implementations, communication between an external institution and a first-party application (e.g. the application 153) of the external institution is parsed and analyzed to establish some or all of an institution interface module for the external institution.

Figure 32:
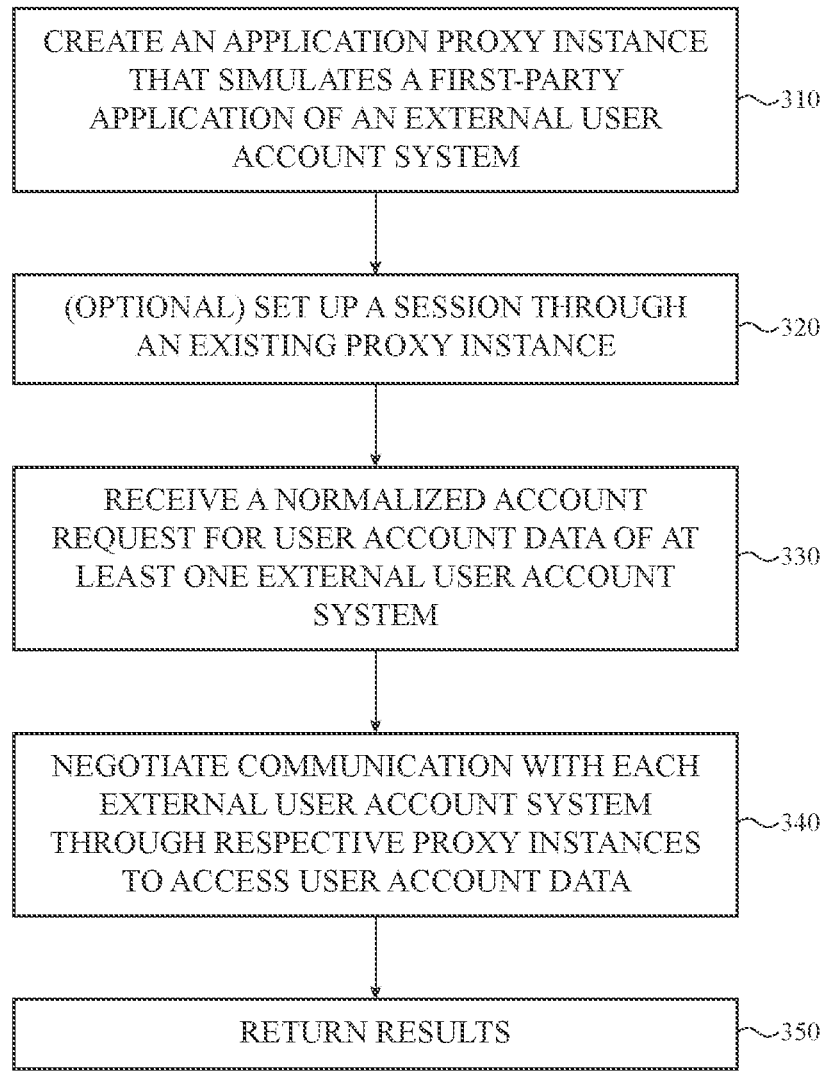
FIG. 32 is a flowchart illustrating an example method of accessing user account data, according to an embodiment.

FIG. 32 is a flowchart illustrating an example method of accessing user account data, according to an embodiment. As shown in FIG. 32, the method can include creating an application proxy instance (block 310), optionally setting up a communication session through the proxy instance (block 320), receiving a normalized account request (block 330), negotiating communication with an external interface through a proxy instance (block 340), and returning results (block 350). The method functions to provide programmatic access to one or more external services (e.g., external user account systems of external institutions) that lack exposed programmatic access. The external services may be non-public (e.g., proprietary) or public. The external services can be provided by external institutions, as described above. Such institutions may have first-party applications that enable users to access user account information via a mobile or desktop application. Such first-party applications may use a proprietary or customized API (e.g., API 161, 162, and/or 163) of the external institution. Such APIs are commonly not public and not exposed. For example, a developer is commonly prevented from registering an account and using an open API authentication approach to arbitrarily access the API resources of external institutions. Additionally, such APIs are non-trivial customized interface protocols that are not shared with other institutions, e.g., each institution conforms to its own interface. The method can additionally provide a normalized interface to a plurality of external services (e.g., external institutions 141, 142, and/or 143). The method enables a programmatic interface into an account within an institution by leveraging an application proxy approach. A virtualized "image" or digital simulation of an application instance is maintained in the application proxy system 120 and used to access the unexposed API (e.g., API 161, 162, and/or 163) of the institution. While the system 100 may be applied to financial institutions, the system 100 may additionally or alternatively be applied to providing API access to any other external entities with closed or limited API access. The method may be implemented through the system 100 as described above, but may alternatively be implemented by any suitable system.

At block 310, which includes creating an application proxy instance (e.g., an application proxy instance 121, 122, and/or 123), the system 100 functions to establish a digital image of a first-party application instance (e.g., the application instance 153) for a selected institution (e.g., the Bank 2 142). Creating an application proxy instances may be initiated in response to receiving an initial request. The initial request may be initiated by a user (or entity) (e.g., User A or User B) interacting with an external user-facing system/application (e.g., application instances 151 and/or 152, executing on either of user devices 171 or 172 and/or another suitable device, and/or further executing on another system of the application instances 151, 152) of a customer (e.g., a developer). The external user-facing system/application may then send the initial request to the system 100. The user (e.g., User A and/or User B) may have a user account with the external institution (e.g., an online bank account). An application proxy instance (e.g., one of proxy instances 121, 122, and/or 123) can be created during the initial registration or at a later time, which will provide access to account information of the external institution. Once created, the application proxy instance of that user can be persisted and used at a later time for that given user-institution combination (e.g., "User A-Bank 1", "User A-Bank 2", "User B-Bank 2"). However, a new proxy instance may be created when the proxy instance becomes invalid (e.g., as a result of institution API changes, password/login changes made within the institution, and/or other changes to invalidate a proxy instance). The initial request may be received through a normalized API (e.g., API 110) as a connection request. The connection request may be accompanied by parameters that specify a selected institution (if there are multiple institution options) and user credentials for the institution. The user credentials may include a username, password, pin code, and/or any suitable credentials. The API request may additionally include authentication credentials such as a client identifier and secret token that is associated with the account in the system.

Creating a proxy instance may include negotiating registration of the proxy instance with the institution, which functions to establish the proxy instance with the selected external institution. An institution interface module (e.g., one of the modules 131, 132, or 133) may facilitate navigating the communication handshaking during the initial login. Different institutions may have different processes to register or enroll a new application (which in the method is a proxy instance) such as multi-factor authentication. During the negotiation, various elements may be extracted and stored as part of the proxy instance. Similarly, some properties may be generated based on communication with the institution. For example, a MAC address or a unique device identifier may be used in connecting to the services of the external institution. Such properties may be stored as part of the proxy instance.

As mentioned above, multifactor authentication (MFA) may be part of negotiating with an external institution. For example, an external institution may respond with indication of a MFA credential requirement. Such MFA requirements may be fulfilled by relaying the MFA challenge/task up to a user. In one implementation, the system 100 receives a message indicating that a security question should be asked to complete the negotiation. The security question is passed back to the associated application (e.g., applications 151 and/or 152, which may be operated by a customer/developer account of the system 100). Then, the associated application may present the security question in some manner to obtain the user response. The MFA can include security questions, additional pin codes (such as those supplied by a one-time password generator or a code transmitted to a secondary device), or any suitable form of MFA.

At block 330, the system receives a normalized account request via the API 110 of the system 100. As mentioned above, the syntax and mode of communicating an API request is normalized such that the format is independent of the institution. The requests can include a variety of types of requests which may include: obtaining a list of transactions; requesting details on a particular transaction; performing some financial transfer (moving money from savings to checking, setting up transfer to another account, making scheduled payments, digital deposit of a check, and/or the like), updating account information (e.g., updating contact information, changing password, manage alerts, and/or the like), requesting services (e.g., new cards, reporting fraud, and/or the like), and/or the like. A normalized account request may be mapped to an institution interface module (e.g., one of the institution interface modules 131, 132, or 133) or other suitable component that defines communication to fulfill the API request.

At block 340, which includes negotiating communication with an external interface (e.g., one of APIs 161, 162, and/or 163) through a proxy instance (e.g., one of the proxy instances 121, 122, and/or 123), the system 100 functions to execute and manage communication between the system and an external institution system (e.g., one of systems 141, 142, and/or 143) when fulfilling an account request. The proxy instance (e.g., one of the proxy instances 121, 122, and/or 123) provides a mechanism through which access may be granted. The communication is executed while an authenticated session is active. Communication sessions may be expired by the system 100 or the external institution for various reasons, such as remaining inactive for a set amount of time. A communication session may be active subsequent to enrolling a proxy instance or may require setting up a session through the proxy instance as described below.

Negotiating communication may include creating requests that conform to expected messages of the external institution. This can include setting headers, body contents, and other message properties. An institution may expect particular headers. For example, the headers may include a host or path, a data, content type, cookies, MAC address, a user identifier, authorization properties, and/or other suitable headers. Creating requests can additionally include transforming request properties into an expected form, which may include applying a set encryption pattern to a request. In one variation, transforming the request involves encrypting content according to a public key, wherein the public key may be stored as part of the proxy instance. The institutions may take varying approaches to how information is communicated. In an alternative institution, the contents of a message may be unencrypted, in which case, the contents may be submitted in a plaintext, unencrypted form. In addition to creating requests that conform to expected messages of the external institution, the method can include following a request-response pattern. That pattern can involve a single request and response, but may alternatively include a sequence of different request and responses to obtain desired information.

In some variations, information or actions may not be available through the first proxy instance and so the method may include automatically switching to a second proxy instance with supported functionality. For example, full bank statements may not be available in a mobile application, and the institution API (e.g., one of APIs 161, 162, and/or 163) may not include such functionality. Accordingly, when that functionality is required to fulfill an API request of the API 110, then a second proxy interface may be used. In some variations, an API request via the API 110 may require multiple institutions to be queried. Such an API request may be particularly useful for summarizing financial statements across multiple accounts. The method can include negotiating communication for multiple institutions and combining results into a combined form.

At block 350, which includes returning results, the system 100 functions to deliver the results as a response to the request. Returning the results includes transforming the data obtained from the external institution into a normalized form. The information is formatted into a standardized format that is substantially similar in representation between different institutions served by the system 100. Transforming the data can additionally include processing, supplementing, and/or otherwise enhancing information. Some information provided by an institution may be poorly formed. For example, store information for a particular transaction may be poorly labeled and may be represented different from other institutions. Such contextual information about external entities can be cleaned and/or supplemented with additional information. For example, an entity may be supplemented with categorical labels, tags, geolocation information, and/or other suitable information. The returned results can be represented data format such as JSON, XML, or any suitable format.

The method can additionally optionally include block 320, which includes setting up a session through a proxy instance that was previously created, and functions to facilitate accessing information after negotiating a proxy instance for an account and institution. The proxy instance may store and maintain information required for subsequent access. The external institutions may restrict access to set sessions, which may expire after some amount of time or may require reconfirming user credentials. Thus, when an API request for an account occurs after a communication session has expired, then the method may automatically set up a new session using the previous user credentials and proxy instance credentials. In some variations, MFA challenges, such as security questions, may be automatically completed.

The method can additionally include re-capturing updated credentials, which functions to update user credentials for an institution. Updated credentials may be updated when a user changes them within the institution or when the proxy instance is otherwise locked out of the account. An error may occur indicating that a communication session was not successful, and then an API request can be submitted to update a proxy instance with new credentials.

Referring again to FIG. 30, in some implementations external user account system of the external institutions may include public web browser interfaces. For example, as shown in FIG. 30, the bank 1 system 141 may include a web browser interface 191 for accessing the bank 1 system 141 via a web browser (or any suitable web client) (e.g., web browser 181 of the user device 173). As described herein and further below in reference to FIGS. 6 and 7, the system 100 provides access to the user account data via private, proprietary APIs (e.g., API 161) of external institutions, as opposed to access via a public web browser interface 191. In some implementations, the web browser interface 191 is a web server that hosts a web site for access of the external institution system via a web browser over the Internet.

Figure 33A:
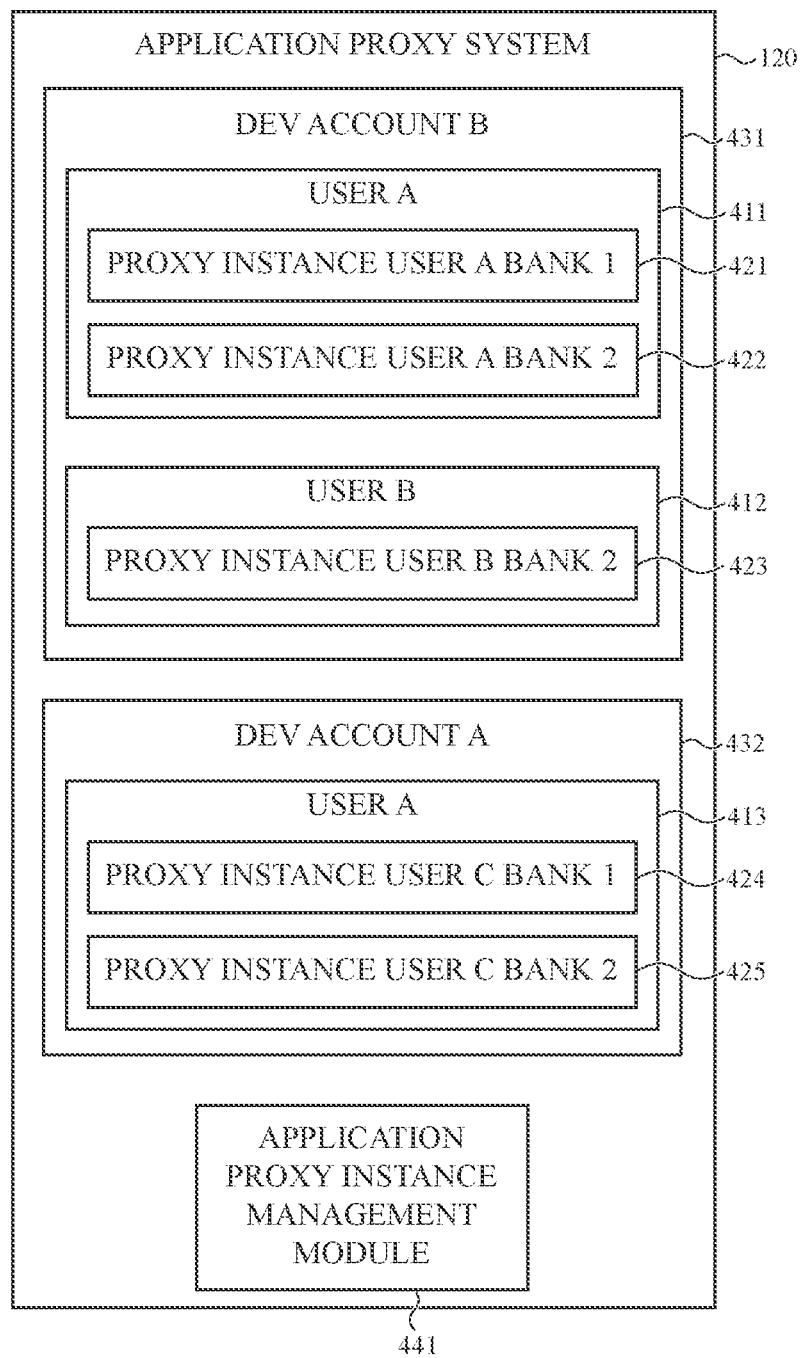
FIG. 33A illustrates aspects of an application proxy system, according to an embodiment.

FIG. 33A illustrates aspects of the application proxy system 120, according to an embodiment. As shown in FIG. 33A, the application proxy system 120 includes application proxy instances (e.g., proxy instances 421, 422, 423, 424, and 425) for user accounts (e.g., user accounts 411, 412 and 413) of developer accounts (e.g., Dev Account B 431 and Dev Account A 432) at the system 100. The application proxy system 120 includes an application proxy instance management module 441 that is constructed to generate application proxy instances, configure application proxy instances, remove application proxy instances, and/or the like.

Figure 33B:
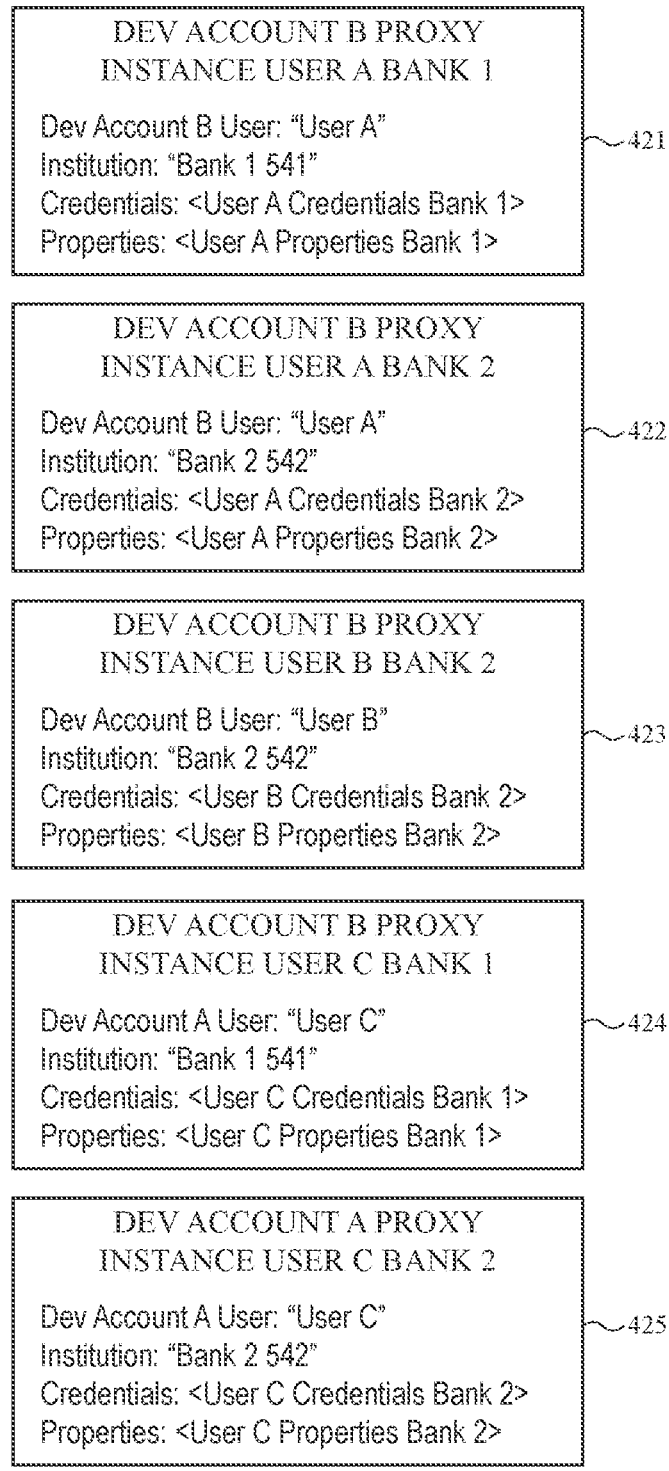
FIG. 33B illustrates aspects of some example proxy instances, according to an embodiment.

In some implementations, each application proxy instance (e.g., proxy instances 421, 422, 423, 424, and/or 425), specifies a developer account, a user account of the developer account, an associated external user account system (e.g., an external institution), and credentials of the user account for the external institution, as shown in FIG. 33B. In some implementations, each application proxy instance specifies properties of the application proxy instance. In some implementations, properties include one or more of a unique user identifier code, an authentication token, a MAC address (e.g., a MAC address of a user device 171 and/or 172), or any suitable information.

In some implementations, the application proxy instance management module 441 creates the application proxy instance responsive to a request to create an application proxy instance. In some implementations, the request to create an application proxy instance specifies information identifying an external user account system, and a user account of an external user-facing system/application (e.g., a user account of the external user-facing system/application 152 of FIG. 30). In some implementations, the request to create an application proxy instance specifies user credentials for the external user account system. In some implementations, the request to create an application proxy instance specifies information identifying an account of the system 100 associated with the external user-facing systems/application. In some implementations, the request to create an application proxy instance specifies properties for the application proxy instance. In some implementations, properties for the application proxy instance include at least one of a unique user identifier code, an authentication token, a MAC address, user accounts of the corresponding external user account system, and/or any other suitable information.

In some implementations, the application proxy instance management module 441 stores the created application proxy instance in association with a user account (e.g., "User A" 411 of FIGS. 33A and 33B) of an external user-facing system/application (e.g., a user account of the external user-facing system/application 152 of FIG. 30). In some implementations, the application proxy instance management module 441 stores the created application proxy instance in association with an account (e.g., "Dev Account B" 431 of FIGS. 33A and 33B) of the system 100 associated with an external user-facing system/application (e.g., a user account of the external user-facing system/application 152 of FIG. 30). In some implementations, the application proxy instance management module 441 stores the created application proxy instance (e.g., "Proxy Instance User A Bank 1" 421 of FIGS. 33A and 33B) in association with an account (e.g., "Dev Account B" 431) of the system 100 associated with an external user-facing systems/application, and a user account (e.g., "User A" 411) of the external user-facing systems/application. In some implementations, the application proxy instance management module 441 stores the created application proxy instance in association with an account of the system 100 associated with an external user-facing systems/application, a user account of the external user-facing systems/application, and information identifying the external user account system (e.g., "Bank 1 141" of FIG. 33B) of the application proxy instance. In some implementations, the application proxy instance management module 441 stores the created application proxy instance in association with an account of the system 100 associated with an external user-facing systems/application, a user account of the external user-facing systems/application, information identifying the external user account system of the application proxy instance, and information identifying user accounts of the application proxy instance.

In some implementations, creating the application proxy instance includes controlling the application proxy instance management module 441 to construct the application proxy instance to simulate communication, register, negotiate registration, and/or the like, of an application (e.g., application 153 of FIG. 30) (of the external user account system of the application proxy instance) with the external user account system on behalf of the user account (e.g., "User A", "User B") of the application system.

Additional examples and details of accessing user account data via proxy instances of the system may be found in U.S. patent application Ser. No. 14/790,840, filed Jul. 2, 2015, and titled "SYSTEM AND METHOD FOR PROGRAMMATICALLY ACCESSING FINANCIAL DATA" (referred to herein as "the '840 application"). The entire disclosure of this application is hereby made part of this specification as if set forth fully herein and incorporated by reference for all purposes, for all that it contains.

As mentioned above, the system 100 may also be used, via the API 110, to access various types of user account data, including documents (such as statements). The system 100 may also be used, via the API 110, to initiate transactions (such as a transfer of funds between accounts, schedule payments, etc.). The system 100 may also be used, via the API 110, to update account information or request services. Additional examples and details of such functionality of the system is provided below, and may also be found in the '840 application.

Example Systems and Methods for Programmatically Verifying Transactions

Figure 5:
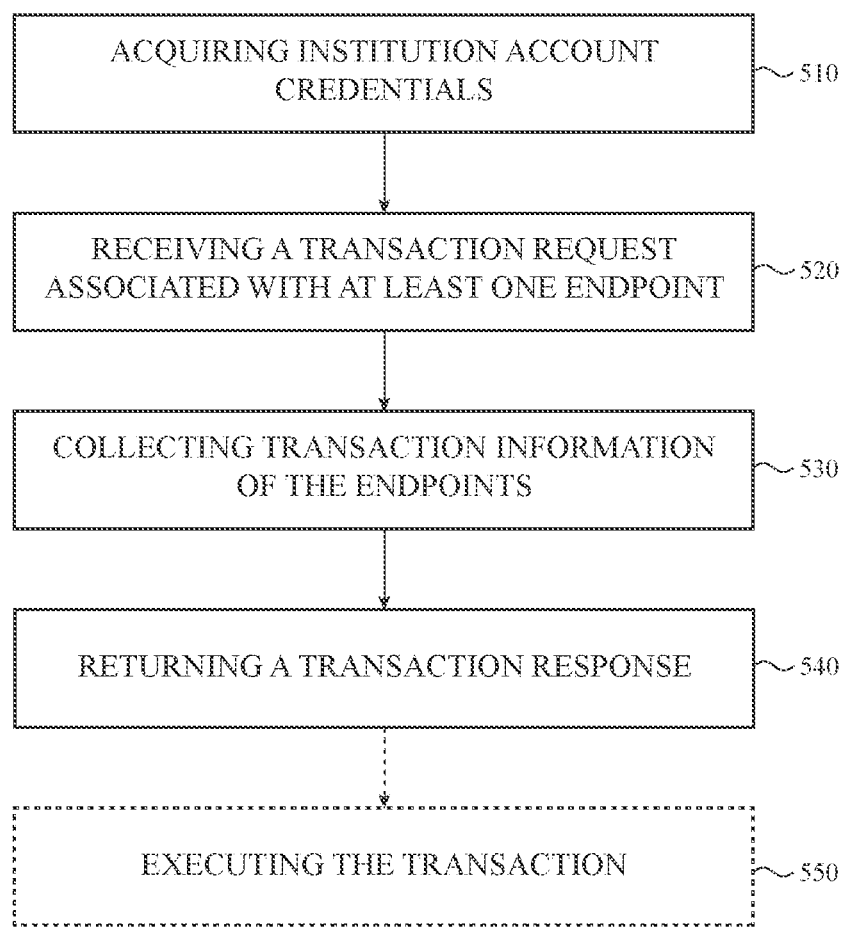
FIG. 5 is a flowchart illustrating an example method of processing transactions, according to an embodiment.

FIG. 5 is a flowchart illustrating an example method of processing transactions, according to an embodiment. As shown in FIG. 5, the method can include acquiring user account (also referred to herein as "institution account") credentials (block 510), receiving a transaction request associated with at least one endpoint (block 520), collecting transaction information of the endpoint (block 530), and returning a transaction response (block 540). In some embodiments, the method can optionally include executing the transaction (block 550), which functions to process the transaction between two endpoints. In some embodiments, the method does not perform execution of the transaction, receiving the transaction request functions to initiate the retrieval of transaction addressing information of the at least one endpoint, collecting transaction information of the endpoint includes collecting transaction addressing information of the endpoint, and returning a transaction response functions to transmit the collected transaction addressing information of the endpoint. The method functions to leverage account access during the transaction process. Variations of the method can be used to add functionality such as verifying account information used in financial transfers, programmatically transferring funds, setting programmatic events, catching errors and fraud, performing conditional processing of a transaction, and/or other suitable operations. The method may be performed by the system 100. In some implementations, the transactions are automated clearing house (ACH) transactions, but any suitable type of transaction may be used. In a first implementation, the method enables a customer/developer, via the API 110, to obtain verified ACH endpoint information. For example, an account number and a routing number may be obtained, as well as verification of ownership of the account. In this variation, the system 100 provides the information to execute the transaction. In another embodiment, the method additionally executes the transaction having obtaining the required information and verification. The method of FIG. 5 may be implemented by the system 100, but the method may alternatively be implemented by any suitable system.

Figure 6:
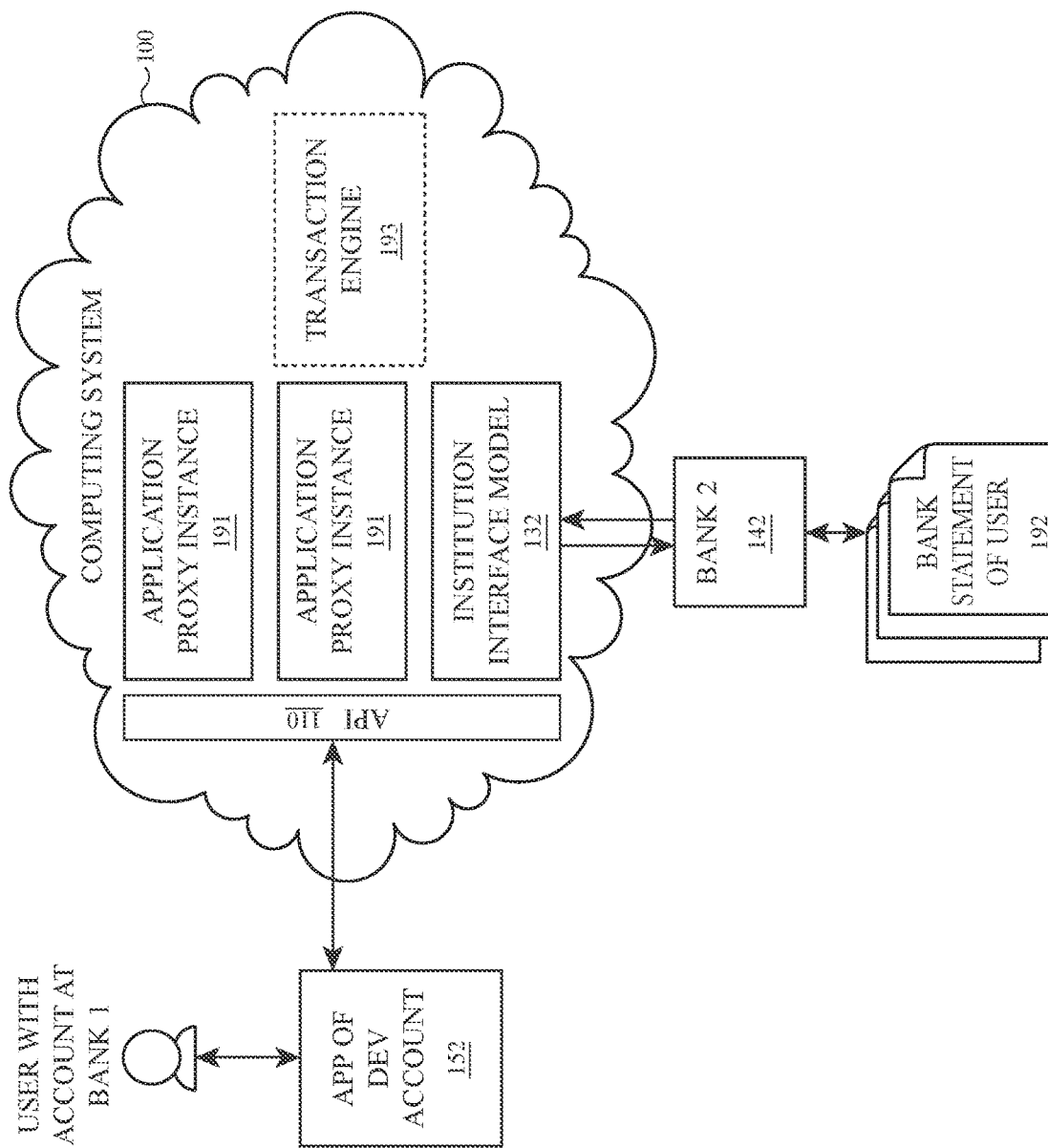
FIG. 6 is a simplified block diagram of the computing system and network environment of FIG. 1, according to an embodiment.

FIG. 6 is a simplified block diagram of the computing system and network environment of FIG. 30, according to an embodiment. The method of FIG. 5 is described below in reference to certain aspects of FIG. 6 (or, alternatively, FIG. 30)

At block 510, which includes acquiring institution account credentials, the system 100 functions to obtain login information for an institution (e.g., the institution 142). The institution account credentials may include a username and password. The account may be an account of an external institution. Additionally, an institution may include additionally authentication challenges such as a pin code, security questions, single-use passwords, secondary device code verification, biometric identification, and/or any suitable form of multi-factor authentication (MFA), as described above. Such additional authentication challenges may be collected at the same time of the account credentials, but the MFA authentication process may alternatively be defined in the API protocol. For example, if the primary account credentials are not sufficient, the MFA challenge may returned in a response, this additional credential request can be repeated as required before access to the account is obtained. The institution account credentials can additionally be stored, and automatically used to complete subsequent access or login attempts.

The account credentials may be provided through an API request of a customer/developer or application of the customer/developer to the API 110. The API 110 may be used in establishing, setting up, or enrolling a new user account. One user may have at least one associated user account at an external institution, but may be linked or associated with multiple user accounts at multiple external institutions. Account credentials may be obtained for each user account.

At block 520, which includes receiving a transaction request associated with at least one endpoint, the system 100 functions to initiate the retrieval of transaction addressing information of an endpoint. The endpoint may be a transaction endpoint, which may be any suitable endpoint from which funds may be withdrawn or deposited. In a common transaction, there is a single withdrawal account and a single deposit account. The method can be used in obtaining information for one or more endpoints. In some variations, there may be a plurality of withdrawal and/or deposit accounts. In one variation, the transaction request is identical to an enroll user request used to obtain the user credentials of block 510. The account credentials may alternatively be previously obtained or obtained in response to the transaction request.

In one variation, in which the transaction request is for information about an account, the API request may specify an institution and account credentials. Additional credentials may additionally be required such as a pin code, state in which an account was created, or MFA challenge answers. A second request with similar parameters may be submitted to obtain the account credentials for other involved transaction endpoints.

In another variation, the transaction request may explicitly define the transaction details. The transaction request may include at least one withdrawal account endpoint and deposit account endpoint. Account credentials may be specified for each endpoint. In one variation, a single API request may include account credentials for both endpoints. In another variation, a transaction resource is used, such that withdrawal endpoint information, deposit account information, and transaction details can be specified asynchronous. For example, a transaction resource is created through an API request via API 110. Later, an API request hits the new transaction resource (by specifying a transaction identifier) to specify withdrawal information, then deposit information, and then the amount to be transferred. Once all the information is populated, the transaction may be executed either automatically, in response to an executed command, or scheduled for a later time. Bulk, aggregate, or group transactions may additionally be specified in a request. If multiple entities are withdrawal endpoints, then the division of funds may be specified (e.g., a percentage breakdown or amount breakdown). Similarly, funds for multiple deposit endpoints may be specified.

At block 520, which includes collecting transaction information of the endpoint, the system 100 functions to access and determine properties of a transaction endpoint. Collecting transaction information of the endpoint may involve using the account credentials to gain account access in an institution. The account access may be facilitated by using a proxy application, as described above. The account access can be used to request and obtain account documents that include endpoint information. The account documents may include bank statements or other suitable documents. If the documents are in PDF or other alternative formats, the content may be scraped to identify transaction information.

At block 530, the system 100 collects transaction information and/or transaction addressing information of the endpoint. The account addressing information may be the account number and the routing number of an account. Billing address, wire routing number, and/or other account information can additionally be pulled. In one variation, the account number and routing number are available in banking statements. An extraction script may be used to pull the document and then isolate the information from the document. Accessing the account number and the routing number in an automated fashion may avoid chances of error. As a first benefit, access to the account provides evidence that the owner of the account participated in providing the transaction endpoint information. As another benefit, the information is automatically pulled, which avoids human error.

Collecting transaction information of the endpoint, at block 530, may additionally include collecting transaction status information of the endpoint, which can include indication of fund requirements, account fraud checks, and other status information. Various stages can be built into providing the transaction information, which provide different safeguards and/or features into financial transactions.

In a first optional stage, the transaction status information can determine a sufficient funds status. The sufficient funds status may be applied to a withdrawal account to ensure that the account has funds to complete the transaction. Transaction history and/or current fund value may be accessed through the account access. In one variation, the fund amount is returned in the response such that the customer/developer/application can respond appropriately. In another variation, the transaction amount is compared to available funds. If sufficient funds are not found, then an error or warning may be raised.

In another optional stage, the account may be processed for fraud patterns. For example, the age of the account may be accessed. Newly created accounts may be less trustworthy than established accounts with significant history. Similarly transaction history may be assessed for fraudulent behavior. If the account is used for a diverse range of transactions indicative of normal behavior then the account may be identified as normal. If the account only participates in repeated high value transactions or other fraud patterns, then the account may be flagged as fraudulent. Additionally, the entities involved in the transaction may be indicative of fraud.

The method may additionally include verifying transaction conditions during one or more stages. Transaction conditions may be used to take any suitable action. The available actions can include permitting a transaction or preventing a transaction. Additionally, the action can include sending a notification. The notification can include an email, text message, a platform message, a phone call, or any suitable notification. The action may additionally include triggering a programmatic event. In one variation the programmatic event is a callback event, wherein an HTTP message is sent to a destination. Conditions may be customized or selected from a set of provided conditions. Example conditions can include a condition that triggers a notification for transactions over a particular amount; a condition based on available funds after the transaction to alert a user to funds below a threshold; and a condition based on the frequency of transactions or the entities involved in the transaction account. Conditions can be scoped for a developer account, a particular institution account, or for any suitable scope of entities.

At block 540, the system 100 returns a transaction response so as to transmit the results of the transaction request. The transaction response may be made in a synchronous API message from the API 110 that is sent in response to an initial request. Alternatively, a status API resource may be used such that an application/service can periodically check the status API resource to determine the processing status and/or the results. Alternatively, any suitable approach may be used to provide the results to the initial request.

In an implementation, the response provides the addressing information used for an endpoint. If there are no errors or warnings with respect to the account, then account information may be NACHA compliant as the endpoint information was accessed and obtained in a manner that validates the ownership of the account (e.g., by providing credentials and optionally multi-factor authentication responses). The transaction response can include the account number, the routing number, and/or any additional information for the endpoint that is used in executing the transaction. The transaction response may additionally include the available funds, such that the requesting entity can check for sufficient funds. The response may additionally indicate if sufficient funds are available if the transaction amount was provided, which functions to hide the available funds from the requesting entity while preventing overdraft transaction. The transaction response can additionally include other fields such as a status field, where the account may be labeled according to any categorization of the account. For example, the status may indicate that the account is normal or fraudulent.

Additionally or alternatively, the method can include optional block 550. At block 550 the system 100 executes the transaction, which functions to process the transaction between two endpoints. In this variation a request to execute a transaction between at least two endpoints is received. Additionally, returning a transaction response may include returning results of the transaction in the response. In another implementation, the method includes executing the transaction. The transaction response can include information about the status of the transaction when the transaction is submitted, being processed, and/or completed. Transactions may not be instantaneous, and as such the initial transaction response may indicate if the transaction was successfully initiated. Successfully initiated means that the transaction endpoint information was successfully retrieved, that any conditional stages (such as a sufficient funds stage, a fraud-check stage, and custom conditions) are satisfied. A subsequent response or status resource may be updated that reflects the status of the transaction. A transaction resource may be updated with a pending process, when the transaction is initiated and proceeding normally. The transaction resource can be updated with a completed status possibly indicating the time of completion. If an error or issue is encountered, the status of the transaction resource may be updated to reflect the error or issue. The method may additionally include monitoring status of transaction and triggering programmatic event according to the status.

In one variation, executing the transaction can include establishing proxy accounts in at least two institutions, and expediting transactions between the two institutions through an internal deposit to a first proxy account in a first institution and a second internal deposit from a second proxy account in the second institution. In some cases, transactions between institutions are slower than transactions made within an institution. By establishing a cross institution account network, transactions can be facilitated between two accounts in different institutions with similar speeds of internal transactions. The proxy accounts may include a funds reserve, which may be periodically balanced between proxy accounts to maintain an operational reserve of funds.

Additionally, the method may be applied to create an abstraction between a user and the underlying account. A transaction endpoint can be abstracted to a user entity, which may be associated with multiple optional transactional endpoints (e.g., different bank accounts). Accordingly, the method may include selecting an institution, which functions to dynamically select a connected account to participate in a transaction. Various conditions may be set to respond to events when receiving a transaction request, collecting information for the transaction, and/or executing a transaction. In one variation, one institution is set as a primary account and another account managed by the same entity is set as a secondary account. If the primary account is not able to complete a transaction, the method may detect an error condition and automatically fails over to the secondary account. In another variation, a set of accounts may be preconfigured to be used depending on properties of the request. In combination with the proxy transfer endpoint, the identifying information for the proxy endpoint can be used, but the underlying service automatically will use an automatically selected account to use for the funds. For example, a set of entities and/or category of entities/transactions may be set to use particular accounts. Similarly, transactions to one proxy account may be automatically split into transactions with multiple associated accounts. For example, an account holder may set a proxy account to automatically split deposits between two accounts in a 30/70 balance.

Referring now to FIG. 6, the system 100 functions to provide an interface (e.g., via the API 110) for applications and services that can facilitate the process of transferring funds. The system 100 can function to provide verified account information used in ACH transfers, to execute transfer of funds, to enable programmatic events during transfer process, to mitigate risk and errors, and/or provide alternative transaction functionality. As described above in reference to FIG. 30, the system 100 is part of a larger API platform, which provides an API to access account data and execute transactions, among other items. In some variations, the system 100 is part of a multi-tenant API platform that enables a plurality of developers to create accounts and build applications and/or services that leverage the API of the API platform. In alternative variations, the system 100 is part of a single-tenant API platform and may provide an internal API for a dedicated set of products or services. For example, a product may be built on top of the API platform that enables end users to create accounts to manage accounts with one or more institutions (e.g., banks, credit card companies, investment managers, etc.).

The API 110 functions to provide an interface for accessing institution transaction endpoint information. The API 110 can additionally provide a normalized customer facing interface. In one implementation, the API 110 leverages an application proxy instance 121, which simulates a proprietary first-party application accessing a closed API of an institution (e.g., the institution 142). The system 100 can include additional components or services that particularly facilitate the access of information relating to a transaction endpoint. For example, a service, script, or module can be configured to access statements or other suitable documents that can contain endpoint information such as account number and routing number information. The statements or information may be contained in PDF or other suitable document formats. The system 100 can include document readers that can access and extract the requested information from the statements.

In one variation, the API 110 allows an API request to specify an account, and a response output provides the information related to executing a transaction with the endpoint. In one implementation, the API 110 can include at least one API resource for interacting with the transaction endpoint. As shown in FIG. 7, an endpoint information request can include institution credentials of an account. The credentials can include username and password. The API protocol can additionally provide a mechanism for completing multi-factor authentication challenges such as security questions, or code-based multi-factor authentication. The API request may additionally include other properties such as developer account identifiers, API authentication tokens, institution type identifiers, and other suitable parameters. The response is a data object that includes at least automatically obtained information such as tracking number, routing number, and/or wire routing number. Additional response information can include funds amount (or alternatively a Boolean indicator if the funds are sufficient), an account status (e.g., is the account fraudulent, trusted, etc.), billing address of the account, name of the institution, type of account (e.g., saving, depository, etc.), and other suitable properties. Other API properties or features can include a mechanism to specify if endpoint information is requested or if the transaction should be executed.

The institution interface module 132 functions to model the internal interface of at least one first-party application with an external institution (e.g., institution 142). The account credentials of a user account (and optionally multi-factor authentication credentials) can be used for an application proxy to gain access to an institution through the institution interface module. The system 100 may additionally include a transaction engine 193, which can facilitate the transfer of funds between two accounts. The transaction engine 193 can be integrated with the API 110, such that an API request can direct the execution of a transaction. The transaction engine 193 can execute ACH transactions, but may alternatively or additionally use other financial tools to withdrawal funds and/or deposit funds. With a transaction engine, transactions can be executed between two accounts that have been configured with account credentials. The API response may include the status of the transaction, transaction errors, a status URI or any suitable response to facilitate executing a transaction as shown in FIG. 8. In one variation, proxy accounts can be used in different institutions. With sufficient reserves, transfers between institutions can be expedited by transferring funds to and from the proxy accounts, and then asynchronously updating the proxy accounts.

The system 100 can also include, in some implementations, a token generation engine 195 (which can manage token generation, as described herein), and/or a record vault 1302 (which may store electronic records associated with the tokens, as described herein).

The system 100 can additionally include other aspects such as a messaging/notification system, which can manage alerts and/or triggering programmatic events (e.g., callbacks), an engine for generating user interfaces and/or user interface data, and/or the like. The system 100 may additionally or alternatively include any other suitable components to implement the functionality of described in the present disclosure.

In some implementations, the system 100 includes a document processing engine 194. In some implementations, the document processing engine 194 is constructed to process account documents (e.g., account documents 192) of an external user account system (e.g., bank system 142) of an external institution. The account documents may be processed to identify and/or obtain transaction information. In some implementations, in a case where the documents are in a PDF format, the document processing engine 194 is constructed to scrape content of the PDF documents to identify the transaction information. In some implementations, the document processing engine 194 is an extraction script that is constructed to pull the document and then isolate the transaction information from the document (e.g., as described above in reference to FIG. 5). In some implementations, the system 100 accesses the document, stores the accessed document (e.g., in a memory or other storage medium of the system 100), and then controls the document processing engine to process the stored document to identify the transaction information.

Figure 9:
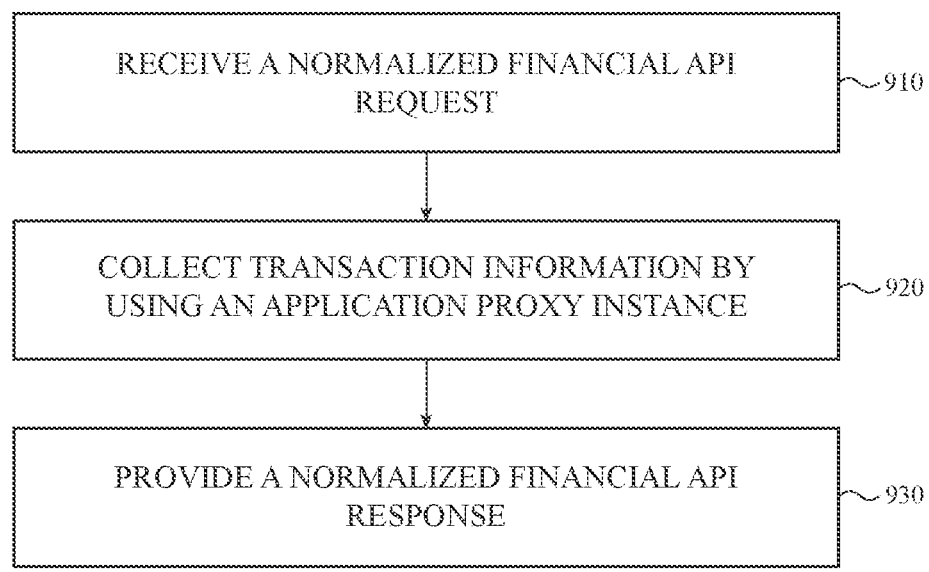
FIGS. 9-11 are flowcharts illustrating example methods of processing transactions, according to various embodiments.
Figure 10:
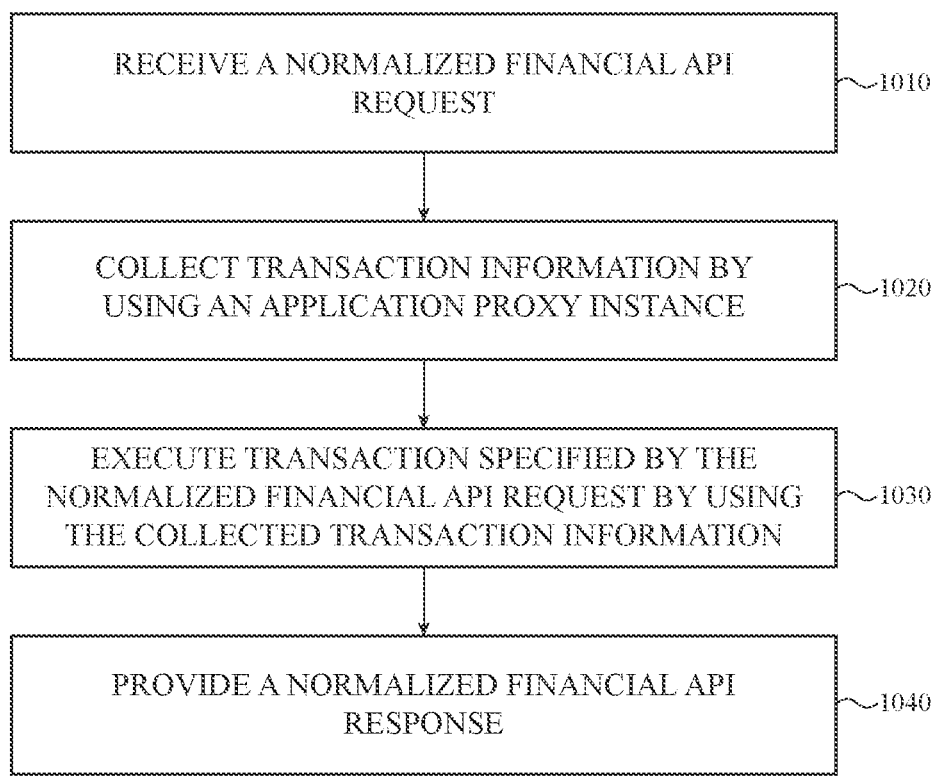

FIGS. 9-10 are flowcharts illustrating example methods of processing transactions, according to various embodiments. The methods of FIGS. 5-6 are described below in reference to certain aspects of FIG. 30 (or, alternatively, FIG. 6).

Referring to FIG. 9, a method for processing a normalized API request at the system 100 includes: receiving a normalized API request associated with at least one account endpoint, the normalized API request being provided by an external user-facing system/application (e.g., system/application 152 of FIG. 30) by using API 110 of the system 100, the normalized API request specifying account credentials of each account endpoint of the normalized API request (block 910).

Responsive to the normalized API request: transaction information of each account endpoint of the normalized API request is collected by using an application proxy instance (e.g., one of proxy instances 121, 122, and/or 123 of FIG. 30) associated with the account endpoint to collect the transaction information from a corresponding institution system (e.g., an external user account system 141, 142, and/or 143 of FIG. 30) by using the associated account credentials specified by the normalized API request and a proprietary API) (e.g., one of APIs 161, 162, and/or 163 of FIG. 30) of the system 100 (block 920).

Further, a normalized API response is provided to the external user-facing system/application (block 930). The normalized API response provides the transaction information of each account endpoint of the normalized API request. Each application proxy instance is constructed to simulate an application of the corresponding external institution system.

In some implementations, the collected transaction information for each account endpoint includes at least an account number and a corresponding routing number for use in automated clearing house (ACH) transactions. In some implementations, the transaction information is collected by processing at least one statement accessed from the corresponding external institution system.

Additional examples and details of obtaining transaction and account information via proxy instances of the system may be found in U.S. patent application Ser. No. 14/790,897, filed Jul. 2, 2015, and titled "SYSTEM AND METHOD FOR FACILITATING PROGRAMMATIC VERIFICATION OF TRANSACTIONS" (referred to herein as "the '897 application"). The entire disclosure of this application is hereby made part of this specification as if set forth fully herein and incorporated by reference for all purposes, for all that it contains.

Processing a Normalized Financial API Request Based on User Information

FIG. 10 depicts a method 1000 for processing a normalized API request at a financial platform system. The financial platform system is constructed to programmatically access at least one external financial institution system external to the financial platform system. The processes 1010, 1020, and 1030 of the method 1000 of FIG. 10 are performed responsive to a normalized financial API request provided by a financial application system by using a financial platform API of the financial platform system. The normalized financial API request specifies user information corresponding to at least one financial account endpoint of at least one external financial institution system.

The process 1010 includes using at least one application proxy instance associated with the normalized API request to collect transaction information from a corresponding financial institution system by providing the financial institution system with a proprietary financial API request that specifies at least account credentials associated with the user information specified by the normalized financial API request. The transaction information is included in at least one proprietary financial API response provided by the financial institution system.

The process 1020 includes generating a normalized financial API response based on the collected transaction information. The process 1030 includes providing the normalized financial API response to the financial application system.

Each application proxy instance is constructed to simulate an application of the corresponding financial institution system on behalf of a user associated with the application proxy instance.

In some implementations, each proprietary API is a private API of the respective financial institution system, and each proprietary API is different from a web browser interface.

In some implementations, the normalized financial API request is provided on behalf of a user account of the financial application system, and the specified user information includes information associated with the user account.

In some implementations, the normalized financial API request is provided on behalf of a user account of the financial application system, and the specified user information includes information associated with a user that is different from a user of the user account of the financial application system.

In some implementations, the normalized financial API request is a request for financial account endpoint information, and each proprietary financial API request is a request for financial account endpoint information, and wherein the transaction information includes financial account endpoint information.

In some implementations, the normalized financial API request is a request to transfer funds from at least one withdrawal account endpoint to at least one deposit account endpoint and the normalized financial API request specifies an amount of funds to be transferred.

In some implementations, the collected transaction information for each financial account endpoint includes at least an account number and a corresponding routing number for use in automated clearing house (ACH) transactions.

In some implementations, the transaction information is collected by processing at least one financial statement accessed from the corresponding external financial institution system.

In some implementations, the financial platform system includes an institution interface module for each external financial institution system, each institution interface module models the proprietary API of the external financial institution system, and each application proxy instance uses a corresponding institution interface module to collect the transaction information from the external financial institution system.

In some implementations, the financial platform system generates each institution interface module by at least one of: parsing source code of the application of the associated external financial institution system; and parsing communication between the application and the associated external financial institution system.

In some implementations, each institution interface module defines headers of messages sent to the associated external financial institution system.

In the example embodiment of FIG. 10, the method 1000 is implemented by the financial platform system 500. In the example embodiment, the financial platform system is constructed to programmatically access transaction information as described herein for the method 1000.

Figure 11:
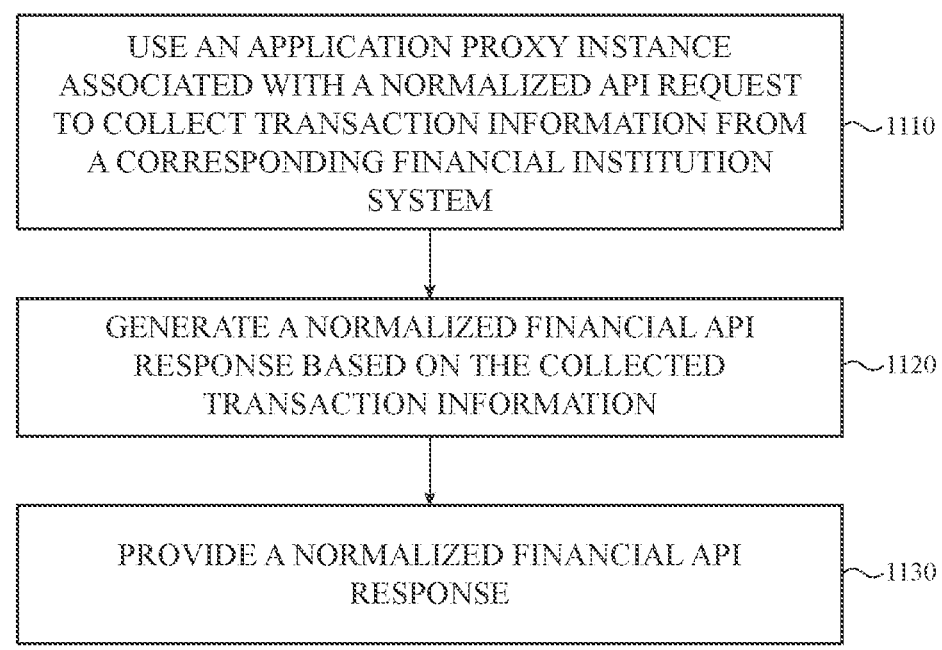

Referring to FIG. 11, a method for processing a normalized API request at the system 110 includes: receiving a normalized API request associated with at least one account endpoint (block 1110). The normalized API request is provided by an external application system by using a platform API of the platform system. The normalized API request specifies a transaction and at least one of an account token and account credentials of each account endpoint of the normalized API request.

Responsive to the normalized API request, transaction information of each account endpoint of the normalized API request is collected (block 1120). The transaction information is collected by using an application proxy instance associated with the account endpoint to collect the transaction information from a corresponding institution system by using at least one of an associated account token and associated account credentials specified by the normalized API request and by using a proprietary API of the institution system.

The transaction specified by the normalized API request is executed by using the collected transaction information (block 1130). A normalized API response is provided to the external system (block 1140). The normalized API response provides results of the transaction. Each application proxy instance is constructed to simulate an application of the corresponding external institution system.

In some implementations, the collected transaction information for each account endpoint includes at least an account number and a corresponding routing number for use in automated clearing house (ACH) transactions.

In some implementations, the transaction information is collected by processing at least one statement accessed from the corresponding external institution system.

In some implementations, the transaction information (and/or any other account-related information) is collected via one or more of: an application proxy instance, screen scraping (e.g., of a webpage of the institution), an API request to an API of the institution (e.g., that the system is authorized to access), or any combination of these methods. The transaction information may be supplied in an API response. However, in the situation of creating a financial report, the process of collecting transaction information can be collected and used in creating a financial report.

Additional examples and details of such functionality of the system may be found in the '897 application.

In some implementations, the user information of the normalized API request includes a user account identifier for each user account of the external user-facing system/application (e.g., the external user-facing system/application 162) corresponding to the normalized API request.

In some implementations, the normalized API request includes parameters as shown in Table 1.

TABLE 1

| NORMALIZED API REQUEST PARAMETER | DESCRIPTION |
|---|---|
| <Platform Account ID> | An account of an external user-facing system/application (e.g., "Dev Account A", "Dev Account B" of FIGS. 1 and 4A-4B). |
| <User Account Identifier> | An identifier that identifies a user account of the application system identified by the <Platform Account ID> parameter. |
| <Institution ID> | An identifier that identifies an external institution system (e.g., institutions 151, 152, and/or 153). |

In some implementations, the <User Account Identifier> is used to select at least one corresponding application proxy instance, and each selected application proxy instance includes user credentials (e.g., as depicted in FIG. 33B) to access the associated institution system.

In some implementations, the system 110 (e.g., FIGS. 7-8) determines an application proxy instance associated with the normalized API request based on the <Platform Account ID> parameter, the <User Account Identifier> parameter, and the <Institution ID> parameter. In some implementations, the system 110 identifies an application proxy instance of the application proxy system 130 that is managed in association with the <Platform Account ID> parameter, the <User Account Identifier> parameter, and the <Institution ID> parameter, and uses the identified application proxy instance to collect the transaction information.

In some implementations, each proprietary API request includes parameters as shown in Table 2.

TABLE 2

| PROPRIETARY API REQUEST PARAMETER | DESCRIPTION |
|---|---|
| <User Credentials> | The user credentials of the corresponding normalized API request. The user credentials are specified by the application proxy instance, e.g.,*421-425, (e.g., as shown in FIG. 33B) used to provide the proprietary API request. |

In various other implementations, the normalized API requests and/or the proprietary API requests may include other sets of parameters, depending on the specifics of the APIs and the types of requests involved. For example, other requests may include identifier tokens, multiple account identifiers (e.g., when requesting transfer of funds), etc. Additional examples and details of such other types of requests and functionality of the system may be found in the '897 application.

In some implementations, the system may send various types of alerts and/or other indications to a user computing device (e.g., user computing devices 181, 182, and/or 183 of FIG. 30). These various types of alerts and/or other indications may activate one or more applications (e.g., an SMS (simple message service) and/or MMS (multimedia messaging service) process and/or application, an email process and/or application, a process and/or application related to the system, a first-party and/or third-party process and/or application (e.g., of an institution and/or a user-facing application/service), and/or the like) on the user computing device. For example, as described herein, alerts may be communicated with the user computing device for the purpose of completing a multi-factor authentication process. In such an example, an SMS message with a secret/authentication code may be communicated to the user computing device, activating an SMS process and/or application (and/or another process and/or application) on the user computing device. Such an alert may be sent by the system and/or an institution system. In another example, the system may send alerts to the user computing device regarding access to a user account of the user, a transaction, and/or the like. Such alerts may notify the user that a new transaction has posted to their account, that a transaction has posted for a particular amount, a transaction has been denied, and/or the like. Such alerts may comprise SMS messages, email messages, and/or other types of messages that may activate various processes and/or applications, as described above. In yet another example, the system may send an alert to the user computing device including an account document, which may cause a process and/or application suitable for reading the account document to be activated on the user computing device.

System Architecture

Figure 12:
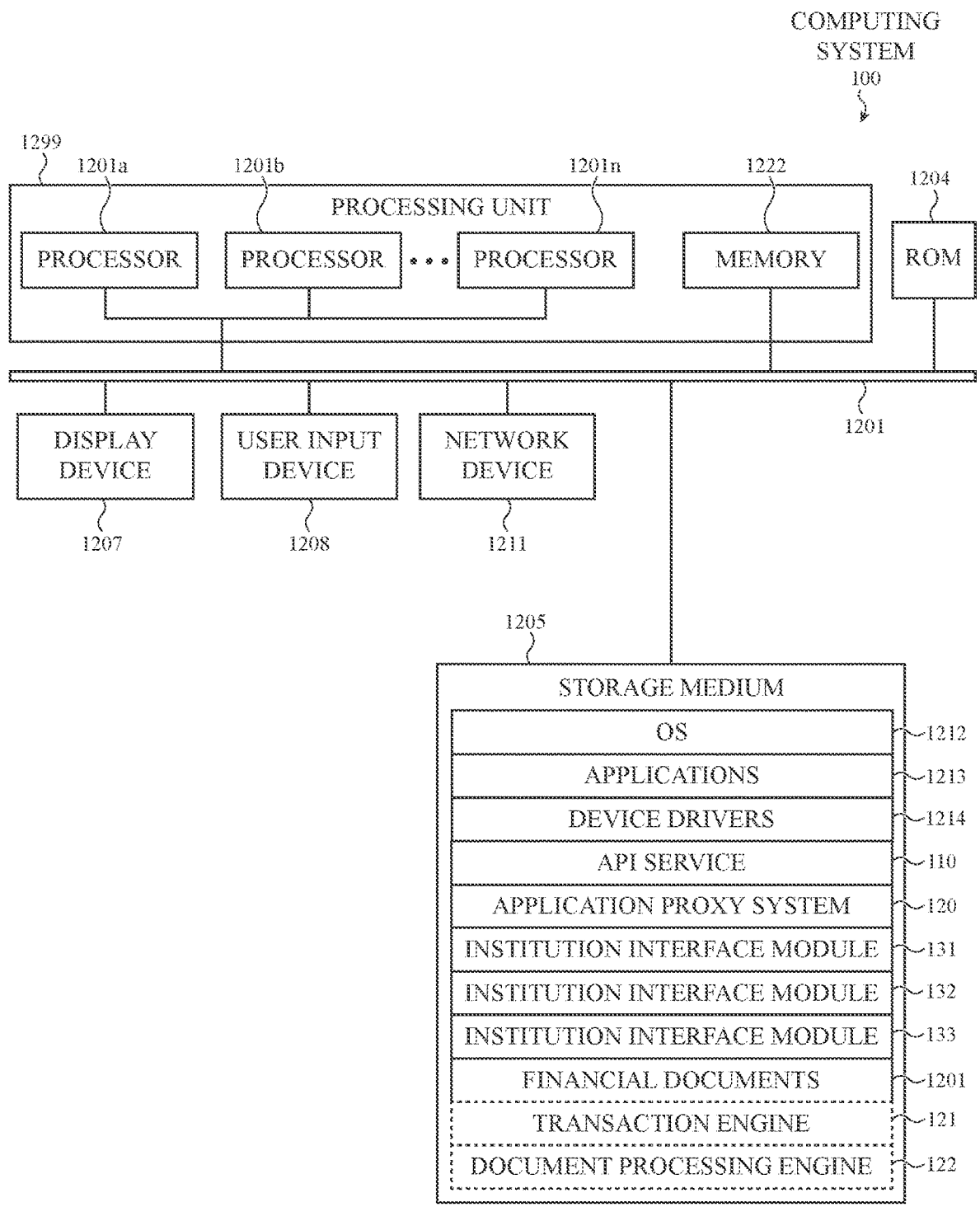
FIG. 12 is a block diagram of an example architecture of the system, according to an embodiment.

FIG. 12 is an architecture diagram of the system 110 according to an implementation in which the system is implemented by a server device. Alternatively, the system may be implemented by a plurality of devices, in a hosted computing environment (e.g., in a cloud server), and/or in any other suitable environment.

The bus 1202 interfaces with the processors 1201A-1201N, the main memory (e.g., a random access memory (RAM)) 1222, a read only memory (ROM) 1204, a computer readable storage medium 1205 (e.g., a non-transitory computer readable storage medium), a display device 1207, a user input device 1208, and a network device 1211.

The processors 1201A-1201N may take many forms, such as ARM processors, X86 processors, and/or the like.

In some implementations, the system includes at least one of a central processing unit (processor) and a multi-processor unit (MPU).

The processors 1201A-1201N and the main memory 1222 form a processing unit 1299. In some embodiments, the processing unit includes one or more processors communicatively coupled to one or more of a RAM, ROM, and computer readable storage medium; the one or more processors of the processing unit receive instructions stored by the one or more of a RAM, ROM, and computer readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of an API, an application proxy system, one or more instance interface modules, account documents, a transaction engine, a document processing engine, and/or any other functionality or aspects of the system as described herein.

The network adapter device 1211 provides one or more wired or wireless interfaces for exchanging data and commands between the system and other devices, such as external user account systems (e.g., institutions 151, 152, and/or 153), external user-facing systems/applications (e.g., applications 161 and/or 162), user devices (e.g., user devices 181 and/or 182), and/or the like. Such wired and wireless interfaces include, for example, a universal serial bus (USB) interface, Bluetooth interface, Wi-Fi interface, Ethernet interface, near field communication (NFC) interface, and/or the like. In some embodiments, the system communicates with other devices via the Internet.

Machine-executable instructions (e.g., computer readable program instructions) in software programs (such as an operating system, application programs, and device drivers) are loaded into the memory 1222 (of the processing unit 1299) from the processor-readable storage medium 1205, the ROM 1204 or any other storage location. During execution of these software programs, the respective machine-executable instructions are accessed by at least one of processors 1201A-1201N (of the processing unit 1299) via the bus 1202, and then executed by at least one of processors 1201A-1201N. Data used by the software programs are also stored in the memory 1222, and such data is accessed by at least one of processors 12001A-12001N during execution of the machine-executable instructions of the software programs. The processor-readable storage medium 1205 includes an operating system 1212, software programs/applications 1213, device drivers 1214, the API 120, the application proxy system 130, the institution interface modules 141, 142, and 143, and account documents 202. In some implementations, the processor-readable storage medium 1205 includes the transaction engine 203, the document processing engine 204, the token generation engine 205, and/or the record vault 1402 (which may comprise an encrypted or otherwise secured database or data store, as described below).

Further details regarding the system architecture are described below.

Figure 13:
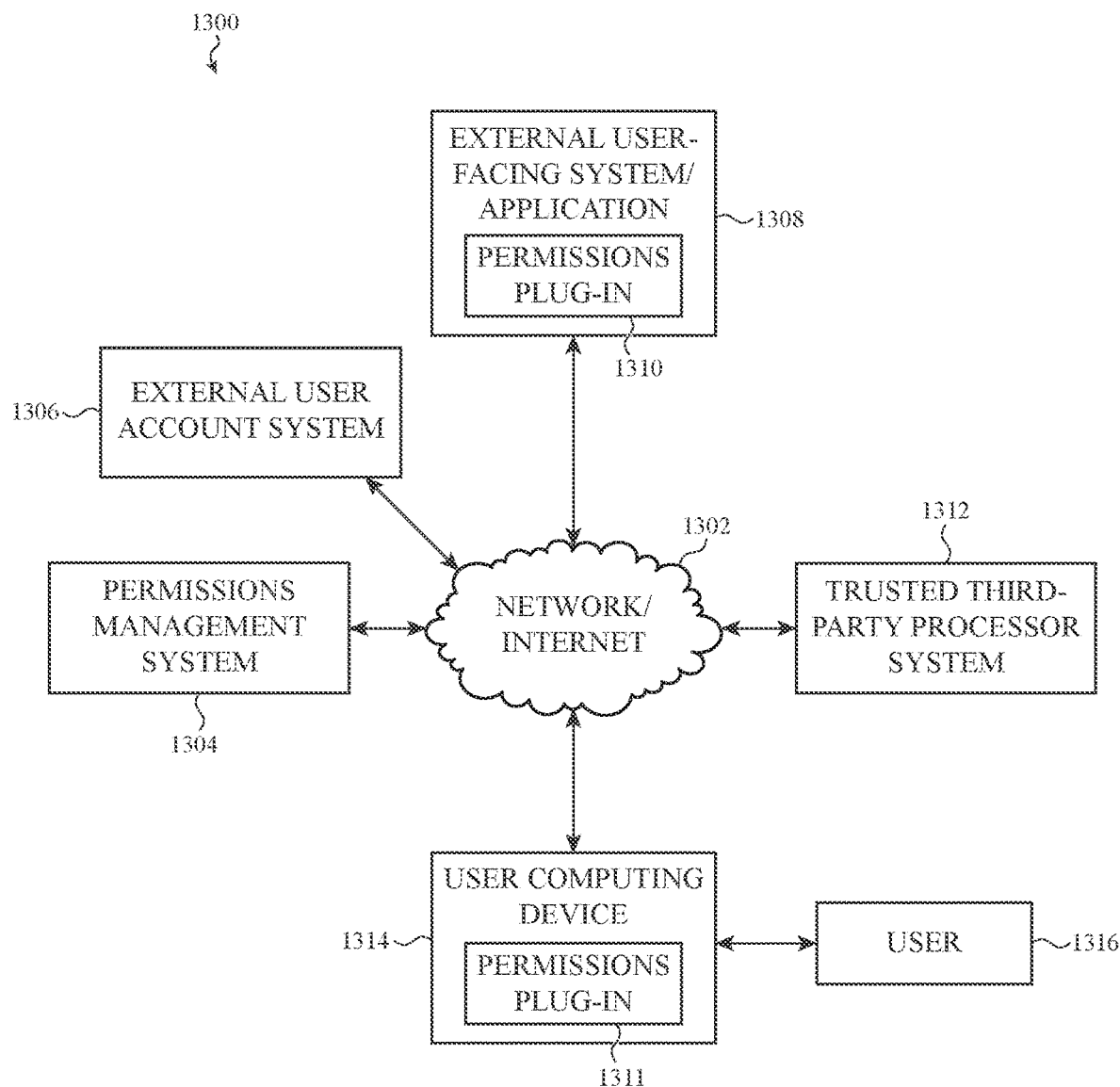
FIG. 13 illustrates an example network environment in which a permissions management system may operate, according to an embodiment.

Example Network Environment of the System when Implementing Permissions Management FIG. 13 illustrates an example network environment 1300 in which a permissions management system 1304 (i.e., a data management platform) may operate, according to an embodiment. As shown, the network environment includes the permissions management system 1304, an external user account system 1306, an external user-facing system/application 1308, a permissions plug-in 1310, a permissions plug-in 1311, a trusted third-party processor system 1312, a user computing device 1314, and a user 1316. The various aspects of the network environment 1300 may communicate via a network/Internet 1302. The network/Internet 1302 may comprise a wired and/or wireless network, and/or in certain embodiments may comprise one or more wired and/or wireless network. The various components of the network environment 1300 may communicate via the network/Internet 1302, and/or alternatively may communicate directly with one another via one or more other wired or wireless connections. In some embodiments, the permissions management system 1304 may include the functionality of the system 110 described above, and/or the functionality of the system 110 described above may be implemented in one or more other computing systems in the network environment 1300. For clarity of description, however, the following description assumes that the permissions management system 1304 includes the functionality of the system 110 described above.

Additionally, the external user account system 1306 may comprise a system of an institution (e.g., one of institution systems 151, 152, and/or 153), and while more than one the external user account system 1306 may be involved in communication with the permissions management system 1304, one external user account system 1306 is shown in FIG. 13 for purposes of clarity.

Further, external user-facing system/application 1308 may comprise the system and/or application, merchant, and/or the like, with which the user may interact. For example, the user 1316 may interact with the external user-facing system/application 1308 via the user computing device 1314. In one example, the external user-facing system/application 1308 may comprise an app, and/or web-based application, running on and/or rendered by the user computing device 1314 (e.g., a mobile device, and/or the like), as described above (e.g., in reference to app 161 and/or 162).

In an embodiment, the external user-facing system/application 1308 may include the permissions plug-in 1310. The permissions plug-in 1310 may comprise a software/code module, snippet, and/or the like, which may be integrated into the external user-facing system/application 1308. The permissions plug-in 1310 may be provided by the permissions management system 1304 and/or the external user account system 1306 such that the external user-facing system/application 1308 may include functionality provided by the permissions management system 1304 (either directly or indirectly via the external user account system 1306). In one implementation, the permissions plug-in 1310 comprises JavaScript code (or code written in any other programming language) integrated into the external user-facing system/application 1308. For example, a loan management system application may integrate the permissions plug-in 1310 to facilitate linking a user account with an external financial institution. The JavaScript code, when executed, may communicate with the permissions management system 1304 and/or the external user account system 1306 to provide certain functionality as described herein. Advantageously, in some implementations, the permissions plug-in 1310 may generate interactive user interfaces that may be presented to the user 1316. Information may be obtained from the user 1316 via the interactive user interfaces of the permissions plug-in 1310 (e.g., account credentials, and/or the like). The permissions plug-in 1310 may obtain such information, and communicate the information to the permissions management system 1304 and/or the external user account system 1306 in a secure manner such that the external user-facing system/application 1308 does not have access to the information provided by the user 1316.

Further, the permissions plug-in 1310 may advantageously handle establishing secure communications with the permissions management system 1304 and/or the external user account system 1306, and/or other functionality as described herein, such that a developer of the external user-facing system/application 1308 need not be concerned with these aspects (thus speeding development of the external user-facing system/application 1308).

In an embodiment, the user computer device 1314 may include the permissions plug-in 1311 that functions similarly to the permission plug-in 1310 described above. Similar to the permissions plug-in 1310, the permissions plug-in 1311 may comprise a software/code module, snippet, and/or the like. The permissions plug-in 1311 may be integrated into another software application executed by the user computing device 1314 (e.g., a software application dedicated to enabling communications with, e.g., the external user account system 1306) or may otherwise be executable by the user computing device 1314 (e.g., by a web browser of the user computing device 1314). The permissions plug-in 1311 may be provided by the permissions management system 1304 and/or the external user account system 1306 such that the user computing device 1314 may include functionality provided by the permissions management system 1304 (either directly or indirectly via the external user account system 1306). In one implementation, the permissions plug-in 1311 comprises JavaScript code or code written in any other programming language. The JavaScript code, when executed, may communicate with the permissions management system 1304 and/or the external user account system 1306 to provide certain functionality as described herein. Advantageously, in some implementations, the permissions plug-in 1311 may generate interactive user interfaces that may be presented to the user 1316. Information may be obtained from the user 1316 via the interactive user interfaces of the permissions plug-in 1311 (e.g., account credentials, and/or the like). The permissions plug-in 1311 may obtain such information, and communicate the information to the permissions management system 1304 and/or the external user account system 1306 in a secure manner such that the external user-facing system/application 1308 does not have access to the information provided by the user 1316. Further, the permissions plug-in 1311 may advantageously handle establishing secure communications with the permissions management system 1304 and/or the external user account system 1306, and/or other functionality as described herein, such that a developer of the external user-facing system/application 1308 need not be concerned with these aspects (thus speeding development of the external user-facing system/application 1308).

In addition to the detailed description of the functionality provided below, additional examples and details may be found in U.S. Provisional Patent Application No. 62/225,603, filed Sep. 8, 2115, and titled "Link," previously incorporated by reference herein.

Example Action Diagrams for Authorization

Figure 14A:
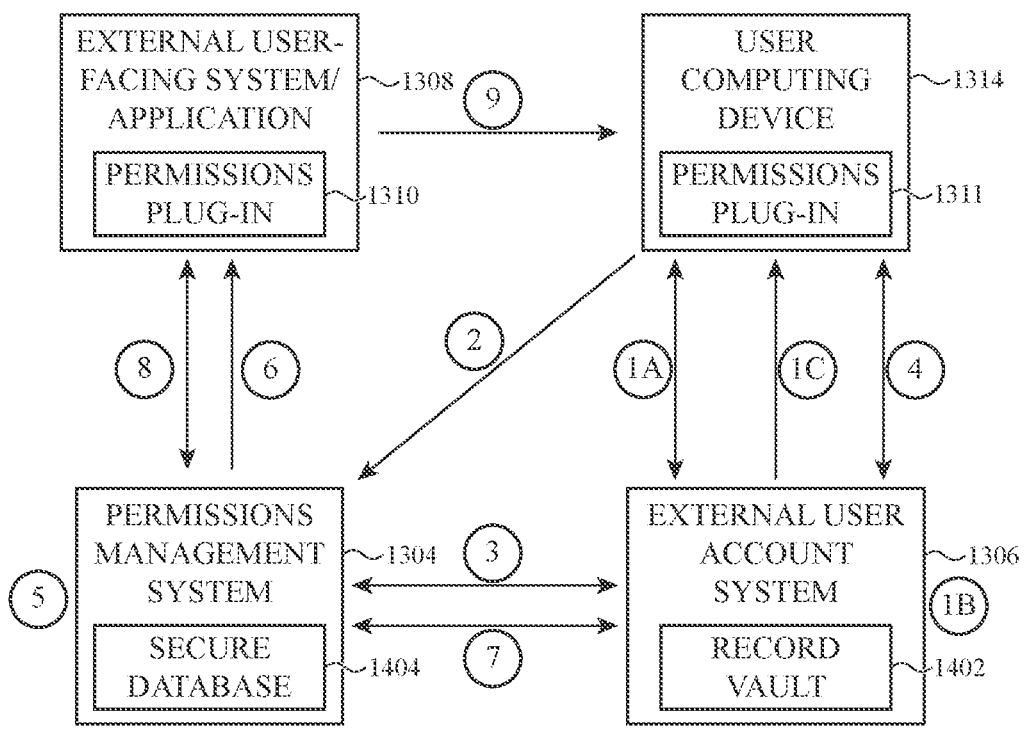
FIGS. 14A-14B and 15-16 are action diagrams illustrating example interactions among the aspects of the network environment, according to various embodiments.
Figure 14B:
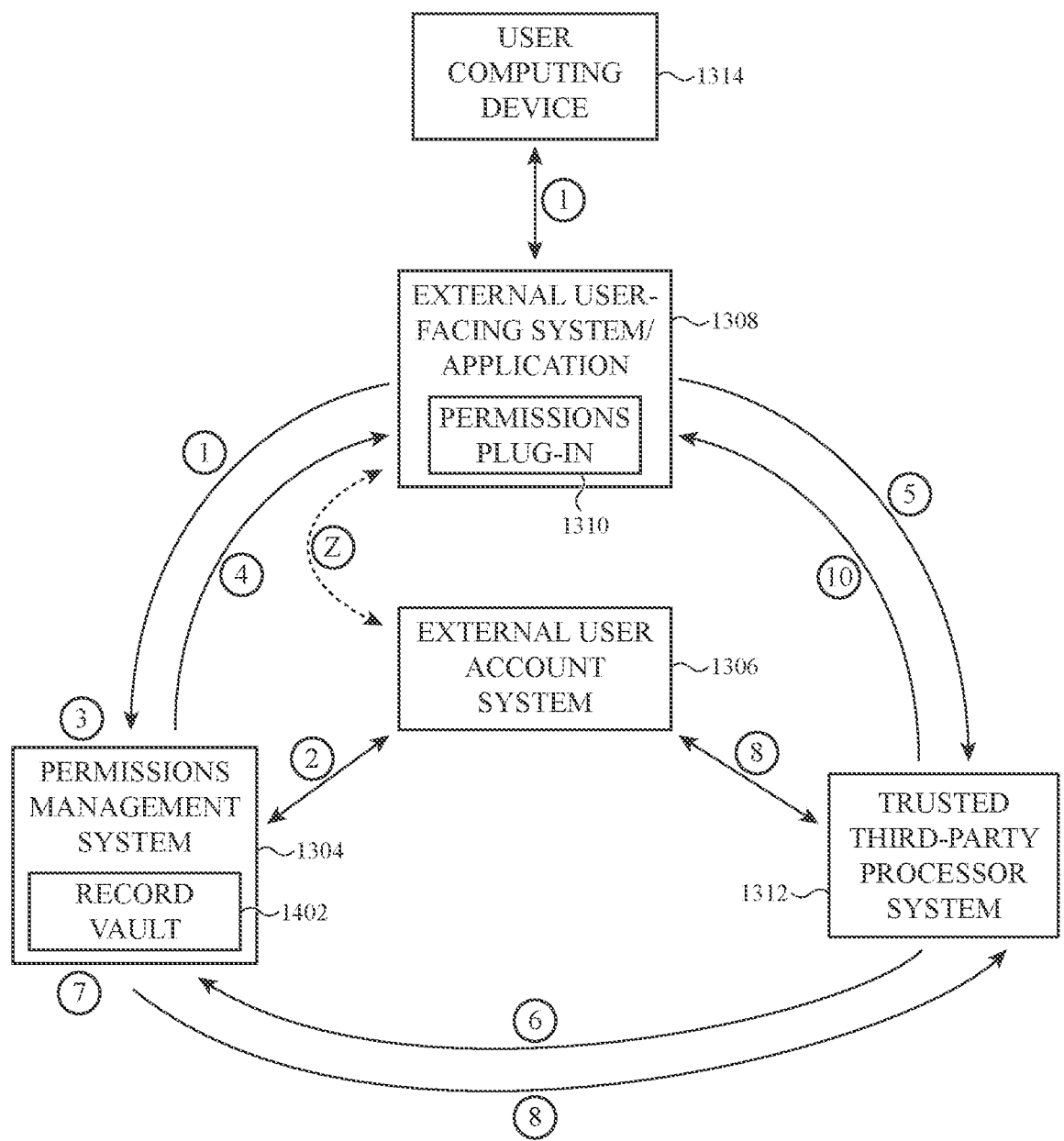

FIGS. 14A-14B are action diagrams illustrating example interactions among the aspects of the network environment 1300, according to an embodiment. As described below, interactions among the various aspects of the network environment 1300 may enable permissioning of access to, and execution of transactions on, user accounts on the external user account system 1306 (or multiple external user account systems 1306). Further, interactions among the various aspects of the network environment 1300 may enable a user to grant authorization and/or revoke authorization to access their accounts.

In the action diagrams of FIGS. 14A-14B, and other action diagrams described herein, in various implementations the actions shown and described may be performed in orders different from those shown. For example, certain actions may take place before or after other actions, according to various implementations.

Interaction among the aspects of the network environment 1300 may be accomplished via various API calls (e.g., through API 120), as generally described above. Thus, for example, account credentials, user information, token identifiers, transaction requests, and/or any other information transmitted during the interactions described below may be communicated via normalized API requests. As described above, the API of the permissions management system 1304 may advantageously be clearly defined such that software applications and/or systems may be efficiently developed to interact with the permissions management system 1304 in an efficient manner. Additionally, each communication among aspects of the network environment 1300 may include multiple requests and/or acknowledgments in order to ensure effective communication. Further, communications may be made via secure connections.

FIG. 14A is an action diagram illustrating example interactions among the aspects of the network environment 1300, according to an embodiment. In the action diagram of FIG. 14A, the system enables a user to authorize access to a user account, according to an embodiment.

In action 1a, the user computing device 1314 interacts with the external user account system 1306. Such an interaction may arise, for example, when a user of the user computing device 1314 provides an input indicating an intent to provide authorization to a user account. For example, the user may be interacting, via the user computing device 1314, with the external user-facing system/application 1308 (e.g., the user may access an app and/or website of a merchant on their mobile device or desktop computer). The user may desire, or may be prompted to, provide the external user-facing system/application 1308 authorization to access user account data of a user account of the user (e.g., a user account held by the institution associated with the external user account system 1306). Accordingly, in an embodiment, the permissions plug-in 1311 may be executed by the user computing device 1314, which may present an interactive user interface to the user (as described in further detail below in reference to FIG. 19). Examples of interactive user interfaces enabled by the permissions plug-in 1311 are described below in reference to FIGS. 22A-22L.

In various implementations, the interactive user interface may be generated by the permissions plug-in 1310, the permissions plug-in 1311, another software application, and/or any combination of these. Through the interactive user interface, the user may provide account credentials and/or other authorization for access to an account of the user. As described below, the authorization may include various limitations on access to the account (herein referred to as "permissions" and/or the like). Access to the account may include, for example, the ability to execute transactions, the ability to obtain information related to the user, the ability to obtain transaction information, and/or the like. As mentioned above, the authorization, account credentials, and/or the like, may be provided via the permissions plug-in 1311 to the external user account system 1306 in a secure manner such that the information provided is not accessible to the external user-facing system/application 1308 or the permissions management system 1304. Thus, advantageously, according to various embodiments of the present disclosure, the user may securely provide sensitive information to the external user account system 1306 without revealing such information to the external user-facing system/application 1308 (e.g., a merchant, developer, etc.) or the permissions management system 1304.

Communication between the permissions plug-in 1311 and the external user account system 1306 may include transmission of certain information. For example, the permissions plug-in 1311 may transmit a client ID (e.g., a unique identifier associated with the external user-facing system/application 1308, which may be obtained from the external user-facing system/application 1308), a user identifier (e.g., a unique identifier associated with the user), account credentials, a secret key, and/or the like to the external user account system 1306, which may be processed and verified by the external user account system 1306.

In action 1b, based on the information received from the user computing device 1314, the external user account system 1306 generates an electronic record. The electronic record is generated by the external user account system 1306 as described in further detail below, however, the electronic record may include one or more of: a unique record name, account credentials, an identifier associated with the user, an identifier associated with the external user-facing system/application 1308 (e.g., the client ID), user account information, or one or more permissions.

As shown, the external user account system 1306 may include a record vault 1402, which, as described herein, comprises one or more databases securely storing generated electronic records. Accordingly, in action 1*a*, the electronic record that is generated by the external user account system 1306 is stored in the record vault 1402. Each generated electronic record may be associated with, and identified by, a token (e.g., a unique identifier associated with that electronic record, also referred to herein as a "unique record identifier"). In an embodiment, the token (e.g., the unique record identifier) is generated based on an encrypted hash of one or more elements of the electronic record. Alternatively, the token may be randomly generated.

In an implementation, the electronic record and/or the token may be generated without verification that the account credentials are valid or correct.

In action 1*c*, the token is transmitted to the user computing device 1314, and in action 2, the token is transmitted to the permissions management system 1304. Alternatively, the token may be transmitted to the permissions management system 1304 directly.

In action 3, the permissions management system 1304 may interface with the external user account system 1306, using the token, to initiate or enable access to the user account data associated with the user. At this point, the external user account system 1306 may verify that the account credentials are valid, and may return a message to the permissions management system 1304 if so or if not. If so, the external user account system 1306 may generate and store an access key (e.g., a unique identifier) similar to the token that may be used by the permissions management system 1304 to request additional access to the user account data. The access key may therefore be transmitted to the permissions management system 1304. In some implementations, the access key and the token are similar or the same, such that an access key may not be generated, but the token may be used to access the user account data.

Additionally in action 3, the account credentials provided by the user may be used to obtain user account data (e.g., user account information, account numbers, routing numbers, and/or the like). Communication with the external user account system 1306 may be accomplished via an API (public or non-public) or other suitable communications method. In some implementations, communications are accomplished as generally described above in reference to various figures, wherein, for example, virtual instances of an application of the external user account system 1306 may be generated to communicate with the external user account system 1306 via a public/non-public API.

In action 4, if the account credentials are verified as valid, the external user account system 1306 may communicate with the user computing device 1314 to prompt the user to accept terms and conditions of other forms required by the external user account system 1306. In some implementations, such a prompt may be provided before account credentials are verified.

Additionally in action 4, the external user account system 1306 may communicate with the user computing device 1314 to prompt the user to select a specific account from a plurality of accounts (or other information) via an interactive user interface presented to the user, e.g., by the permissions plug-in 1311.

In some implementations, as described below in reference, e.g., to actions 1 and 2 of FIG. 14B, the interactive user interfaces through which the user may provide the account credentials and other information may be provided via the permissions management system 1304, the external user account system 1306, the permissions plug-in 1310, and/or the permissions plug-in 1311. In some implementations, as also described below, rather than the user providing account credentials via the permissions management system 1304, the permissions management system 1304, external user account system 1306, the permissions plug-in 1310, and/or the permissions plug-in 1311 may cause the interactive user interface displayed to the user to be redirected to a page or user interface provided directly by the external user account system 1306.

In action 5, the permissions management system 1304 may store the token and/or the access key in a secure database 1404, which may be similar to the record vault 1402 described herein, and which may be encrypted, for example.

In action 6, the permissions management system 1304 may generate and store an API access key (e.g., a unique identifier) similar to the token that may be used by the external user-facing system/application 1308 to request user account data. The API access key may therefore be transmitted to the external user-facing system/application 1308. In some implementations, the API access key and the token are similar or the same, such that an API access key may not be generated, but the token may be used to access the user account data.

In various embodiments, secure communication between the permissions management system 1304 and the external user-facing system/application 1308 may be established via any suitable method. For example, in an implementation, the permissions management system 1304 may provide a "public token" to the external user-facing system/application 1308. In response, the external user-facing system/application 1308 may provide to the permissions management system 1304 a client ID, the public token, and a secret key/identifier (that was previously securely provided to the external user-facing system/application 1308 from the permissions management system 1304. The permissions management system 1304 may then use this information (e.g., the client ID, the public token, and the secret key/identifier) to authenticate the access and communications to and from the external user-facing system/application 1308. Similar or alternative methods of establishing secure communications between various devices of the system may be used in various embodiments of the disclosure.

In action 7, the permissions management system 1304 may use the token and/or the access key to obtain additional user account data (e.g., transaction data) from the external user account system 1306. As described above, communication with the external user account system 1306 may be accomplished via an API (public or non-public) or other suitable communications method. In some implementations, communications are accomplished as generally described above in reference to various figures, wherein, for example, virtual instances of an application of the external user account system 1306 may be generated to communicate with the external user account system 1306 via a public/non-public API.

In action 8, user account data is requested by and/or provided to the external user-facing system/application 1308. For example, the external user-facing system/application 1308 may request user account data by providing the token and/or API access key to the permissions management system 1304.

In some implementations, action 7 may be performed multiple times automatically. For example, action 7 may be performed periodically or on a schedule. Alternatively, action 7 may be performed in response to requests received, e.g., from the external user-facing system/application 1308. In various embodiments, actions 7 and 8 may occur in any order and/or simultaneously.

In action 9, the external user-facing system/application 1308 may provide user account information to the user computing device 1314 (e.g., via a software application on the user computing device 1314).

Accordingly, as described in action diagram of FIG. 14A, via interaction with the external user-facing system/application 1308 and/or the user computing device 1314, the user may provide account credentials and authorize access to user account data by the external user-facing system/application 1308, without sharing user account information with the external user-facing system/application 1308. Advantageously, according to certain embodiments, the external user-facing system/application 1308 need not be trusted with the user account information, which may simplify development of the external user-facing system/application 1308, and give a user piece of mind in its interactions with the external user-facing system/application 1308. Additionally, as is described below, implementations of the system may enable the user to de-authorize, view permissions of, and/or change permissions of, the external user-facing system/application 1308.

FIG. 14B is an action diagram illustrating example interactions among the aspects of the network environment 1300, according to an embodiment. In various embodiments, actions and aspects of the actions described above with reference to FIG. 14A may similarly be applied to the actions of FIG. 14B.

In action 1 of FIG. 14B, a user interacts with the external user-facing system/application 1308 via the user computing device 1314. For example, the user may access an app and/or website of the merchant on their mobile device or desktop computer. While the user is interfacing with the external user-facing system/application 1308, the external user-facing system/application 1308 may execute the permissions plug-in 1310, which may present an interactive user interface to the user (as described in further detail below in reference to FIG. 19). Examples of interactive user interfaces enabled by the permissions plug-in 1310 are described below in reference to FIGS. 22A-22L.

Through the interactive user interface, the user may provide account credentials and/or other authorization for access to an account of the user. As described below, the authorization may include various limitations on access to the account (herein referred to as "permissions" and/or the like). Access to the account may include, for example, the ability to execute transactions, the ability to obtain information related to the user, the ability to obtain transaction information, and/or the like. As mentioned above, the authorization, account credentials, and/or the like, are provided via the permissions plug-in 1310 to the permissions management system 1304 in a secure manner such that the information provided is not accessible to the external user-facing system/application 1308. Thus, advantageously, according to various embodiments of the present disclosure, the user may securely provide sensitive information to the permissions management system 1304 without revealing such information to the external user-facing system/application 1308 (e.g., a merchant, developer, etc.).

Establishing secure communication between the permissions plug-in 1310 and the permissions management system 1304 may include transmission of certain identifying information. For example the permissions plug-in 1310 and/or the external user-facing system/application 1308 may transmit a client ID (e.g., a unique identifier associated with the external user-facing system/application 1308), a user identifier (e.g., a unique identifier associated with the user), a secret key, and/or the like to the permissions management system 1304, which may be processed and verified by the permissions management system 1304.

In action 2, the permissions management system 1304 may interface with the external user account system 1306, using account credentials provided by the user, to obtain user account data (e.g., user account information, account numbers, routing numbers, transaction data, and/or the like). Communication with the external user account system 1306 may be accomplished as generally described above in reference to various figures, wherein, for example, virtual instances of an application of the external user account system 1306 may be generated to communicate with the external user account system 1306 via a public/non-public API. As also described above, establishing communication with the external user account system 1306 may include multifactor authentication (which may require additional communications to or from the user computing device 1314) and/or the like. Additionally, action 2 may include enabling the user to select a specific account from a plurality of accounts via an interactive user interface presented to the user by the permissions plug-in 1310. In some instances, user account information may be obtained by analysis of documents (e.g., PDFs of account statements) that may be available from the external user account system 1306.

In action 3, based on the user account data obtained from the external user account system 1306, the permissions management system 1304 generates an electronic record. The electronic record is generated by the permissions management system 1304 as described in further detail below, however, the electronic record may include at least a unique record name, an identifier associated with the user, an identifier associated with the external user-facing system/application 1308 (e.g., the client ID), user account information obtained from the external user account system 1306, and one or more permissions.

As shown in FIG. 14B, the permissions management system 1304 may include a record vault 1402, which, as described herein, comprises one or more databases securely storing generated electronic records. Accordingly, in action 3, the electronic record that is generated by the permissions management system 1304 is stored in the record vault 1402. Each generated electronic record may be associated with, and identified by, a token (e.g., a unique identifier associated with that electronic record, also referred to herein as a "unique record identifier"). In an embodiment, the token (e.g., the unique record identifier) is generated based on an encrypted hash of one or more elements of the electronic record. Alternatively, the token may be randomly generated.

In an alternative to one or more of the actions of FIG. 14B, in action Z, rather than the user providing account credentials to the permissions management system 1304, the permissions management system 1304 and/or the permissions plug-in 1310 may cause the interactive user interface displayed to the user to be redirected to a page or user interface provided directly by the external user account system 1306. Accordingly, as described above in reference to actions 1a, 1b, 1c, and 2 of FIG. 14A, the external user account system 1306 may generate a token that may be transmitted to the permissions management system via the user computing device 1314. This token may then be user by the permissions management system 1304 to access user account data from the external user account system 1306.

In action 4, the token is transmitted back to the external user-facing system/application 1308. Advantageously, in various embodiments, the token does not include any account information (and/or any unencrypted account information) of the user, such that the external user-facing system/application 1308 may not use the token to directly access an account of the user. The external user-facing system/application 1308 may store the token in association with the user. Accordingly, as is described in detail below, the external user-facing system/application 1308 may use the token to initiate payments or other transactions with the user.

In action 5, the external user-facing system/application 1308 may request execution of a transaction associated with the user via communication with the trusted third-party processor system 1312 (e.g., a payment processor). For example, if the external user-facing system/application 1308 is a merchant, the external user-facing system/application 1308 may request payments or a service or good via the trusted third-party processor system 1312. In making the request, the external user-facing system/application 1308 transmits transaction details and the token to the trusted third-party processor system 1312. Transaction details may include, for example, an amount of the payment be made, the frequency of payments be made, and/or the like.

In action 6, in order to execute the transaction requested by the external user-facing system/application 1308, the trusted third-party processor system 1312 communicates with the permissions management system 1304 to obtain account details (e.g., account and routing numbers) of the user, and to get authorization to execute the transaction. Accordingly, the trusted third-party processor system 1312 communicates the token and transaction details to the permissions management system 1304.

In action 7, the permissions management system 1304 identifies the electronic record in the record vault 1402 related to the token received from the trusted third-party processor system 1312. The permissions management system 1304 retrieves the identified electronic record, including information related to the electronic record such as various permissions information. The permissions management system 1304 then compares the transaction details to the permissions information associated with the electronic record, and determines whether the external user-facing system/application 1308 is authorized to execute the transaction requested.

In action 8, if the permissions management system 1304 determines that the external user-facing system/application 1308 is not authorized to execute the transaction, such an indication is transmitted back to the trusted third-party processor system 1312. The trusted third-party processor system 1312 may then indicate to the external user-facing system/application 1308 that it is not authorized to execute the transaction. If the permissions management system 1304 determines that the external user-facing system/application 1308 is authorized to execute the transaction, the permissions management system 1304 transmits to the trusted third-party processor system 1312 account details (e.g., account and routing numbers) of the user necessary to execute the transaction, and an indication that the external user-facing system/application 1308 is authorized to execute the transaction.

In action 9, using the account details received from the permissions management system 1304, the trusted third-party processor system 1312 executes the transaction via communication with the external user account system 1306. For example, the account details received from the permissions management system 1304 may include an account number and routing number, a credit card number, and/or the like. The trusted third-party processor system 1312 may utilize such information to execute the funds transfer (e.g., an ACH transfer, as described above), and/or the like, through communication with the external user account system 1306.

In action 10, the trusted third-party processor system 1312 communicates with the external user-facing system/application 1308 an indication the transaction has been executed, or an indication that the transaction was not executed (if, for example, there were insufficient funds, and/or the like). Such communication between the trusted third-party processor system 1312 and the external user-facing system/application 1308 may include multiple back-and-forth communications regarding, for example, a status regarding an attempted execution of transaction, and/or the like.

Accordingly, as described in action diagram of FIG. 14B, via interaction with the external user-facing system/application 1308, the user may provide account credentials to the permissions management system 1304, and authorize execution of a transaction by the external user-facing system/application 1308, without sharing user account information with the external user-facing system/application 1308. Advantageously, according to certain embodiments, the external user-facing system/application 1308 need not be trusted with the user account information, which may simplify development of the external user-facing system/application 1308, and give a user piece of mind in its interactions with the external user-facing system/application 1308. Additionally, as is described below, the implementation of FIG. 14B enables the user to de-authorize, and/or change permissions of, the external user-facing system/application 1308.

In some implementations, the functionality of one or more of the permissions management system 1304, the external user-facing system/application 1308, and/or the trusted third-party processor system 1312 may be combined and/or subdivided into more systems/devices. For example, in an embodiment, the permissions management system 1304 may function as both the permissions management system and the trusted third-party processor, thereby simplifying and combining some of the actions described above.

As mentioned, communications among the various aspects of the network environment 1300 may be via secure channels (e.g., encrypted channels). For example, in order to be "trusted," the trusted third-party processor system 1312 may need to securely identify itself with the permissions management system 1304. For example, the trusted third-party processor system 1312 could prove a mutually agreed upon authorization, encryption, or identification. Other similar communications may take place among other aspects of the network environment 1300, according to certain embodiments.

In various embodiments certain actions may be initiated in response to certain other actions. For example, the token may be generated in response to a request from the external user-facing system/application 1308 for account information and/or execution of a transaction. In various embodiments additional aspects may be involved in executing transactions. For example, two of more processor systems or external user account systems may coordinate and/or make requests of one another to execute transactions.

Example Action Diagram for De-Authorization

Figure 15:
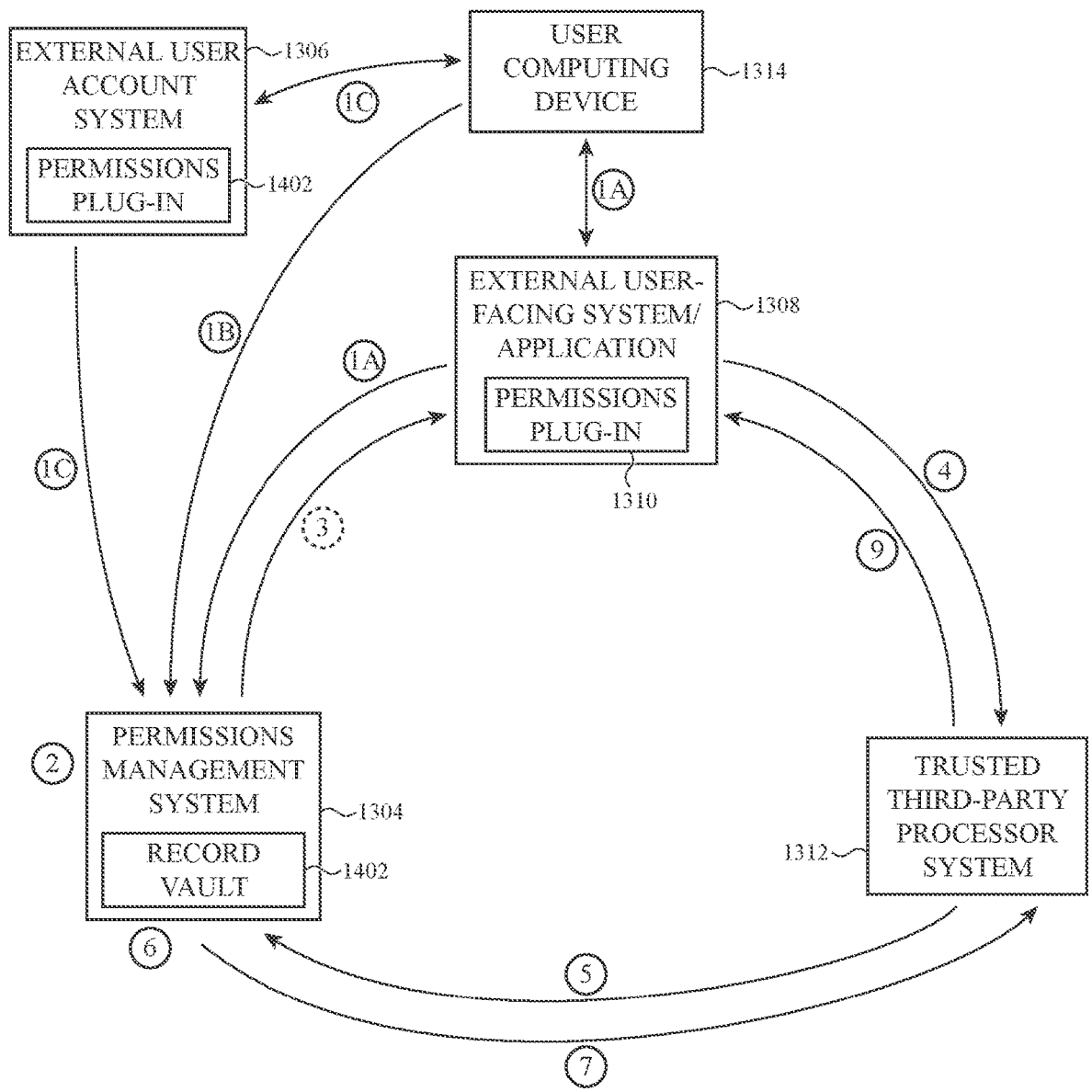

FIG. 15 is an action diagram illustrating example interactions among the aspects of the network environment 1300 by which the user may de-authorize the external user-facing system/application 1308, according to an embodiment. Each of actions 1a, 1b, and 1c illustrate alternative means of de-authorizing the ability of the external user-facing system/application 1308 to execute transactions with respect to the user.

In action 1*a*, the user may request, via the external user-facing system/application 1308 and the permissions plug-in 1310, de-authorization of the external user-facing system/application 1308 to execute transactions and/or access data related to the user. The request is made via communication with the permissions management system 1304 through the permissions plug-in 1310, for example.

Alternatively, in action 1*b*, the user may request, directly to the permissions management system 1304, de-authorization of the external user-facing system/application 1308 to execute transactions and/or access data related to the user (e.g., via an interactive user interface of the permissions management system 1304, via a link in an email from the permissions management system 1304, and/or the like).

In another alternative, in action 1*c*, the user may be request, via a permissions plug-in 1502 (similar to the permissions plug-in 1310) as implemented by the external user account system 1306, de-authorization of the external user-facing system/application 1308 to execute transactions and/or access data related to the user. For example, when interfacing with the external user account system 1306 via a web-based portal of the external user account system 1306, the user may have the option of requesting de-authorization of the external user-facing system/application 1308.

In action 2, the permissions management system 1304 receives the request to de-authorize the external user-facing system/application 1308, and processes the request by updating the electronic record (as stored in the record vault 1402). For example, the external user-facing system/application 1308 may delete the electronic record, may add an indication to the electronic record that the external user-facing system/application 1308 has been de-authorized, and/or may change one or more permissions associated with the electronic record.

In optional action 3, the permissions management system 1304 may notify the external user-facing system/application 1308 of the de-authorization.

Actions 4-8 illustrate actions that may take place if the external user-facing system/application 1308 attempts to initiate a transaction related to the user after de-authorization.

In action 4, the external user-facing system/application 1308 requests execution of a transaction via the trusted third-party processor system 1312, as described above, by providing at least the token and transaction details.

In action 5, the trusted third-party processor system 1312 communicates the transaction details and the token to the permissions management system 1304 to request authorization to execute the transaction requested by the external user-facing system/application 1308.

As described above, in action 6, the permissions management system 1304, using the token, accesses the electronic record related to the user and the external user-facing system/application 1308. The permissions management system 1304 then compares the transaction details to the permissions indicated by the accessed electronic record. If the electronic record does not exist, and/or the permissions indicate that the external user-facing system/application 1308 has been de-authorized, in action 7 the permissions management system 1304 communicates an indication to the trusted third-party processor system 1312 that the external user-facing system/application 1308 does not have authorization for the transaction. In action 8, the trusted third-party processor system 1312 indicates to the external user-facing system/application 1308 that it is not authorized to execute the transaction.

In an alternative not depicted in FIG. 15, the user may similarly de-authorize the external user-facing system/application 1308 via interaction with the trusted third-party processor system 1312, wherein, either via a permissions plug-in as implemented by the trusted third-party processor system 1312, or via direct communication, the permissions management system 1304 is notified of the de-authorization.

Accordingly, in various embodiments, via interaction with the permissions management system 1304, the user is enabled to de-authorize the ability of the external user-facing system/application 1308 to execute transactions. This is possible because, advantageously, user account data (e.g., account number, routing number, and/or the like) may not be shared with the external user-facing system/application 1308. Rather, the permissions management system 1304 manages authorization of the external user-facing system/application 1308 to execute transactions, and stores user account data securely.

In certain implementations, rather than completely de-authorizing the external user-facing system/application 1308, the user may alter or update one or more permissions granted to the external user-facing system/application 1308. For example, the user may change a frequency of allowed transactions, change a value of allowed transactions, and/or the like. Additionally, in certain implementations, the user may alternatively, and/or in addition, make other changes to the authorization, including choosing a different account from which funds may be withdrawn, etc.

An Alternative Example Action Diagram for Authorization

Figure 16:
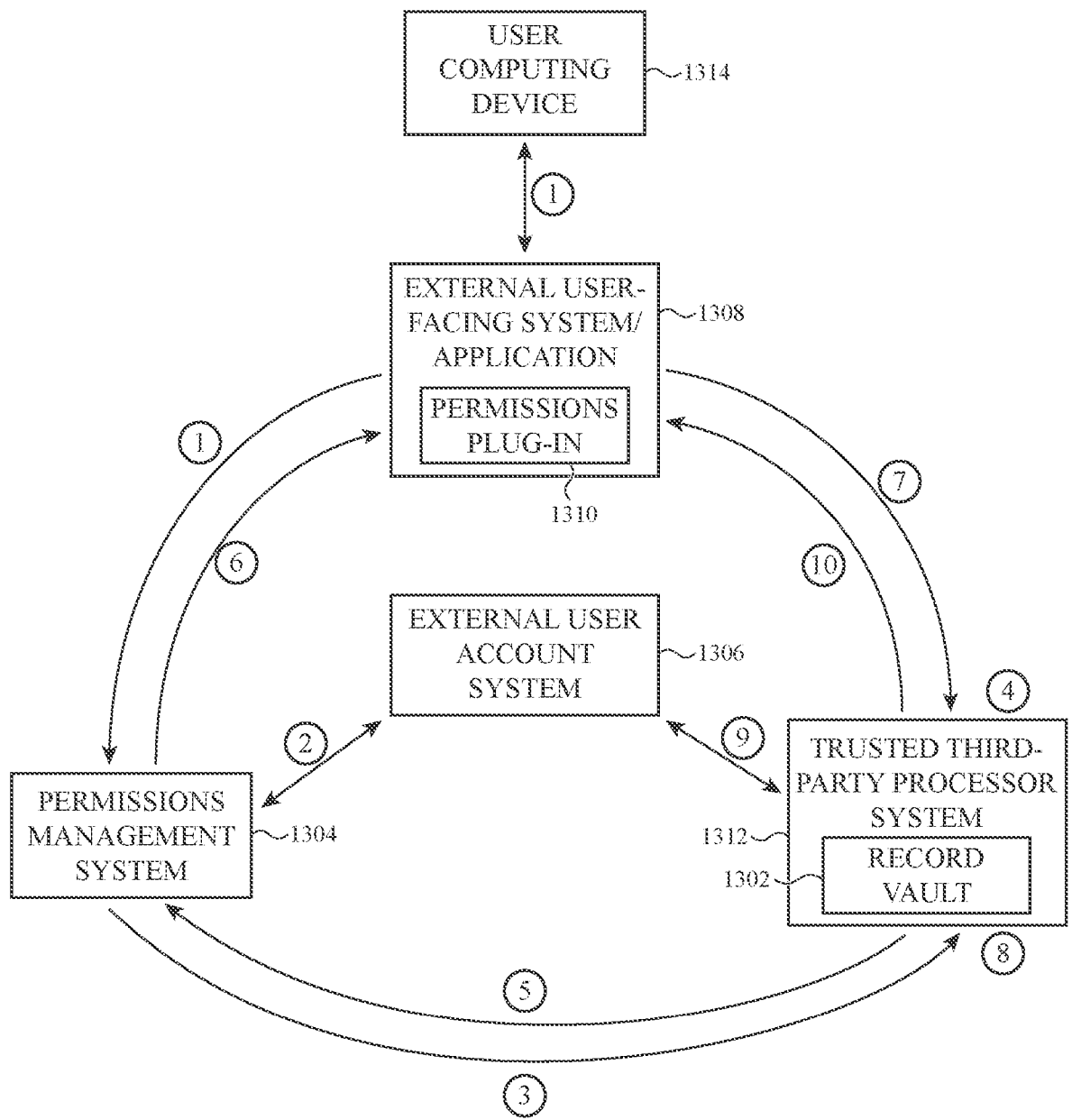

FIG. 16 is an action diagram illustrating example interactions among the aspects of the network environment 1300, according to an embodiment that is an alternative to the embodiments of FIGS. 14A-14B. As with FIGS. 14A-14B, interactions among the various aspects of the network environment 1300 (as represented in FIG. 16) enable permissioning of access to, and execution of transactions on, user accounts on the external user account system 1306 (or multiple external user account systems 1306). Further, interactions among the various aspects of the network environment 1300 enable a user to grant authorization and/or revoke authorization to access their accounts.

In action 1, the user may provide, to the permissions management system 1304, account credentials and/or other authorization for access to an account of the user. This may be accomplished similar to what is described above in reference to action 1 of FIG. 14B and/or one or more of actions 1*a*-1*c* and 2-4 of FIG. 14A.

In action 2, the permissions management system 1304 may access an account/user account data of the user, similar to what is described above in reference to action 2 of FIG. 14B and/or various actions of FIG. 14A.

In action 3, the permissions management system 1304 communicates user account data (including, e.g., account numbers, routing number, and/or the like) and other data relevant to electronic record and token creation (e.g., a client ID, a user identifier, etc.) to the trusted third-party processor system 1312.

Differing from the interactions of FIG. 14B, in the embodiment of FIG. 16 the trusted third-party processor system 1312 includes the record vault 1402. Accordingly, in action 4, the trusted third-party processor system 1312 generates an electronic record and token and stores the electronic record in the record vault 1402, similar to what is described above in reference to action 3 of FIG. 14B.

In action 5, the trusted third-party processor system 1312 communicates the token to the permissions management system 1304, and in action 6 the permissions management system 1304 communicates the token to the external user-facing system/application 1308. Alternatively, the trusted third-party processor system 1312 may communicate the token directly to the external user-facing system/application 1308.

In action 7, the external user-facing system/application 1308 may request execution of a transaction associated with the user via communication with the trusted third-party processor system 1312, similar to what is described above in reference to action 5 of FIG. 14B.

In action 8, similar to what is described above in reference to action 7 of FIG. 14B, the trusted third-party processor system 1312 may identify the electronic record in the record vault 1402 related to the token received from the external user-facing system/application 1308. The trusted third-party processor system 1312 retrieves the identified electronic record, including information related to the electronic record such as various permissions information. The trusted third-party processor system 1312 then compares the transaction details to the permissions information associated with the electronic record, and determines whether the external user-facing system/application 1308 is authorized to execute the transaction requested.

Actions 9 and 10 proceed similar to actions 9 and 10 of FIG. 14B, described above.

Alternatives described above in reference to FIGS. 14A-14B may similarly be applied to the embodiment of FIG. 16. In various embodiments, the user may de-authorize the external user-facing system/application 1308 (and/or change permissions, etc., related to the external user-facing system/application 1308) when the record vault 1402 is stored by the trusted third-party processor system 1312, in ways similar to those described above in reference to the embodiments of FIG. 15 (with the difference that, e.g., the request for de-authorization, change of permissions, account change, etc. is communicated to the trusted third-party processor system 1312, either directly, or via another aspect of the network environment 1300).

As mentioned above, secure communications between the external user-facing system/application 1308 and the permissions management system 1304 and/or the trusted third-party processor system 1312 can be accomplished via public and/or secret key exchange. Further, in various implementations, multiple tokens may be used in the actions described above. For example, the token stored by the trusted third-party processor system 1312 may differ from the token shared with the external user-facing system/application 1308 (e.g., a different unique identifier may be shared with the external user-facing system/application 1308). In alternate scenarios, the trusted third-party processor system 1312 and user-facing application 1308 may be operated by different third-parties and thereby individual report tokens can be used by each in interacting with the permissions management system 1304.

In an implementation, interactions among the aspects of the network environment 1300 may proceed as follows: the permissions management system 1304 may generate a token related to account information of the user (as described above in references to various implementations); the permissions management system 1304 may send the token to the external user-facing system/application 1308 (in some implementations, this token and/or information sent to the external user-facing system/application 1308 may include account information such as an account number and a routing number); the external user-facing system/application 1308 may send a request to the trusted third-party processor system 1312 for execution of a transaction (which request may include, e.g., the token and/or other account information); the trusted third-party processor system 1312 may optionally communicate with the permissions management system 1304 to determine that the external user-facing system/application 1308 is authorized to cause the transaction to be executed (e.g., permissions may be checked, an account balance may be checked, etc.); and the trusted third-party processor system 1312 may initiate execution of the transaction (e.g., by sending a request to the external user account system 1306). In this implementation, the permissions management system 1304 may generate the token after accessing account information from the external user account system 1306 (e.g., as described herein) and/or in response to a request received from the external user-facing system/application 1308.

As mentioned above, in some implementations the system may send various types of alerts and/or other indications to a user computing device (e.g., user computing device 1314). These various types of alerts and/or other indications may activate one or more applications (e.g., an SMS (simple message service) and/or MMS (multimedia messaging service) process and/or application, an email process and/or application, a process and/or application related to the system, a first-party and/or third-party process and/or application (e.g., of an institution and/or a user-facing application/service), and/or the like) on the user computing device. In some examples, the system may send alerts to the user computing device regarding authorization and/or de-authorization of an external user-facing system/application, an attempt by an external user-facing system/application to initiate a transaction that it is not authorized to initiate (e.g., a transaction of too much value, a transaction that is too frequent, and/or the like), and/or the like. Such alerts may comprise SMS messages, email messages, and/or other types of messages that may activate various processes and/or applications, as described above. In another example, an alert may activate, e.g., an email application by which the user may select a link to de-authorize an external user-facing system/application (either automatically, or via a user interface that may be presented as a result of selecting the link).

In various embodiments certain actions may be initiated in response to certain other actions. For example, the token may be generated in response to a request from the external user-facing system/application 1308 for account information and/or execution of a transaction. In various embodiments additional aspects may be involved in executing transactions. For example, two of more processor systems or external user account systems may coordinate and/or make requests of one another to execute transactions.

Example Token Generation Methods

Figure 17A:
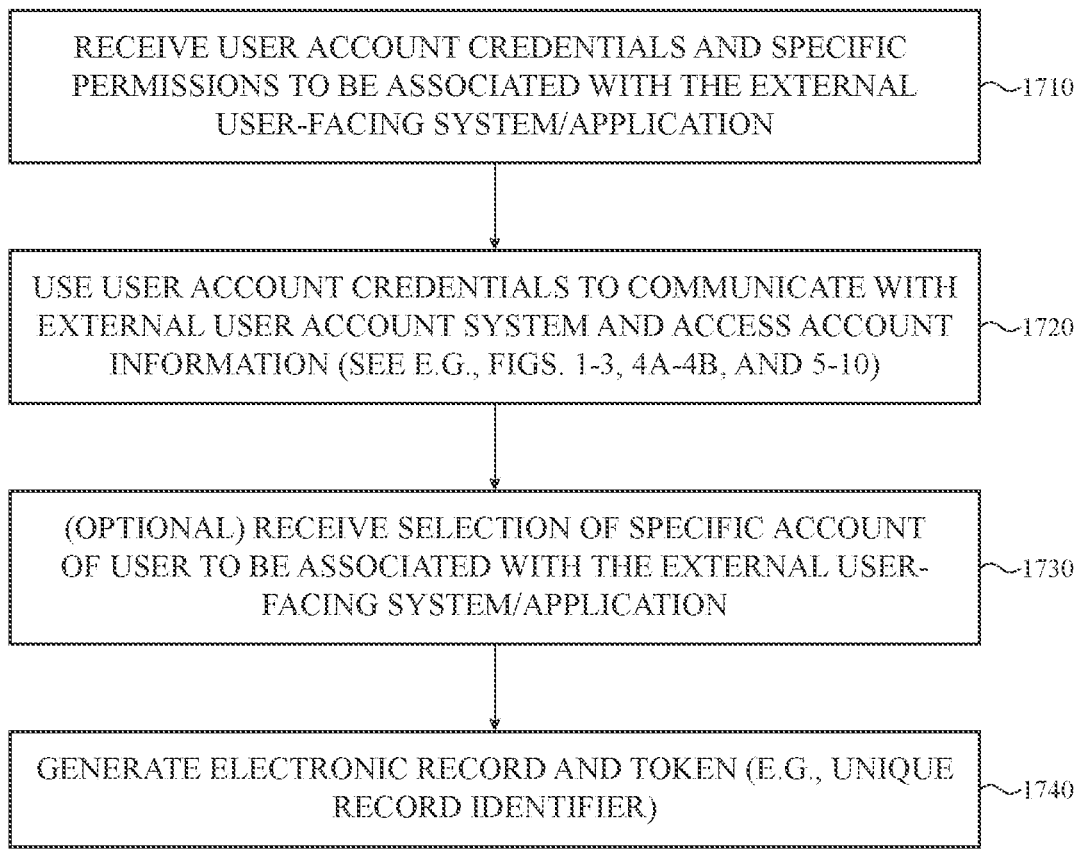
FIGS. 17A-17B are flowcharts of example methods of generating a token, according to various embodiments.

FIG. 17A is a flowchart of an example method of generating a token, according to an embodiment. For example, the method of FIG. 17A may be performed by the permissions management system 1304 in actions 2 and 3 of FIG. 14B, and/or by the permissions management system 1304 and/or the trusted third-party processor system 1312 in actions 2, 3, and 4 of FIG. 16.

At block 1710, the permissions management system 1304 receives account credentials and/or permissions to be associated with the external user-facing system/application 1308. Account credentials may include, for example, a username and password (and/or any other credential information) used by the user for logging into/accessing an account of the user at, e.g., the external user account system 1306 (and/or another institution).

At block 1720, the permissions management system 1304 uses the user account credentials to communicate with the external user account system 1306 to access user account data related to the user. As mentioned, the process of communicating with an institution system (e.g., the external user account system 1306) to obtain user account information is described above in reference to, e.g., FIGS. 1-3, 4A-4B, and 5-10. This block (and/or the 1710) may additionally involve presenting information to, and/or obtaining additional information from, the user for purposes to satisfying multi-factor authentication.

In some instances, the user may have more than one user account with the institution that is accessed. Accordingly, in optional block 1730, the permissions management system 1304 may receive, from the user, a selection of one or more of these accounts that are to be associated with the external user-facing system/application 1308. Such a selection may be obtained from the user via an interactive user interface that may be presented to the user (via, e.g., any combination of the permissions management system 1304, the permissions plug-in 1310, the external user-facing system/application 1308, and/or the user computing device 1314).

At block 1740, the electronic record and token that correspond to the combination of the user and the external user-facing system/application 1308 are generated. As mentioned above, in some implementations each electronic record that is generated may correspond to a single combination of a user and an external user-facing system/application. In other implementations, each electronic record may correspond to various combinations to users, developers, external user-facing systems/applications, external institution systems, and/or the like. In an implementation, there may be multiple electronic records associated with a single combination of a user and an external user-facing system/application. For example, the user may have multiple interactions (e.g., multiple accounts) with the external user-facing system/application, and may therefore desire multiple sets of permissions, or multiple sets of permissions, or multiple user accounts (here referring to, e.g., financial accounts with external institutions) to be associated with the external user-facing system/application for different purposes. Examples of such multiple interactions may include a newsletter subscription (in which there may be multiple ongoing payments) and a one-off purchase of goods (in which there is a single purchase). Thus, two electronic records with varying levels of permission may be desired. In another implementation, multiple sets of permissions and/or multiple accounts may all be stored within a same electronic record, and may be differentiated by various appropriate identifiers.

Figure 17B:
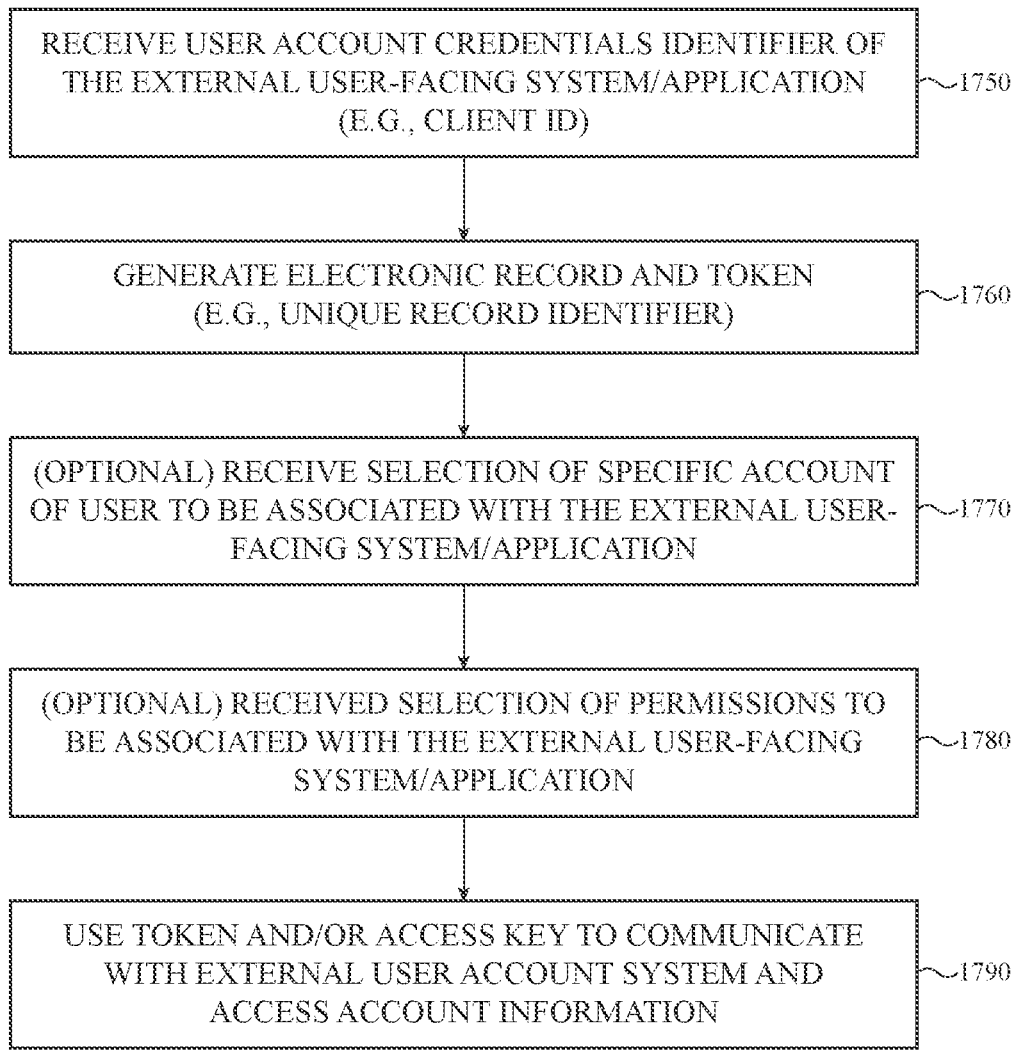

FIG. 17B is a flowchart of another example method of generating a token, according to an embodiment. For example, the method of FIG. 17B may be performed by the external user account system 1306 in actions 1a and 1b of FIG. 14A, and/or by the external user account system 1306 in action Z of FIG. 14B.

At block 1750, the external user account system 1306 receives account credentials and a client ID associated with the external user-facing system/application 1308. Account credentials may include, for example, a username and password (and/or any other credential information) used by the user for logging into/accessing an account of the user at, e.g., the external user account system 1306 (and/or another institution). In some implementations, the external user account system 1306 may also receive permissions to be associated with the external user-facing system/application 1308.

At block 1760, the external user account system 1306 generates an electronic record and token that correspond to the combination of the user and the external user-facing system/application 1308. As mentioned above, in some implementations each electronic record that is generated may correspond to a single combination of a user and an external user-facing system/application. In other implementations, each electronic record may correspond to various combinations to users, developers, external user-facing systems/applications, external institution systems, and/or the like. In an implementation, there may be multiple electronic records associated with a single combination of a user and an external user-facing system/application. For example, the user may have multiple interactions (e.g., multiple accounts) with the external user-facing system/application, and may therefore desire multiple sets of permissions, or multiple user accounts (here referring to, e.g., financial accounts with external institutions) to be associated with the external user-facing system/application for different purposes. In another implementation, multiple sets of permissions and/or multiple accounts may all be stored within a same electronic record, and may be differentiated by various appropriate identifiers.

In some instances, the user may have more than one user account with the institution that is accessed. Accordingly, in optional block 1770, the external user account system 1306 may receive, from the user, a selection of one or more of these accounts that are to be associated with the external user-facing system/application 1308. Such a selection may be obtained from the user via an interactive user interface that may be presented to the user (via, e.g., any combination of the external user account system 1306, the permissions plug-in 1310 and 1311, the external user-facing system/application 1308, and/or the user computing device 1314).

Similarly, in some instances the user may specify permissions and/or review documents as part of the authorization process, as described above. Accordingly, in optional block 1780, the external user account system 1306 may receive, from the user, a selection of one or more permissions and/or acceptance of one or more documents. Such selections may be obtained from the user via an interactive user interface that may be presented to the user (via, e.g., a management user interface with any combination of the external user account system 1306, the permissions plug-in 1310 and 1311, the external user-facing system/application 1308, and/or the user computing device 1314). Examples of such user interfaces are shown in FIGS. 20J and 21A (which are further described below).

At block 1790, the permissions management system 1304 uses the token and/or an access key to communicate with the external user account system 1306 to access user account data related to the user. The token and/or an access key provide verification with the permissions management system 1304 has the credentials or authorization to access the user account data from the user account associated with the token. In some implementations, as described above, the token may be used by the permissions management system 1304 in an initial communication with the external user account system 1306 to obtain and access key from the external user account system 1306. Alternatively, the token may be used in communications with the external user account system 1306.

Figure 18:
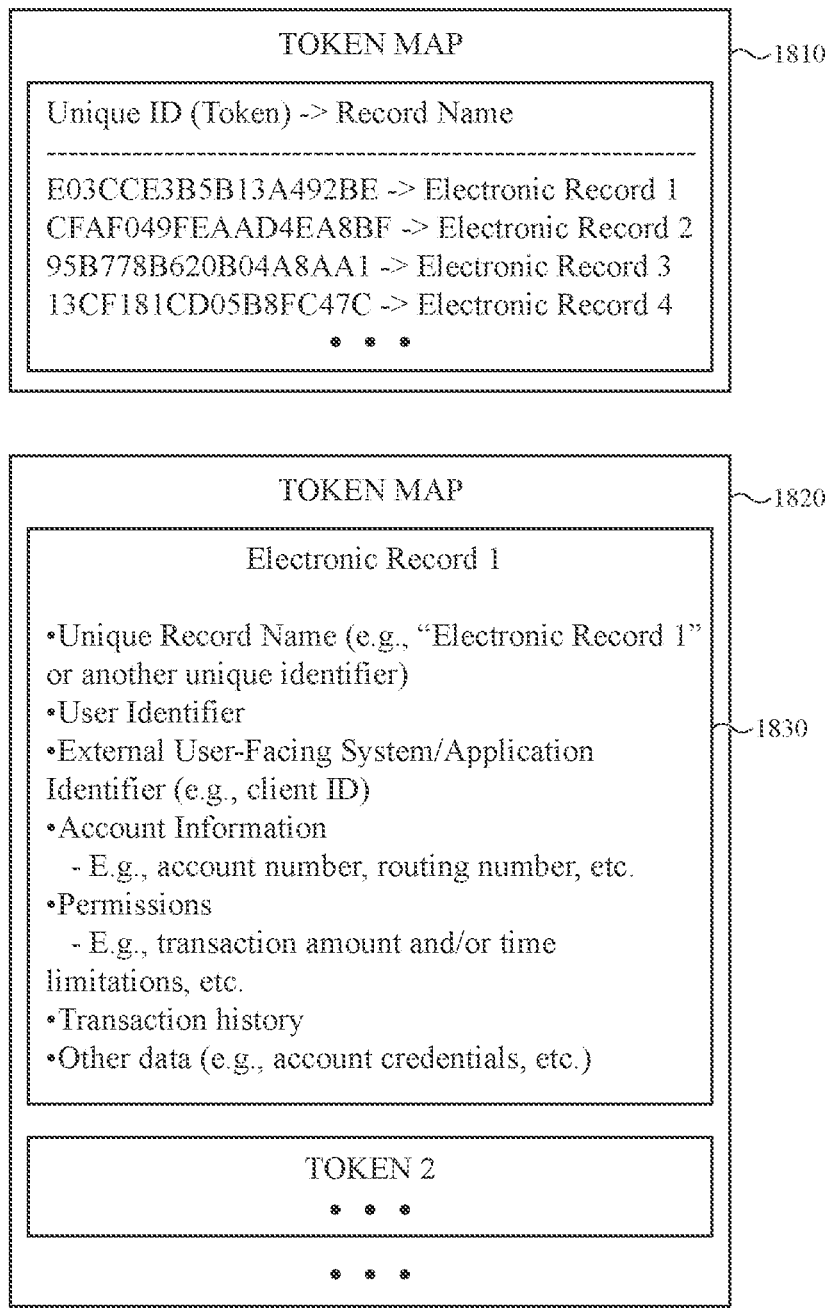
FIG. 18 illustrates examples of a token map and a record vault, according to an embodiment.

FIG. 18 illustrates examples of a token map 1810, a record vault 1820, and an electronic record 1830 that may be generated, e.g., by the permissions management system 1304 according to the method of FIG. 17A, and/or other methods/actions described herein (e.g., as described in reference to FIG. 17B). The record vault 1820 is an example of the record vault 1402 described previously. Each of the token map 1810 and the record vault 1820 may be comprised of a database, in an implementation. In some implementations, each of the token map 1810 and the record vault 1820 may comprise tables in a database, and/or may be combined into a single table/database. Advantageously, the token map 1810 and/or the record vault 1820 may be securely stored (e.g., encrypted, etc.) so as to protect the user-related data.

The record vault 1820 may include a plurality of electronic records, such as the electronic record 1830. As shown in the example of the electronic record 1830, an electronic record may include one or more of the following: a unique record name (which may be used to identify the record among the various records), a user identifier (e.g., any identifier associated with the user that provided the account credentials), a client ID (as described above), account information obtained from an external institution using the account credentials (e.g., an account number, a routing number, etc.), various permissions, and/or a transaction history. In some implementations, the electronic record may include other user account data, other data related to the user and/or the external user-facing system/application, account credentials, and/or the like.

Examples of permissions that may be stored with the electronic record include any permission related to frequency, use, time, amount, type, and/or the like. For example, in the context of financial transactions, the user may specify a limit on the amount of transactions (e.g., no more than $500), the frequency of transactions (e.g., no more than one transaction per month), the amount within a particular time frame (e.g., no more than $1100 per month), and/or any combination of these and/or other permissions. In the context f financial reports, the user may specify when a financial report can be accessed (e.g., there could be a limited accessibility window), who can initiate new report tokens, who can access a financial report.

The token map 1810 may be stored with the record vault 1820, and/or separately from the record vault 1820, and/or may be combined with the record vault 1820. The token map 1810 provides a mapping between the token (e.g., the unique record identifier) associated with each electronic record, and the unique record name. In some implementations, the token and the unique record name may be the same (e.g., such that no token map 1810 is needed). However, it may be advantageous to have a different token (e.g., unique record identifier) because, as is described above, the token is shared with other parties, including the external user-facing system/application. In the event that the token is compromised (e.g., stolen or lost), a new token may be generated, and the token map 1810 may be updated accordingly, such that the corresponding electronic record need not be regenerated. In some implementations, the unique record name and/or the token (e.g., the unique record identifier) comprised an encrypted hash of one or more items of data of the electronic record. In other implementations, the unique record name and/or the token comprised a randomly generated unique string of characters (and/or any other suitable identifier).

In some embodiments the electronic record 1830 may include a history of transactions associated with the external user-facing system/application 1308. For example, transaction details related to each transaction authorized by the system may be stored. Such history information may be used by the system to determine and/or enforce certain permissions. For example, when the permission indication a limit on frequency of transactions, the system may access the history stored with the electronic record to determine whether, for a given transaction, the frequency permission is satisfied or not. Accordingly, in some embodiments, the trusted third-party processor system 1312 may communicate with the permissions management system 1304 to indicate whether transactions are completed successfully.

Example Method Related to Permissions Plug-in

Figure 19:
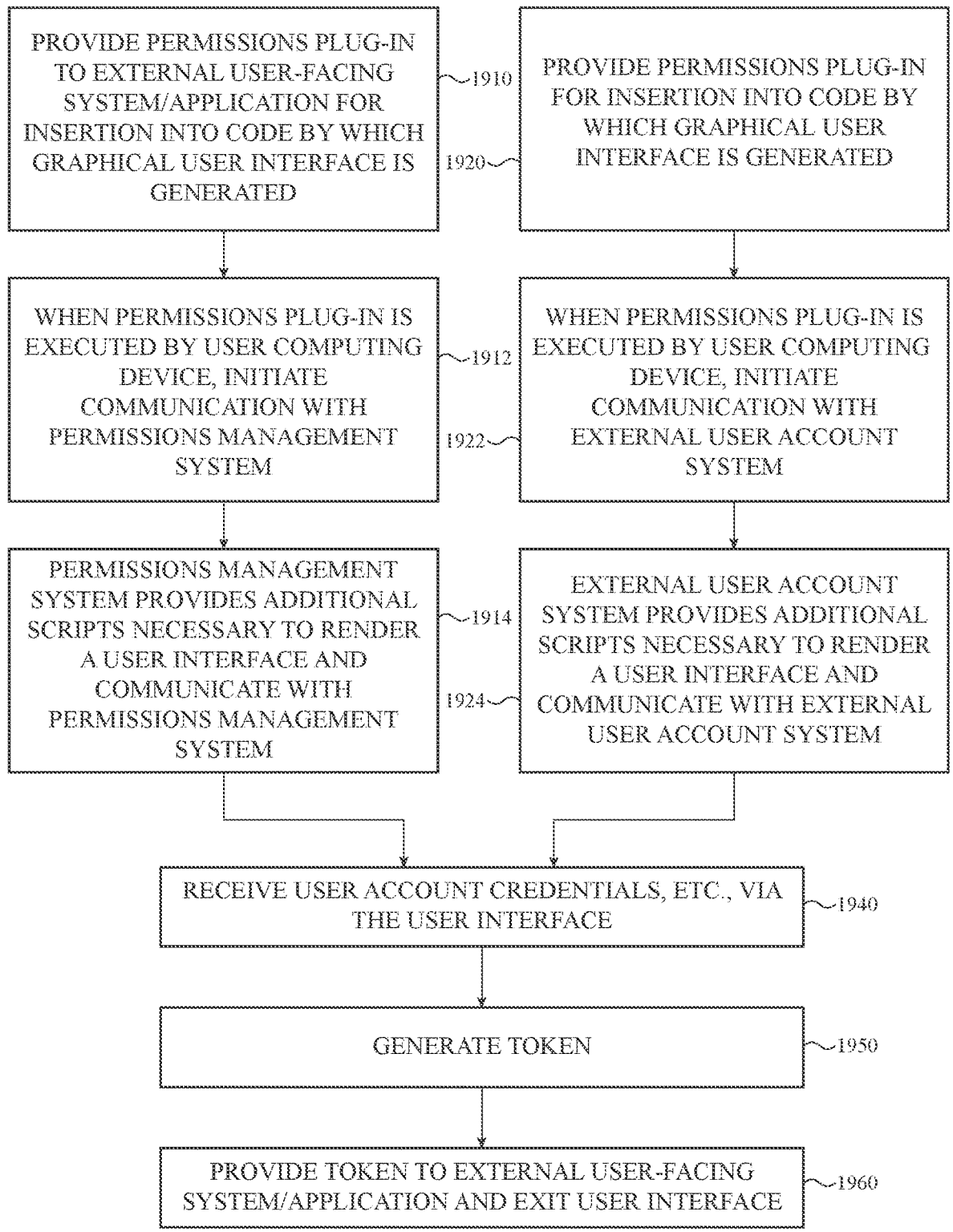
FIG. 19 is a flowchart of an example method of the system, according to an embodiment.

FIG. 19 is a flowchart of an example method of the system, and specifically an example method related to interactive user interfaces, according to an embodiment. For example, the method of FIG. 19 may be performed by the permissions plug-in 1310 and/or the permissions plug-in 1311 in actions 1a, 1b, 1c, 2, 3, 4, 5, and/or 6 of FIG. 14A. In another example, the method of FIG. 19 may be performed by the permissions management system 1304 and/or the permissions plug-in 1310 in actions 1, 2, and/or 3 of FIG. 14B. In yet another example, the method of FIG. 19 may be performed by a the permissions management system 1304, the permissions plug-in 1310, and/or the trusted third-party processor system 1312 in actions 1, 2, 3, and/or 4 of FIG. 16.

At block 1910, the permissions plug-in 1310 is provided to the external user-facing system/application 1308. For example, the permissions plug-in 1310 may comprise a code snippet and/or other software aspects that may be implemented (by, for example, a developer) in the external user-facing system/application 1308. In one implementation the permissions plug-in 1310 comprises one or more lines of JavaScript that, when executed by, e.g., a web browser, executes various software functions.

At block 1912, when the permissions plug-in 1310 is executed by, e.g., the user computing device 1314 (e.g., when executed by a web browser of the user computing device 1314), the permissions plug-in 1310 initiates communication with the permissions management system 1304. Advantageously, communication between the permissions plug-in 1310 and the permissions management system 1304 may be secure (e.g., encrypted) such that the external user-facing system/application 1308 may not intercept or access the communication. This may be enabled by, for example, the permissions plug-in 1310 executing on the user's device, rather than directly on the external user-facing system/application 1308.

Optionally, at block 1914, the permissions plug-in 1310 may request additional scripts or other software aspects from the permissions management system 1304. Alternatively, the permissions plug-in 1310 may include all necessary software aspects without needing to receive additional data from the permissions management system 1304. In response, the permissions management system 1304 may provide the requested data to the permissions plug-in 1310.

In an alternative to blocks 1910, 1912, and 1914, the method may proceed with blocks 1920, 1922, and 1924 (for example, as described in reference to FIG. 14A above).

At block 1920, similar to block 1910, the permissions plug-ins 1310 and/or 1311 are provided to the external user-facing system/application 1308 and/or the user computing device 1314. For example, the permissions plug-ins 1310 and/or 1311 may comprise a code snippet and/or other software aspects that may be implemented (by, for example, a developer) in the external user-facing system/application 1308. In one implementation the permissions plug-in 1310 and/or 1311 comprise one or more lines of JavaScript that, when executed by, e.g., a web browser, executes various software functions.

At block 1922, when the permissions plug-ins 1310 and/or 1311 are executed by, e.g., the user computing device 1314 (e.g., when executed by a web browser of the user computing device 1314), the permissions plug-ins 1310 and/or 1311 initiates communication with the external user account system 1306. Advantageously, communication between the permissions plug-ins and the external user account system 1306 may be secure (e.g., encrypted) such that the external user-facing system/application 1308 and the permissions management system 1304 may not intercept or access the communication. This may be enabled by, for example, the permissions plug-ins 1310 and/or 1311 executing on the user's device, rather than directly on the external user-facing system/application 1308.

In some implementations, at block 1924, when the permissions plug-ins 1310 and/or 1311 are executed, additional scripts or other software aspects may be requested from the external user account system 1306. Alternatively, the permissions plug-ins 1310 and/or 1311 may include all necessary software aspects without needing to receive additional data from the external user account system 1306. In response, the external user account system 1306 may provide the requested data to the permissions plug-ins 1310 and/or 1311.

At block 1940, the permissions plug-in may generate an interactive user interface that may be displayed to the user, and through which information may be presented and received. Examples of such user interfaces are described below in reference to FIGS. 22A-22L. Account credentials, for example, received from the user, may then be communicated to the permissions management system 1304 (in addition to other items of information, as described herein). In some implementations, when the permissions plug-ins are executed, the user interface may be redirected to a page or interface directly managed by the external user account system 1306 (e.g., providing a direct way to provide account credentials to the external user account system 1306).

At block 1950, the token is generated by using the received account credentials (and other information). Token generation is described in detail herein, including, e.g., in reference to FIGS. 17A-17B.

At block 1960, the token generated by the permissions management system 1304 and/or the external user account system 1306 is communicated to the external user-facing system/application 1308, either directly, via the permissions plug-in 1310, and/or via the permissions management system 1304 (as described above in reference to FIG. 17A). Additionally, the interactive user interface may be exited in this block. In some instances the interactive user interface may be kept open with the user until the completion of the generation of the token, while in other instances it may not, depending on the implementation and the information needed from the user.

The various interactive user interfaces described herein may, in various embodiments, be generated by any of the aspects of the system (e.g., the system 110 and/or the permissions management system 1304 (which is itself an implementation of the system 110), the permissions plug-ins 1310 or 1311, the external user account system 1306, a user device, and/or the like). For example, as mentioned below, in some implementations user interface data may be generated by an aspect (e.g., the permissions management system 1304), and may be transmitted via one or more other aspects to a computing device of the user (e.g., the user computing device 1314, such as a smartphone) where the user interface data may be rendered so as to display a user interface to the user. Alternatively, the interactive user interfaces may be generated by the system (e.g., the permissions management system 1304) and accessed by the user on other suitable ways.

Routing of Data to Third Parties

As noted above, other embodiments described herein reference systems for distributing, routing, or otherwise disclosing a subset of the programmatically verified transactions (or other financial or private data) to one or more third parties such as in the course of implementing a method for managing access to a financial record.

Figure 20:
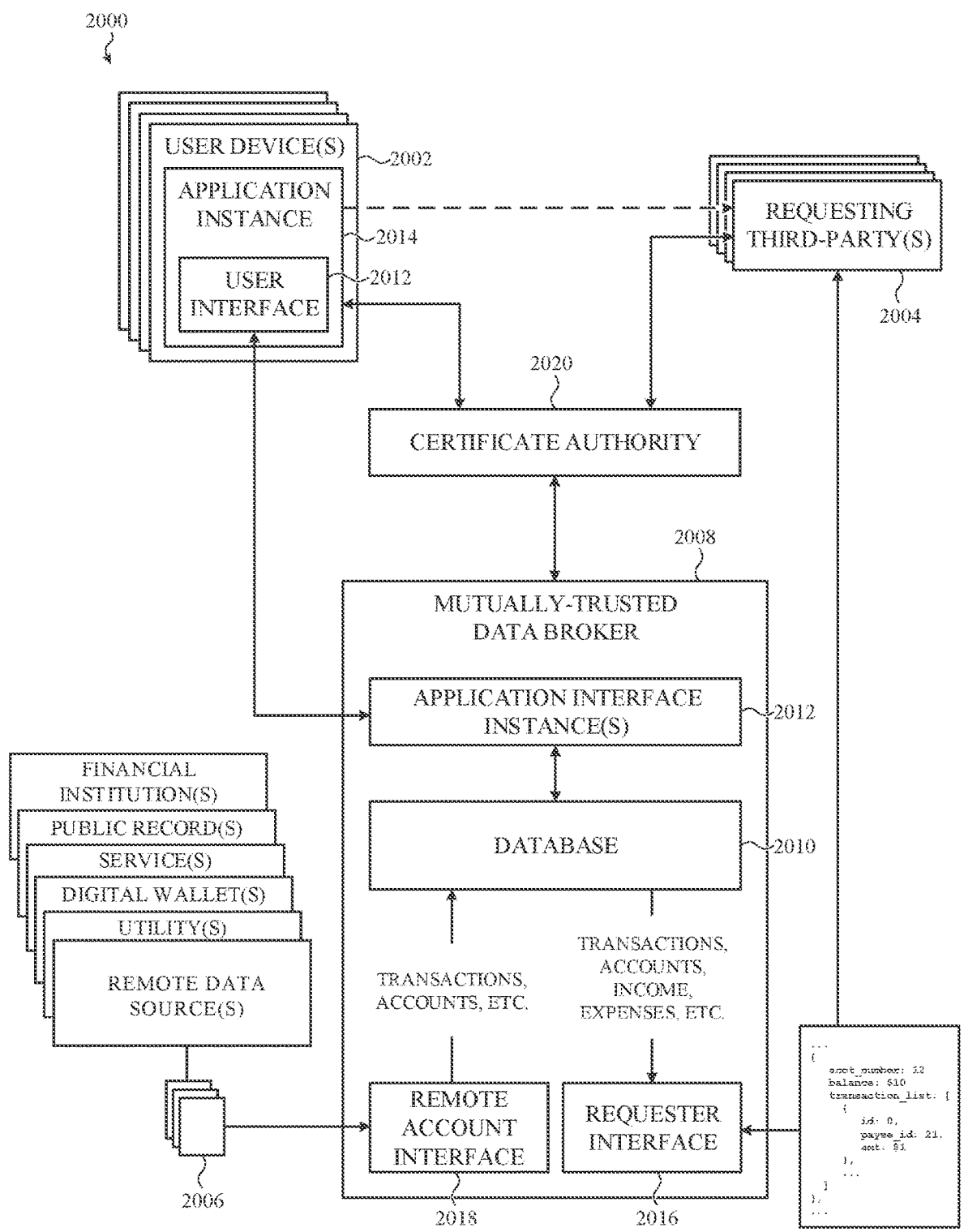
FIG. 20 depicts a simplified data flow diagram of a system, such as described herein.

Generally and broadly, FIG. 20 depicts a simplified data flow diagram of a system 2000, such as described herein. The system 2000 implements a secure communication architecture between one or more user devices, one or more third-party servers, and one or more remote data source servers (also referred to as "end points"). For simplicity of illustration one of the user devices is identified as the user device 2002, one of the third-party servers is identified as the third-party server 2004, and one of the remote account servers is identified as the remote data source 2006.

The system 2000 also includes a data management platform 2008 that communicably couples to the user device 2002, the third-party server 2004, and the remote data source 2006. More specifically, the data management platform 2008 is a server or server system (virtual or physical) that instantiates and/or implements various application programming interfaces ("APIs") to communicate with various remote resources including the user device 2002, the third-party server 2004, and the remote data source 2006. In many embodiments, the interfaces instantiated by the data management platform 2008 are isolated from one another in order to prevent unintended exfiltration of data from the data management platform 2008.

As with other embodiments described herein, the data management platform 2008 is configured to access the remote data source 2006 to obtain, format, validate, aggregate, and/or store data related to an operator of the user device 2002 (i.e., the subject) in a database 2010. Once the aggregated data is stored in the database 2010, the data management platform 2008 can distribute all or some of the stored aggregated data to the user device 2002 and/or the third-party server 2004.

To facilitate secure communication with the user device 2002, the data management platform 2008 instantiates an application interface 2012. The application interface 2012 is configured to communicate across a local or distributed network with an instance of a software application (referred to as the software application 2014) executed by an operating system of the user device 2002. The software application 2014 and the application interface 2012 can communicate using any suitable proprietary, customized, or open-source application-layer protocol (e.g., TLS, SSL, HTIP, HTIPS, and so on). In addition, typically, the application interface 2012 conforms to a state-based or object-based protocol specification, such as a RESTful API or a SOAP API, but this may not be required, and any suitable messaging protocol and/or data structuring technique can be used.

The data management platform 2008 also instantiates a requester interface 2016 to facilitate communication with the third-party server 2004. As with the application interface 2012, the requester interface 2016 can conform to any suitable data structuring and/or messaging protocol and any suitable communication or transport protocol. In some cases, instances of the requester interface 2016 can differ based on a particular third-party server with which a particular instance is communicating. More specifically, in some embodiments, one instance of a requester interface can be instantiated to conform to a first messaging protocol whereas a second instance of a requester interface can be instantiated to conform to a second messaging protocol different from the first.

The data management platform 2008 also instantiates one or more remote account interfaces (also referred to herein as "institution interface modules"), one of which is identified as the remote account interface 2018. Unlike the requester interface 2016 and the application interface 2012, the remote account interface 2018 may be configured to obtain information from the remote data source 2006 whether or not the remote data source 2006 exposes an accessible API. For example, in some cases, the remote account interface 2018 may be configured to request data from a documented API exposed by the remote data source 2006. In another example, an account server may not expose an API at all. In this case, the remote account interface 2018 may be implemented to simulate an instance of an authorized application, such as a first-party software application or web interface, in order to obtain data. In still further examples, the remote account interface 2018 can be configured to download and parse one or more documents or files from the remote data source 2006. It is understood that the remote account interface 2018 may be instantiated in different ways to communicate with, and/or obtain data from, different remote data sources.

In many examples, the data management platform 2008 authenticates itself to the user device 2002 and the third-party server 2004 by presenting a certificate issued by a known certificate authority, identified as the certificate authority 2020. Once the certificate is verified by the certificate authority 2020, both the user device 2002 and the third-party server 2004 can be assured that any data distributed, transmitted, obtained, and/or stored by the data management platform 2008 is authentic and trustable.

In other examples, certificate presentation may not be required to establish trust. For example, the data management platform 2008 can be configured to store and/or log data onto a blockchain accessible to both the user device 2002 and the third-party server 2004.

As a result of the communication architecture implemented by the system 2000, private data can be exchanged between the subject, operating the user device 2002, and the third-party managing the third-party server 2004.

Continuing the example referenced above, the system 2000 can be used to securely disclose private financial data of a borrower to a lender. In this example, the borrower (the subject) operates the user device 2002. The lender (the third-party) operates and/or manages the third-party server 2004. A financial institution (e.g., a bank, a credit card issuer, an investment service, a loan provider or servicer, or other financial institution) operates and/or manages the remote data source 2006.

In one implementation of this example, the borrower operates a user interface 2022 of the user device 2002 to provide credentials to the data management platform 2008 that permit the data management platform 2008 to access one or more remote data source servers. Initially, the user interface 2022 can provide a list of remote data sources—organized or presented in any suitable manner including alphabetically, by remote data source type (e.g., banking institution, credit card institution, and so on), by recent access, and so on—that may be selected by the borrower. In many embodiments, the borrower can operate the user interface 2022 to select multiple remote data sources, but for simplicity of description, this example references only selection of the remote data source 2006.

Once the remote data source 2006 is selected in the user interface 2022 by the borrower, the user interface 2022 can transition to render one or more data input fields so that the borrower can provide one or more credentials to access the remote data source 2006 such as, without limitation: a username, a password, an account number, a routing number, a pin number, a social security number, a driver's license number, a rolling two-factor authentication access code, and so on. More specifically, the remote data source 2006 may require additionally authentication challenges such as a pin code, security questions, single-use passwords, secondary device code verification, biometric identification, and/or any suitable form of multi-factor authentication. Such additional authentication challenges may be collected at the same time of the credentials, but the multi-factor authentication process may alternatively be defined. For example, if the primary account credentials are not sufficient, the MFA challenge may returned in a response, this additional credential request can be repeated as required before access to the account is obtained. The institution account credentials can additionally be stored, and automatically used to complete subsequent access or login attempts.

In many cases, the remote data source 2006 stores received credentials in the database 2010 (or another remote or local database), although this is not required. In some cases, the data management platform 2008 may intentionally not store the received credentials to protect the data privacy of the borrower.

Once the borrower provides a credential to access the remote data source 2006, the data management platform 2008 can instantiate or operate the remote account interface 2018 to communicate with the remote data source 2006 to obtain private financial data from the remote data source 2006. The private financial data can include, without limitation: transaction history; income information; expense information; direct deposit information; scheduled payment information; cash deposit information; account information (e.g., account name, account type, account number, routing number, and so on); balance information; running balance information; fee information; cardholder information; linked account information; savings rate information; savings information; tax document information; withdrawal information; ACH information; bill pay information; regular payee information; check information; stop payment order information; charge dispute information; debit card information; credit card information; foreign transaction information; foreign transaction fee information; and so on.

As noted above, in some examples, the remote account interface 2018 is configured to obtain the private financial data from the remote data source 2006 by conforming to an exposed API provided by the remote data source 2006. In other cases, however, the remote account interface 2018 is configured to obtain the private financial data from the remote data source 2006 by, without limitation: scraping or rendering a web page, simulating interaction with a web page, instantiating a proxy instance of an authorized first-party application to communicate with an unexposed API resource, downloading one or more documents from a document repository provided by the remote data source 2006, and so on.

Continuing the example, once the data management platform 2008 has obtained the private financial data from the remote data source 2006 via the remote account interface 2018, the data management platform 2008 can format and/or otherwise normalize the obtained private financial data. For example, in some cases, a merchant identification code provided by the remote data source 2006 can be normalized to a merchant name or nickname by the data management platform 2008 (e.g., by accessing a local or remote lookup table). In other cases, other formatting and/or data normalization operations can be performed by the data management platform 2008 including, but not limited to: recasting data types of received financial data (e.g., string to float or double, integer to float, strings to dates, and so on); truncating transaction descriptions; obfuscating or truncating account numbers; reformatting string and/or date object types; and so on.

Continuing the example, once the data management platform 2008 has normalized and/or reformatted the obtained private financial data, the formatted private financial data can be stored in the database 2010. The data management platform 2008 can periodically (e.g., hourly, daily, weekly, on demand, and so on) refresh the formatted private financial data stored in the database 2010 by accessing the remote data source 2006 again.

In this example, after the data management platform 2008 has stored formatted private financial data in the database 2010 (e.g., as a financial report), the borrower can operate the user interface 2022 to access that data from the user device 2002 via the application interface 2012. As noted with respect to other embodiments described herein, the data management platform 2008 can aggregate formatted private financial data from multiple remote data sources, all of which can be reviewed in aggregate by the borrower from the user device 2002.

In other examples, after the data management platform 2008 has stored formatted private financial data in the database 2010, the requester interface 2016 can be operated and/or instantiated in preparation to receive a request from a third-party server, such as the third-party server 2004. As noted above, in this example, the third-party server 2004 is operated by a lender seeking specific financial data about the borrower. More specifically, the lender can operate the third-party server 2004 to submit a request to the data management platform 2008, via the requester interface 2016, for financial data of the borrower stored in the database 2010 or otherwise accessible to the data management platform 2008 via the remote account interface 2018.

In some embodiments, the lender may request all available financial data. In other embodiments, the lender may request only a certain subset of financial data matching either a particular data type or query. For example, the lender may request income information, balance information, and monthly debt payment information. In other cases, the lender may request only income information. In still other examples, the lender may request income information and withdrawal information for amounts above a threshold. In other examples, the lender may request metadata from the data management platform 2008. For example, the lender may request net income across all financial institutions. It may be appreciated that the foregoing examples are not exhaustive, that the lender (or, more generally, any third-party requesting data from the data management platform 2008) can request any data, data type, or combinations of data or data types.

Continuing the example, once the lender assembles a list or set of data to request, the lender can operate the third-party server 2004 to submit that request via the requester interface 2016 to the data management platform 2008.

Once the data management platform 2008 receives the request for data from the third-party server 2004, the data management platform 2008 can (optionally) acknowledge receipt of the request via a signal sent to the third-party server 2004 and/or the software application 2014. The signal sent to the third-party server 2004 can indicate that the request was received and is being processed and/or reviewed. The signal sent to the software application 2014 operating on the user device 2002 can notify the borrower that the lender has transmitted a request for disclosure of financial information.

After (optionally) acknowledging receipt of the request, the data management platform 2008 can analyze the request to determine whether data stored in the database 2010 can be retrieved to respond to the request. If the data management platform 2008 determines that it cannot comprehensively respond to the request, the data management platform 2008 can determine whether a remote data source exists, or is otherwise accessible, that may contain the required data or information. If necessary, the data management platform 2008 can request additional credentials from the borrower via the user interface 2022 on the user device 2002.

Once the data management platform 2008 determines that it can respond to the request received from the third-party server 2004 via the remote account interface 2018, the data management platform 2008 may request permission from the borrower via the software application 2014 to disclose the requested private data to the lender via the third-party server 2004. Alternatively the data management platform 2008 may automatically determine permission by verifying credentials/tokens and optionally performing some form of anomaly/fraud detection.

More specifically, the software application 2014 and the user interface 2022 can present one or more options to the borrower to allow the borrower to approve, deny, or modify the request. For example, the user interface 2022 can present the requested private data (or a summary of the requested private data) to the borrower. After reviewing the requested private data, the borrower can select a user interface element (not shown in FIG. 20) to indicate whether the borrower approves of the request, whether the borrower wants to modify the request, or whether the borrower prefers to deny the request.

If the borrower approves of the request to disclose the requested private financial data, the software application 2014 can communicate permission to the data management platform 2008, via the application interface 2012. In response, the data management platform 2008 can disclose the requested data to the third-party server 2004.

Alternatively, if the borrower denies the request to disclose the requested private financial data, the software application 2014 can communicate to the data management platform 2008 to withhold the requested information from the third-party server 2004, via the application interface 2012. In response, the data management platform 2008 can inform the third-party server 2004 that the request for private financial data has been denied by the borrower.

Alternatively, if the borrower prefers to modify the request to disclose the requested private financial data, the software application 2014 can communicate to the data management platform 2008 to modify the requested information from the third-party server 2004, via the remote account interface 2018. The borrower can modify the request in any suitable way including, but not limited to: adding or modifying a date range for transactions disclosed; adding or modifying an amount range for transactions disclosed; adding or denying access to data obtained from one or more specific financial institutions or other remote data sources; rounding amounts disclosed to a particular significant digit; obfuscating account numbers, routing numbers, or other account or identifying information; and so on. In response, the data management platform 2008 can disclose the modified requested data to the third-party server 2004.

The foregoing examples described above, and the various alternatives thereof and variations thereto are presented, generally, for purposes of explanation, and to facilitate an understanding of various configurations and uses of a system and a communication architecture, such as described herein. However, it will be apparent to one skilled in the art that some of the specific details presented herein may not be required in order to practice a particular described embodiment, or an equivalent thereof. Similarly, it will be apparent to one skilled in the art that the systems described herein can be modified, adjusted, or otherwise adapted to other remote data sources, data types, and third parties.

For example, the embodiments described above presume data exists in the database prior to receiving a request for private data from the third-party. This is not required of all embodiments. For example, in some embodiments, a request for private financial data (or other data) can be submitted to the data management platform before any data is stored in the database. In these examples, the data management platform can be configured to submit a request to the user device to select one or more remote data sources and to provide one or more credentials to access those remote data sources in order to respond to a request for disclosure of private data received from a third-party server. In these embodiments, storing data in the database may not be required; after (optional) reformatting, and receiving permission to disclose from the software application, the obtained private data can be disclosed to the third-party server.

In still other embodiments, data can be collected and/or aggregated in another manner than described above. For example, in some embodiments the data management platform can be configured to monitor and/or processes one or more transactions on behalf of a particular user, account, borrower, or agent. In other embodiments, the data management platform can be configured, as described above, to facilitate transactions between entities. Regardless of the specific implementation selected, the data management platform can retain one or more records associated with each of the transactions that the data management platform processes. These transaction records, in addition to information related to or describing these transactions or transaction records can be stored in the database referenced above and/or can be aggregated with data obtained from third-party servers.

For example, in one embodiment, a data management platform that has been approved by a borrower to access two financial institutions, a checking account and a savings account. As described above, the data management platform can be configured to obtain records and/or information from these two financial institutions. The obtained information can be aggregated together and stored in a database of the data management platform. In this example, the borrower can also approve the data management platform to monitor a third account of the borrower, such as a credit card account. In this example, every transaction the borrower initiates using the credit card is forwarded, processed, or otherwise obtained by the data management platform. In some embodiments, the data management platform can aggregate the credit card information with the checking account information and the savings account information. In other examples, the data management platform maintains a separate database or table (or set of databases or tables) to record and capture data obtained related to the credit card account.

Furthermore, it may be appreciated that the systems, servers, and software applications referenced in FIG. 20 can be implemented in a number of ways on a number of different hardware platforms.

Data Management Platform

FIG. 21A depicts a simplified signal flow diagram of a system 2100, such as described herein, including a data management platform 2102 and a number of class objects and interface instances that can be instantiated by a processor (not shown) and/or operating system of the data management platform 2102.

As with the system 2000 depicted in FIG. 20, the data management platform 2102 implements a secure communication architecture between one or more user devices, one or more third-party servers, and one or more remote data source servers. For simplicity of illustration and description the user devices are collectively represented by the user device 2104, the remote account servers are collectively represented by the remote data source server 2106, and the third-party servers are collectively represented by the third-party server 2108. The data management platform 2102 includes a database 2110 for aggregating and storing formatted private data retrieved from the remote data source server 2106.

As with other embodiments described herein, the data management platform 2102 instantiates various interfaces to communicate with the user device 2104, the third-party server 2108, and the remote data source server 2106. More specifically, the data management platform 2102 instantiates an application interface 2112 to communicate with the user device 2104, a remote account interface 2114 to communicate with the remote data source server 2106, and a third-party interface 2116 to communicate with the third-party server 2108. The interfaces can communicate using any suitable proprietary, customized, or open-source application-layer or transport-layer protocol (e.g., TCP, UDP, TLS, SSL, HTTP, HTTPS, and so on). In some embodiments, the interfaces conform to a state-based or object-based messaging protocol specification, such as a RESTful API or a SOAP API, however, as noted with respect to the system 2000 in FIG. 20, specific messaging or transport protocols may not be required and any suitable messaging protocol and/or data structuring technique can be used.

As noted above, the data management platform 2102, the user device 2104, the third-party server 2108, and the remote data source server 2106 can each be implemented as servers or other network-enabled electronic devices communicably coupled via a local and/or remote network. For simplicity of description, the data management platform 2102, the user device 2104, the third-party server 2108, and the remote data source server 2106 are described herein as "electronic devices" or "servers" although it may be appreciated that, in certain embodiments, one or more of the data management platform 2102, the user device 2104, the third-party server 2108, and the remote data source server 2106 can be implemented partially or entirely in software, operating as a virtual machine.

In the illustrated embodiment, the user device 2104, the remote data source server 2106, and the third-party server 2108 are depicted as electronic devices including at least one processor, at least one memory, and at least one network interface.

More specifically, the user device 2104 includes a processor 2106a, a memory 2104b, and a network interface 2104c. In many cases, the user device 2104 also includes a display, a housing, one or more sensors, one or more input components, and so on. Many of these elements are omitted from FIG. 21A for simplicity. In many embodiments, the user device 2104 is a personal electronic device, such as a cellular phone, laptop computer, desktop computer, and the like. However, this may not be required of all embodiments; the user device 2104 can be, without limitation: a server; a group of servers; a portable electronic device; a tablet computer; a kiosk; and so on.

The processor 2106a of the user device 2104 is configured to access the memory 2106b to retrieve executable instructions that cause the processor 2106a to perform, coordinate, and/or manage one or more functions of the user device 2104. For example, the processor 2106a can be configured to operate the network interface 2104c in order to communicate with the application interface 2112. In this manner, the user device 2104 can exchange data with the data management platform 2102.

As with the user device 2104, the remote data source server 2106 and the third-party server 2108 each include a processor (identified as the processor 2106a, and the processor 2108a respectively), a memory (identified as the memory 2106b, and the memory 2108b, respectively), and a network interface (identified as the network interface 2106c, and the network interface 2108c, respectively). It typical examples, the remote data source server 2106 and the third-party server 2108 are each implemented as (or on) an enterprise server, although this may not be required.

In many examples, the data management platform 2102 is a server or server system that includes a processor. The processor can be implemented as any electronic device capable of processing, receiving, or transmitting data or instructions. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The processor of the data management platform 2102 is configured to access a memory storing executable instructions. When executed, the instructions cause the processor to perform, coordinate, or monitor one or more of the operations of the data management platform 2102.

Upon executing the instructions stored in the memory, the processor of the data management platform 2102 is configured to instantiate a number of classes and/or objects that are configured to perform specific functions, coordinate communication between classes or objects, and/or coordinate communication between class objects and external resources, such as the user device 2104, the remote data source server 2106, or the third-party server 2108.

For example, as noted above, the processor of the data management platform 2102 instantiates three interfaces for communicating with the user device 2104, the remote data source server 2106, or the third-party server 2108. One of the instantiated interfaces is the remote account interface 2114. The remote account interface 2114 facilitates communication between various class objects instantiated by the processor of the data management platform 2102 and the remote data source server 2106.

An example class object configured to communicate with the remote data source server 2106 via the remote account interface 2114 is identified in FIG. 21A as an unexposed API/data extraction engine 2118. The unexposed API/data extraction engine 2118 can implement a number of methods and/or functions to communicate with and/or extract data from one or more remote data source servers that do not expose a conveniently-accessible API.

For example, in one embodiment, the unexposed API/data extraction engine 2118 can be configured to, without limitation: render a web page hosted by the remote data source server 2106 and scrape data from the loaded web page; simulate a user interaction with a web page hosted by the remote data source server 2106, scraping data from the loaded web page; simulate the presence of an approved first-party application to interact with an unexposed API provided by the remote data source server 2106; and so on.

Another example class object configured to communicate with the remote data source server 2106 via the remote account interface 2114 is identified as an API/data extraction engine 2120. Unlike the unexposed API/data extraction engine 2118, the API/data extraction engine 2120 is configured to access one or more resources or endpoints of the remote data source server 2106 by submitting queries and collecting responses from the remote data source server 2106 according to an API defined by, and exposed by, the remote data source server 2106.

In many embodiments, the functions and/or methods performed by the unexposed API/data extraction engine 2118 and the API/data extraction engine 2120 are duplicative; only one of the two class objects is required to be operational at any given time to communicate with a particular remote data source server 2106.

The unexposed API/data extraction engine 2118 and the API/data extraction engine 2120 are each configured to communicate with another class object identified in FIG. 21A as the data processing engine 2122.

The data processing engine 2122 is configured to receive and process raw data obtained by the unexposed API/data extraction engine 2118 and the API/data extraction engine 2120. For example, the data processing engine 2122 can perform one or more data validation operations in response to receiving raw data from either the unexposed API/data extraction engine 2118 or the API/data extraction engine 2120. A data validation operation may include, but may not be limited to: spelling validation, grammar validation, format validation, numerical range validation, forbidden character checking, data sanitizing operations, and so on.

In other embodiments, the data processing engine 2122 can perform one or more data formatting or preformatting operations in response to receiving raw data from either the unexposed API/data extraction engine 2118 or the API/data extraction engine 2120. A formatting operation can include, but may not be limited to: recasting values from type to another (e.g., string to date, integer to double or float, and so on); reformatting string dates into date objects; trimming whitespace; changing case of a string; truncating a string; translating a string from a first language to a second language; converting one currency to a second currency; rounding a number to a specific precision; removing forbidden characters; and so on.

In other embodiments, the data processing engine 2122 can perform one or more data sorting, structuring, or organization operations in response to receiving raw and/or preformatted data from the unexposed API/data extraction engine 2118, the API/data extraction engine 2120, or a method object of the data processing engine 2122 itself. A sorting, structuring, or organization can include, but may not be limited to: alphabetical sorting; chronological sorting; rejection of certain fields or data types; addition of certain fields or data types; mapping received data to one or more data objects; and so on.

In other embodiments, the data processing engine 2122 can perform one or more data categorization or tagging operations in response to receiving raw and/or preformatted data from the unexposed API/data extraction engine 2118, the API/data extraction engine 2120, or a method object of the data processing engine 2122 itself. A categorization or tagging can include, but may not be limited to: appending a data type to one or more data points (e.g., transaction type, merchant type, health information type, and so on); tagging one or more data points with a searchable tag or identifier; tagging one or more of the data points with an identifier corresponding to the remote data source server 2106; tagging one or more of the data points with a timestamp corresponding to the time and date at which the data was obtained from the remote data source server 2106; and so on.

The foregoing example functions and operations of various class objects described above, and the alternatives thereof and variations thereto are presented, generally, for purposes of explanation, and to facilitate an understanding of possible configurations and uses of a data management platform subsystem configured to output well-formatted data obtained from an unknown source, such as the remote data source server 2106. However, it will be apparent to one skilled in the art that some of the specific details presented herein may not be required in order to practice a particular described embodiment, or an equivalent thereof. Similarly, it will be apparent to one skilled in the art that the systems described herein can be modified, adjusted, or otherwise adapted to other remote data sources.

For example, the required to extract, format, and validate data from a banking server may be different from the operations required to extract, format, and validate data from a credit card issuer. As such, it is appreciated that the unexposed API/data extraction engine 2118, the API/data extraction engine 2120, and the data processing engine 2122 are typically configured differently in different embodiments. More specifically, the unexposed API/data extraction engine 2118, the API/data extraction engine 2120, and the data processing engine 2122 can be specifically configured for each and every remote data source configured to communicate with the data management platform 2102. In some cases, a set of configuration variables for each engine can be stored as a configuration schema specific to particular remote data source. In these embodiments, whenever the data management platform 2102 communicates with a specific remote data source server (in many cases, identified by a specific identifier or tag), a corresponding configuration schema can be applied to reconfigure each engine dynamically. In other cases, configuration schemas may not be required.

Once the data processing engine 2122 has processed data received from the remote data source server 2106, the data can be inserted into the database 2110 for long-term storage. In some cases, the database 2110 is configured to overwrite existing data with new data, although this may not be required. The database 2110 may be a relational database or a non-relational database.

Another class object instantiated by the processor of the data management platform 2102 is the remote account interface 2114. As noted with respect to other embodiments described herein, the remote account interface 2114 is configured to facilitate communication between a third-party server, such as the third-party server 2108 and one or more class objects or objects instantiated by the processor of the data management platform 2102.

An example class object configured to communicate with the third-party server 2108 via the third-party interface 2116 is identified in FIG. 21A as a permission engine 2124. The permission engine 2124 is configured to supervise and/or manage retrieval of formatted private data from the database 2110. For example, in some embodiments, the permission engine 2124 is configured to receive, from the third-party server 2108, via the third-party interface 2116, a request for private data. In response to the request, the permission engine 2124 can query the database 2110 to determine whether the database 2110 contains information sufficient to respond to the request. If the permission engine 2124 determines that the database does contain information sufficient to respond to the request, the permission engine 2124 can communicate, via the application interface 2112 to the user device 2104 to request permission to disclose the requested data to the third-party server 2108.

Another example class object configured to communicate with the third-party server 2108 via the third-party interface 2116 is identified in FIG. 21A as a formatting engine 2126. The formatting engine 2126 is configured to format private data in advance of disclosing that data to the third-party server 2108 (e.g., after the permission engine 2124 has obtained permission to disclose the data to the third-party server 2108). The formatting engine 2126 can perform any number of suitable formatting operations including, but not limited to: recasting data types; truncating one or more data fields; changing case of one or more data fields; merging data from one or more tables of the database 2110; inserting one or more data fields into a template form; substituting tokens in a template form with one or more data fields; structuring data into a format specified by the third-party server; and so on.

Another example class object configured to communicate with the third-party server 2108 via the third-party interface 2116 is identified in FIG. 21A as an encryption engine 2128. The encryption engine 2128 is configured to encrypt already-formatted in advance of disclosing that data to the third-party server 2108 (e.g., after the permission engine 2124 has obtained permission to disclose the data to the third-party server 2108 and after the formatting engine 2126 has reformatted the data to be disclosed). The encryption engine 2128 can employ any suitable encryption technology or methodology including, but not limited to: symmetric key encryption; public key encryption; and so on.

For example, FIG. 21B depicts a simplified signal flow diagram of a system 2100, such as described herein, including a data management platform 2102. As shown in FIG. 21B, tokens may be used by the first third-party system in accessing financial/asset reports from the report manager and a second token (i.e., "audit token") may be used by a second third-party system in similarly acquiring the financial report for auditing reasons.

As with the system 2000 depicted in FIG. 20, the data management platform 2102 implements a secure communication architecture between one or more user devices, one or more third-party servers (e.g., lending institutions), and one or more remote data source servers (e.g., financial services institutions). As with other embodiments described herein, for simplicity of illustration and description the user devices are collectively represented by the user device 2104, the remote account servers are collectively represented by the remote data source server 2106, and the third-party servers are collectively represented by the third-party server 2108. The data management platform 2102 includes a database 2110 for aggregating and storing formatted private data retrieved from the remote data source server 2106.

In this embodiment, however, secure communication between different portions of the data management platform 2102 can be cryptographically facilitated. More specifically, instead of—or in addition to—exchanging and/or storing user credentials to access one or more of the remote data source servers (such as the remote data server 2106), the illustrated embodiment can facilitate secure (and revocable) communication by generating, distributing, and exchanging cryptographic keys, referred to herein as tokens.

More specifically, in one embodiment, a user of the user device 2104 may provide credentials to access a secure database stored in the remote data server 2106. In this example, the user device 2104 may provide the credentials to the data management platform 2102 through an API 2130. In response, the API 2130 can access to the remote data server 2106 using the supplied credentials. In response, the remote data server 2106 can provide the data management platform 2102 with a cryptographically-secure token (e.g., a session token) corresponding to the credentials provided by the user device 2104 that can be used, at a later time, to obtain access to the remote data server 2106 again. Thereafter, the token can be stored in a token database 2132.

\*\*These can represent ways of sharing tokens and accessing financial information\*\*

In further embodiments, the data management platform 2102 can be configured to receive a request from the third-party server 2108 for information contained in the remote data server 2106. To fulfill the request, the data management platform 2102 may access the token database 2132 to retrieve the token associated with the remote data server 2106. Once the token is obtained, the data management platform 2102 can access the remote data server 2106, obtain the requested data, and forward the requested data to the third-party server 2108.

In other examples, the data management platform 2102 can be configured to send the token stored in the token database 2132 to the third-party server 2108. In this example, the third-party server 2108 can access the remote data server 2132 directly.

In still further examples, the third-party server 2108 may request a report of data stored in the remote data server 2106 and/or of data stored in the database 2110. In these embodiments, the data management platform 2102 includes a report manager 2134. The report manager 2134 can be communicably coupled to the token database 2132 and to the API 2130. As a result of this architecture, the report manager 2134 can access data contained in the database 2110 and, additionally, data stored in the remote data server 2106 (e.g., via accessing and supplying the appropriate token from the token database 2132). In still further embodiments, the report manager 2134 can be communicably coupled to one or more institutional databases (e.g., tax databases, financial databases, other banking or financial institutions, and so on). An example institutional database is identified as the institutional database 2136. The report manager 2134 can access the institutional database 2136 via an API specific to the associated institution. In the illustrated embodiment, the institutional database 2136 is accessed via an institution interface system 2138 that includes one or more institution-specific modules (referred to as institution interface modules, or "IIM"). More specifically the institution interface system 2138 is a financial institution interface system configured to interface with financial institution systems.

Once a report is generated—including data obtained from any or all of the database 2110, the remote data source 2106, or the institution database 2136—by the report manager 2134, the report can be transmitted to any appropriate party, such as the third-party server 2108.

In order to verify the veracity of the report generated by the report manager 2134, the third-party server 2108 may audit the report. In these embodiments, the data management platform 2102 can facilitate trusted auditing of a report by providing temporary and/or limited-access tokens to the third-party server 2108. In response, the third-party server 2108 can use the received tokens to access the remote data source 2106 to verify that at least a portion of data contained in the report generated by the report manager 2134 is accurate.

In still other examples, various tokens associated with particular databases, accounts, records, and/or metadata can be exchanged between various components communicably coupled to the data management platform 2102. Other example uses and functions of tokens described herein can be equivalently applied.

The foregoing examples describe above, and the various alternatives thereof and variations thereto are presented, generally, for purposes of explanation, and to facilitate an understanding of various configurations and uses of a system—and various classes and objects that can be instantiated by that system—such as described herein. However, it will be apparent to one skilled in the art that some of the specific details presented herein may not be required in order to practice a particular described embodiment, or an equivalent thereof.

For example, the example embodiment described above contemplates that one or more functions of a data management platform such as described herein may be implemented by purpose-configured class objects instantiated by one or more processors of the data management platform. In other embodiments, this may not be required. For example, in some embodiments, any one of the unexposed API/data extraction engine 2118, the API/data extraction engine 2120, the data processing engine 2122, the permission engine 2124, the formatting engine 2126, or the encryption engine 2128 can be separately implemented in hardware, on different or distributed servers, or as a combination of dedicated hardware and software.

Further embodiments reference a user interface that can be presented by a display of a user device in communication with a data management platform such as described herein. As noted with respect to many embodiments described herein, a user device can be operated in order to provide input to the data management platform in a simple, compact, and efficient manner.

End-User Software Application User Interface

Generally and broadly, FIGS. 22A-22L depict various example user interfaces that can be rendered by an instance of an application executed by an electronic device, such as the user devices depicted in FIGS. 20, 21A, and 21B. As noted with respect to other embodiments described herein, the user device can be any suitable electronic device such as, but not limited to, a: cell phone, smart phone, tablet, desktop computer, vehicle entertainment system, wearable electronic device, and so on.

Phrased in another manner, the embodiments depicted in FIGS. 22A-22F depict various methods of displaying information, summarizing information, providing selections to display different types of information, and/or soliciting input from a user of an electronic device in order to interact with a data management platform, such as described herein.

Example interactions with a data management platform described above that can be facilitated by the various user interfaces depicted in FIGS. 22A-22L can include, but may not be limited to: selecting one or more remote data sources (e.g., financial institutions, credit agencies, brokerages, loan servicing agencies, public utilities, service providers and so on) for the data management platform to access; selecting one or more remote data sources to include in a set of private data disclosed to a third-party; providing one or more credentials for the data management platform to access a remote data source; displaying data obtained by querying a database of the data management platform; receiving a request from the data management platform to authorize disclosure of certain private data to a third-party; modifying a request from a third-party for private data; deactivating access previously granted; selecting one or more financial accounts; and so on.

For simplicity of description, however, as with other embodiments described herein, the following embodiments reference a transaction in which a lender (the third-party) requests private financial data from a borrower (the subject and the user of the electronic device). In this example, the borrower may be presented with graphical user interface options related to acquiring and/or disclosing private financial data. However, as noted above, it may be appreciated that these examples are neither limiting or nor exhaustive; other implementations are possible.

Further, it may be appreciated that the various views and example user interface configurations provided below are not limited to the specific layout, order, text, relative element size or positioning, as provided. In other words, different user interfaces and different user interface progressions, animations, and sequences are contemplated. A person of skill in the art will appreciate that the following examples are merely isolated examples and, in some embodiments, a user interface can be provided in another manner.

FIGS. 22A-22L each depict an electronic device 2200 executing an application that presents a user interface. Typically, the application is executed by a processor of the electronic device 2200 that accesses a non-volatile memory to obtain executable instructions that cause the processor to load a virtual machine defined by the executable instructions into a fast-access memory. The virtual machine is configured to, among other functions, generate a graphical user interface for providing output to, and for obtaining input from, a user of the electronic device 2200.

More specifically, the user interface is configured to present data to the borrower and to request data input from the borrower. The user interface can be configured to receive borrower-input data in a number of ways, including, but not limited to: manually-input data; scanned data (e.g., via a camera or image capture device); dictated data; copied data; imported data; uploaded data; handwritten data; and so on.

The electronic device 2200 of FIGS. 22A-22L can be any suitable electronic device, such as but not limited to: a cellular phone; a tablet computer; a laptop computer; a desktop computer; an internet-connectable device; an intranet-connectable device; and so on. In one example, the electronic device 2200 is a portable electronic device that wirelessly connects to a remote server or server group. The electronic device 2200 can include one or more of: a processor; a transitory memory; a non-transitory memory; a display; a user input system; a wireless or wired communication module; and so on. In many cases, the electronic device 2200 is configured to store program instructions executable by the processor in the non-transitory memory. In some embodiments, one or more portions of a system such as described herein, can be implemented in whole or in part as executable instructions stored in a non-transitory memory within or accessible to the electronic device 2200.

The electronic device 2200 of FIGS. 22A-22L also includes a housing 2202 that encloses a display element that is operably or communicably coupled to the processor, such as described above. The display element can be any number of suitable display elements including but not limited to: LCD displays; LED displays; OLED displays; and so on.

In many cases, the electronic device 2200 also includes a user input system, such as a touch input system or a keyboard input system, in order to receive input from the borrower.

Figure 22A:
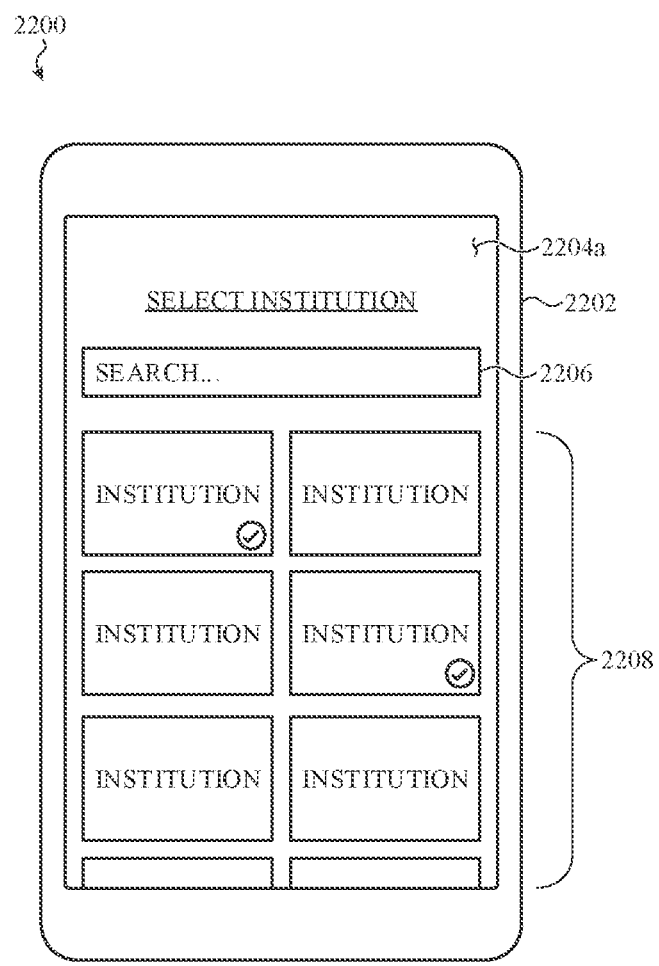
FIG. 22A depicts an electronic device executing an application that provides a user interface to select one or more banking or financial institutions.

FIG. 22A depicts the electronic device providing a user interface 2204a to select one or more banking or financial institutions from a list or grid. In one example context, the user interface 2204a can be presented to a user of the electronic device 2200 (e.g., the borrower) while that electronic device is in communication with a data management platform, such as the data management platforms described in reference to FIGS. 20, 21A, and 21B. The financial institutions can be, without limitation: banks; brokerages; credit card issuers; digital wallets; cryptocurrency exchanges; online retailers; loyalty programs; mortgage servicers; and so on.

In other example contexts, the user interface 2204a can be presented to the borrower in response to a request from a third-party, such as the lender. For example, the borrower may access a website or service provided by the lender that redirects the borrower to the user interface 2204a. In other cases, the user interface 2204a can be a web-accessible page hosted by a data management platform, such as the data management platforms described in reference to FIGS. 20, 21A, and 21B. In yet other embodiments, the user interface 2204a can be provided by a native application executed on the electronic device 2200. It may be appreciated that the foregoing examples are not exhaustive and that other user interface generation techniques, and/or combinations of such techniques can be used.

In the illustrated configuration, a borrower can use the electronic device 2200 to instruct a data management platform to access and aggregate private financial data from each of the selected financial institutions from the list of financial institutions. In another embodiment, the borrower can use the electronic device 2200 to the data management platform to only disclose data from the selected financial institutions to a third-party server. For example, although the borrower authorizes the electronic device 2200 to access more than one financial institution, the borrower may only authorize information obtained from one of the financial institutions may be disclosed to the third-party server.

In this example configuration, the user interface 2204a also presents a search field 2206 to receive a text query from the borrower to search a scrollable set of selectable remote data sources, identified in the figure as the selectable financial institutions 2208. The search field 2206 can be configured to receive alphanumeric input, hand-drawn input, numeric-only input, symbol-only input, dictated input, and so on. The search field 2206 can limit the displayed financial institutions to those that match a query entered into the search field 2206. In some examples, the search field 2206 may be operably or functionally coupled to a web search engine configured to obtain lists of financial institutions from a remote server.

In the illustrated embodiment, the selectable financial institutions 2208 are presented in a grid format below the search field 2206, but this may not be required. For example, in some embodiments, the selectable financial institutions 2208 can be presented in a list format. In other cases, the search field 2206 can be positioned below, or in the center of, the grid or list of the selectable financial institutions 2208.

In many cases, the search field 2206 implements a live search that automatically updates which of the selectable financial institutions 2208 are shown, hidden, dimmed, or highlighted in response to each subsequent character input to the search field 2206. In some cases, more than one financial institution of the selectable financial institutions 2208 can be selected at a time. In other cases, only one financial institution may be selected at any time.

After the borrower has completed selecting on or more financial institutions, the electronic device 2200 can transmit the selection(s) to the data management platform. In some cases, the borrower selects a software button (not shown) in the user interface 2204a to signal that the selection process is complete (e.g., a "done" button shown at the top or bottom of the scrollable list).

In another embodiment, the user interface can change to accept user input of one or more credentials to access information and/or data stored on servers associated with the selected financial institutions.

Figure 22B:
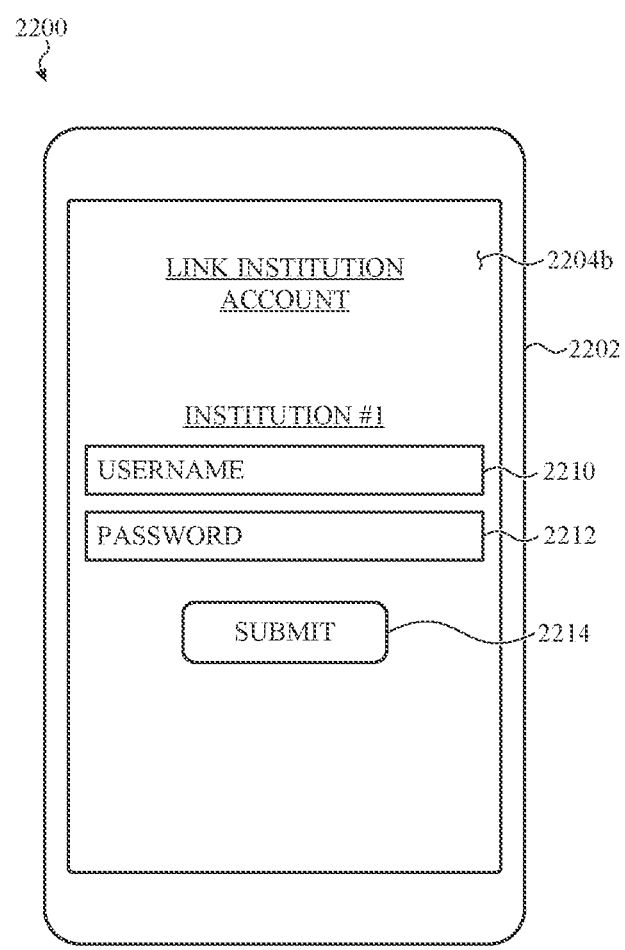
FIG. 22B depicts the electronic device of FIG. 22A, providing another user interface to securely access financial records stored by a selected banking or financial institution.

FIG. 22B depicts the electronic device of FIG. 22A, providing another user interface—identified as the user interface 2204b—that can be presented to the borrower. In this example, the borrower can input one or more credentials to the user interface 2204b that can be used by the data management platform to access one or more financial institutions, such as the financial institutions selected in the user interface 2204a depicted in FIG. 22A.

In the illustrated example, the user interface 2204b includes a username text field 2210 and a password text field 2214, soliciting the borrower to input a username and a password associated with a particular institution. The username text field 2210 and a password text field 2214 can be configured to receive alphanumeric input, hand-drawn input, numeric-only input, symbol-only input, dictated input, and so on. In some cases, characters input to the password text field 2214 can be hidden, although this is not required. In some embodiments, a button can be provided (not shown) that toggles whether characters input to the password text field 2214 are hidden.

In some cases, the username text field 2210 and a password text field 2214 can be validated before sending their contents to the data management platform. For example, in some embodiments, the data management platform can transmit a validation schema to the electronic device 2200. The validation schema can define certain rules for the content of the username text field 2210 and a password text field 2214. For example, a particular validation schema for the username text field 2212 may require a properly formatted email address. If the borrower enters an improperly-formatted email address, an error message can be shown in the user interface 2204b.

In another example, a particular validation schema for the password text field 2214 may require, for example, at least a minimum number of characters. If the borrower enters a fewer than the minimum number of characters, an error message can be shown in the user interface 2204b.

In some embodiments, a validation schema can be based, at least in part, on the particular institution associated with the credentials requested. For example, a first institution may enforce different password and/or username rules than a second institution.

In further embodiments, additional credentials and/or different credentials can be requested of the borrower including, but not limited to: an account number, a routing number, a pin number, a social security number, a driver's license number, a rolling two-factor authentication access code, and so on.

As noted with respect to other embodiments described herein, other steps and/or authentication operations may be required in addition to the username and password solicited in the illustrated user interface. For example, the user interface 2204b may require a two-factor authentication code.

In still further embodiments, the user interface 2204b may also show a privacy policy and/or an end-user software license agreement. In some cases, these documents may be accessed by the borrower by clicking a link provided in the user interface 2204b. In some further embodiments, a selection box may be provided so that the borrower can provide an affirmative statement that the borrower has reviewed a particular policy or agreement. For simplicity of illustration, these example embodiments are not depicted in FIG. 22B.

In some embodiments, multiple sets of credentials can be requested from a borrower in sequence, or at the same time. For example, continuing the example embodiment depicted in FIG. 22A, a borrower may select multiple banking institutions. Once selected, the borrower can be presented with the user interface 2204b to provide credentials to access a first institution and, thereafter, the borrower can be presented with a second instance of the user interface 2204b to provide credentials to second institution. In some cases, an animation can be provided to transition between instances of the user interface 2204b, but this may not be required.

Figure 22C:
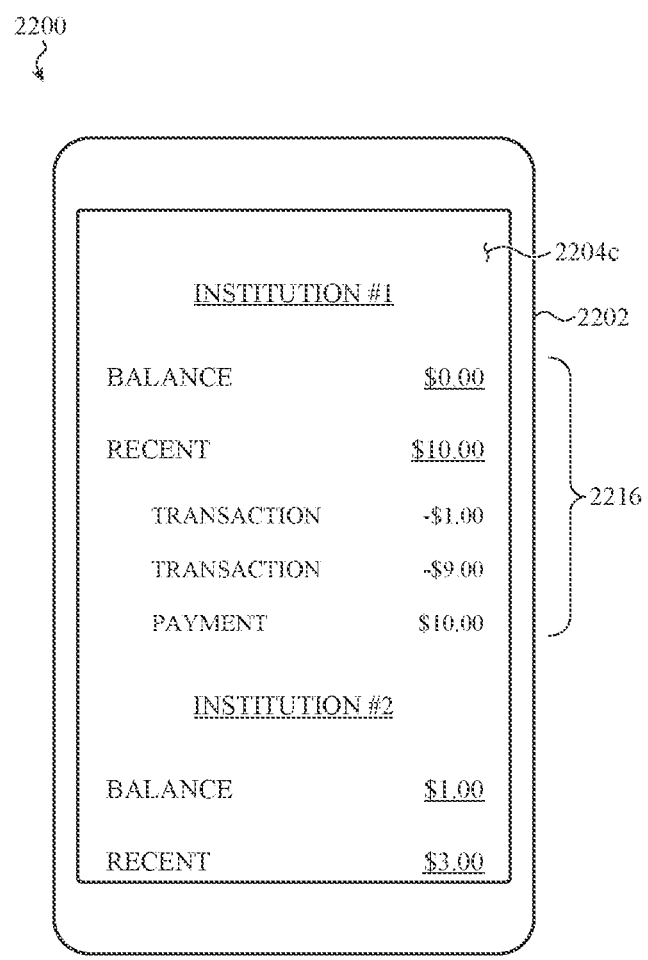
FIG. 22C depicts the electronic device of FIG. 22B, providing another user interface to review financial records stored by the selected banking or financial institution.

In another embodiment, FIG. 22C depicts the electronic device of FIG. 22A, providing another user interface—identified as the user interface 2204c—that can be presented to the borrower. In this example, an aggregation of data obtained from multiple remote data sources can be summarized and displayed together in a summary 2216. In the illustrated embodiment, an arbitrary number of records from an arbitrary number of financial institutions can be summarized together. In other cases, an arbitrary number of records from similar financial institution types can be summarized together (e.g., summarized banking information, summarized debt information, summarized investment information, and so on). In still other cases, information can be provided to the borrower in a different manner. For example, the borrower may be presented with an option to limit and/or otherwise filter the records that are presented and/or summarized for one or more institutions. For example, the borrower may elect to summarize transactions and payments from a first institution that occur between two dates.

Figure 22D:
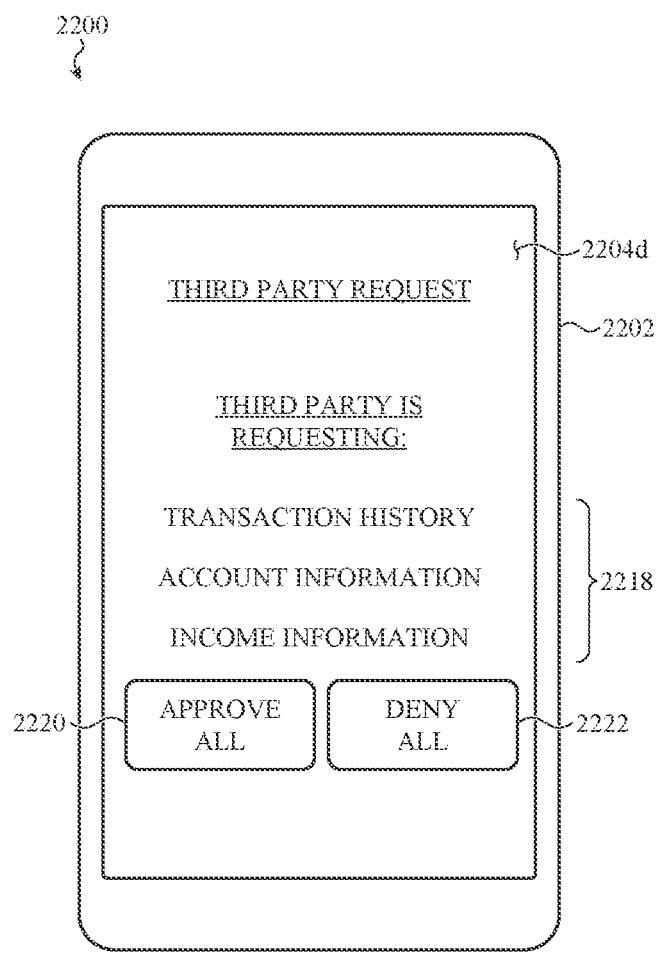
FIG. 22D depicts the electronic device of FIG. 22B, providing another user interface to approve or deny a request by a third-party to review financial records.

In another embodiment, FIG. 22D depicts the electronic device of FIG. 22A, providing another user interface—identified as the user interface 2204d—that can be presented to the borrower. In this example, the electronic device 2200 receives a request from a data management platform—such as described herein—for permission to distribute and/or disclose primate data to a third-party. In response, in this embodiment, the user interface 2204d presents a summary

2218 of data requested by the third-party. In the illustrated embodiment, the third-party requests transaction history, account information, and income information from the borrower. It may be appreciated that although FIG. 22D lists "third-party," in certain embodiments, an institution name can be provided to the borrower in the user interface 2204d.

To respond to the request, the borrower can select one of two buttons presented in the user interface 2204d. A first button 2220 can be selected if the borrower approves the request and a second button 2222 can by selected if the borrower denies the request.

Figure 22E:
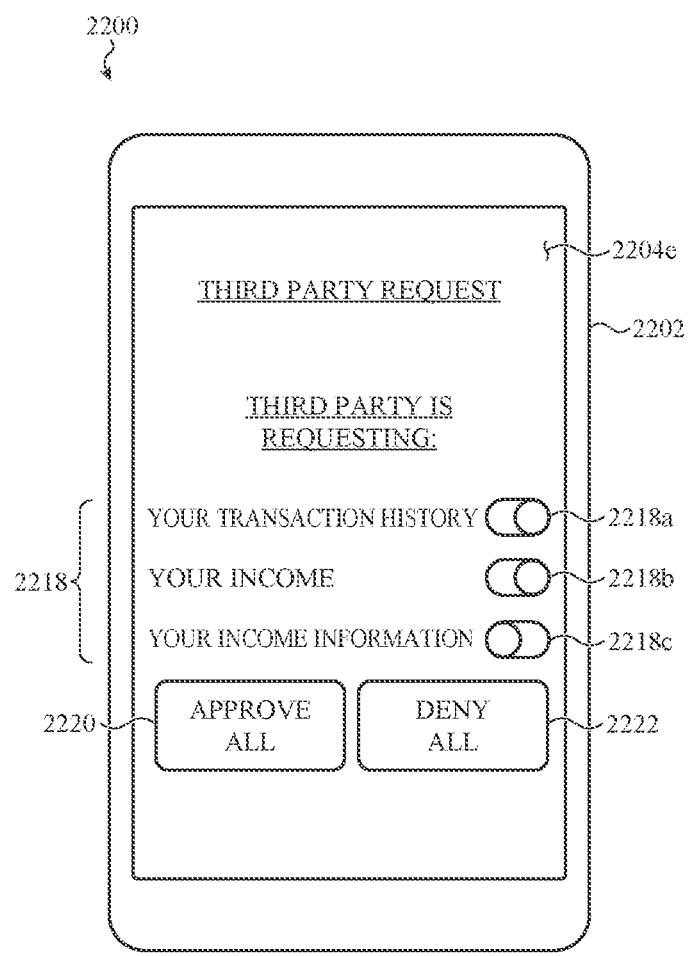
FIG. 22E depicts the electronic device of FIG. 22B, providing another user interface to approve or deny a request by a third-party to review financial records.

In other examples, the borrower may be presented with an interface to selectively activate and/or deactivate different elements of the summary 2218. For example, as shown in FIG. 22E, the summary 2218 can be accompanied by individual switches 2218a-2218c that correspond to individual portions of the summary 2218. In the illustrated example, the borrower has selected to approve distribution of transaction history and account information (corresponding to the position of the individual switches 2218a, 2218b) whereas the borrower has selected to deny distribution of income information (corresponding to the position of the individual switch 2218c).

It may be appreciated that in other embodiments, other options can be presented in the summary 2218 of the user interface 2204e. In other examples, the summary can include, without limitation: name information; account number information; routing number information; authorized user information; account age information; account type information; account balance history; account maximums and minimum balance requirements; account deposit requirements; account interest rates; account history; transfer information; running balance information; direct deposit information; automatic withdrawal information; number and type of digital wallets linked to an account; transaction type information; and so on.

Figure 22F:
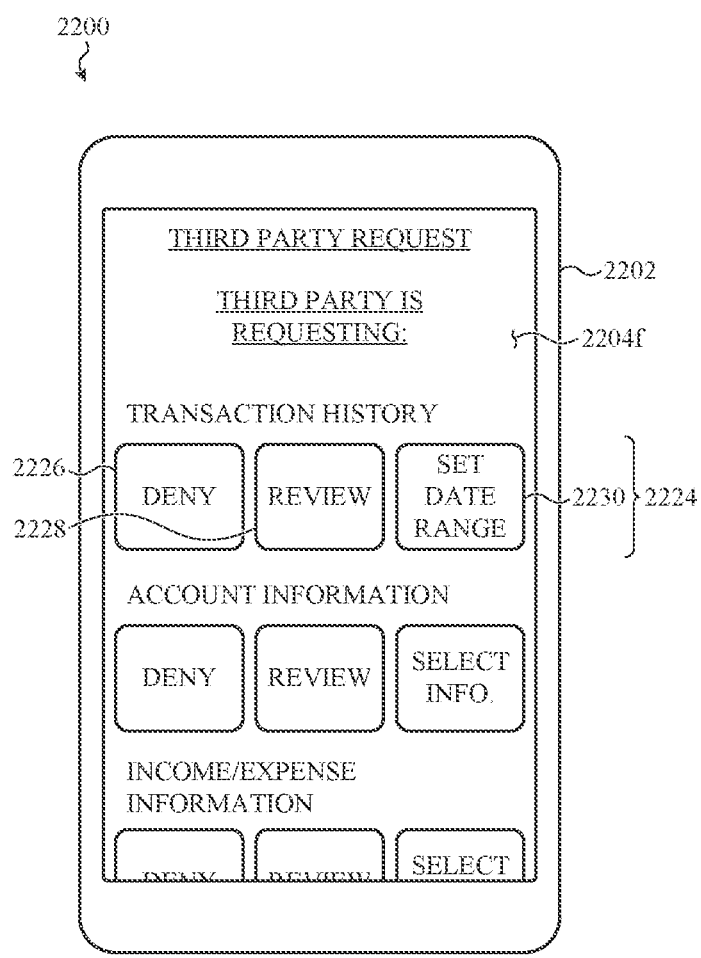
FIG. 22F depicts the electronic device of FIG. 22B, providing another user interface to review, modify, or deny a request by a third-party to review financial records.

In another embodiment, FIG. 22F depicts the electronic device of FIG. 22A, providing another user interface—identified as the user interface 2204f—that can be presented to the borrower. In this example, as with the example provided in reference to FIG. 22D, the electronic device 2200 receives a request from a data management platform—such as described herein—for permission to distribute and/or disclose primate data to a third-party.

In response, in this embodiment, the user interface 2204f presents a summary of data requested by the third-party, also providing an option for the borrower to modify the request. In particular, in the illustrated embodiment, the third-party requests transaction history, account information, and income/expense information from the borrower. In this example, the user interface 2204f provides the borrower with the option to deny, to review, or to modify each requested data type.

For example, FIG. 22F depicts a row of options 2224 that may be selected to modify, approve, or deny any requested data related to transaction history. The row of options includes an option 2226 to deny the request to review the borrower's transaction history, an option 2228 to review every transaction that may be disclosed to the third-party, and an option 2230 to specify a date range to filter the list of transactions disclosed to the third-party.

The options included in the user interface 2204f are not exhaustive. In other embodiments, additional modifications to requested data can be performed such as, but not limited to: setting date ranges; deleting specific transactions; setting threshold amounts above or below which a transaction is ignored; redacting merchant names; redacting amounts; redacting dates; redacting account numbers; redacting or omitting transactions of authorized users; rounding transaction amounts; fuzzing dates and/or amounts; redacting or omitting certain transaction types; and so on. It is appreciated that any number of suitable modifications can be facilitated by the user interface 2204f.

Figure 22G:
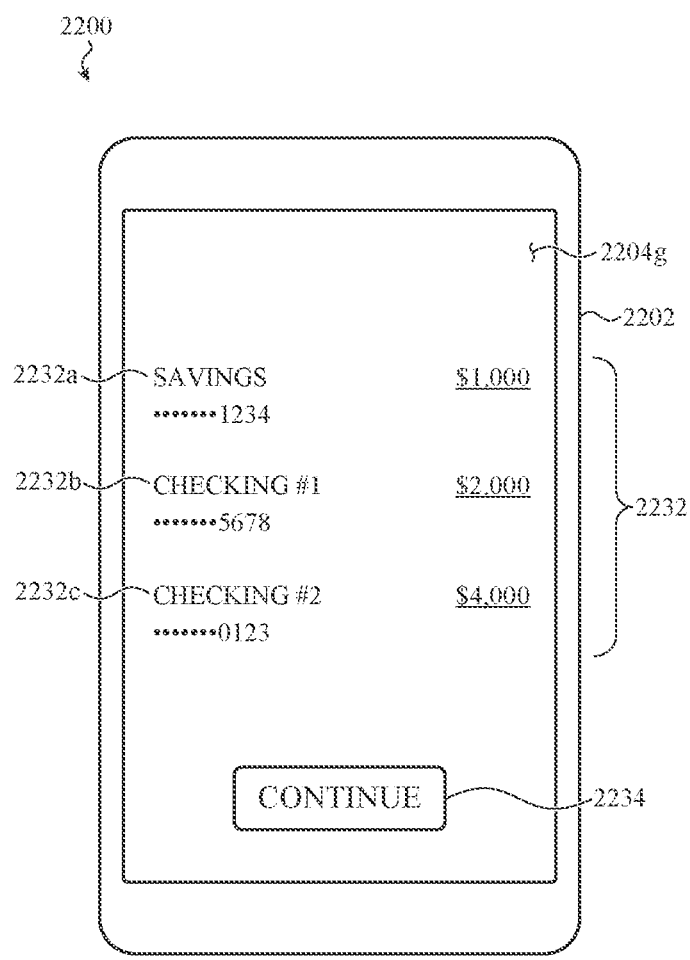
FIG. 22G depicts the electronic device of FIG. 22B, providing another user interface to review financial records stored by the selected banking or financial institution.

In another embodiment, FIG. 22G depicts the electronic device of FIG. 22A, providing another user interface—identified as the user interface 2204g—that can be presented to the borrower. In this example, as with the example provided in reference to FIG. 22C, an aggregation of data obtained from multiple remote data sources can be summarized on a per-account basis and can be displayed together in an account summary 2232.

In the illustrated embodiment, an arbitrary number of records from an arbitrary number of financial institutions can be summarized. As with other examples, the borrower may be provided with a means of filtering and/or otherwise modifying the data shown in the account summary 2232 including options.

Figure 22H:
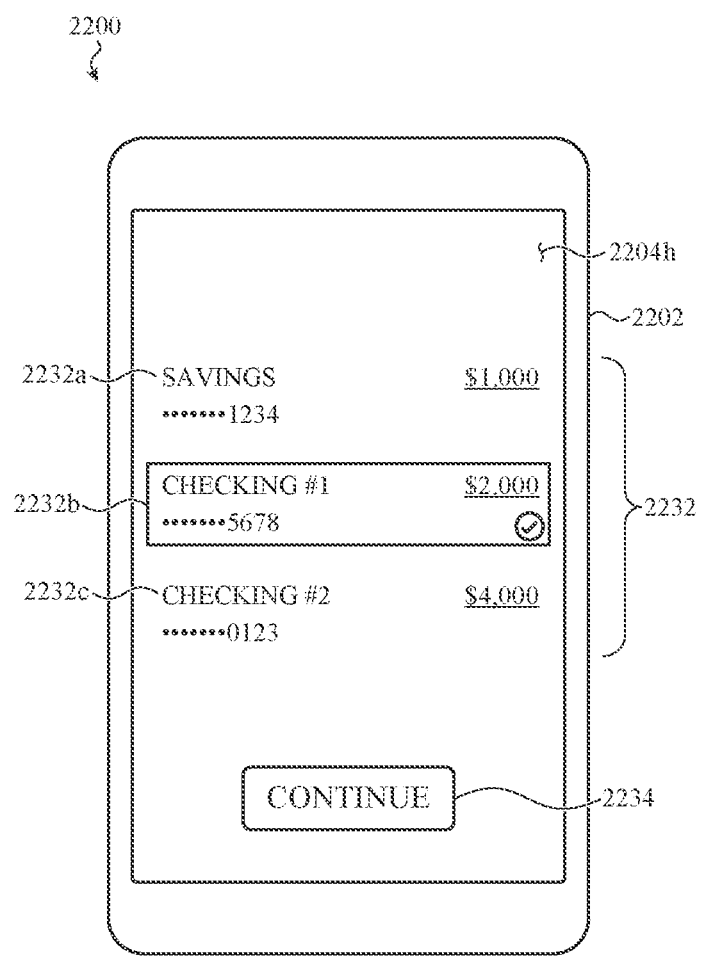
FIG. 22H depicts the electronic device of FIG. 22B, providing another user interface to approve or deny a request by a third-party to review financial records from one or more specific accounts or account types.
Figure 22I:
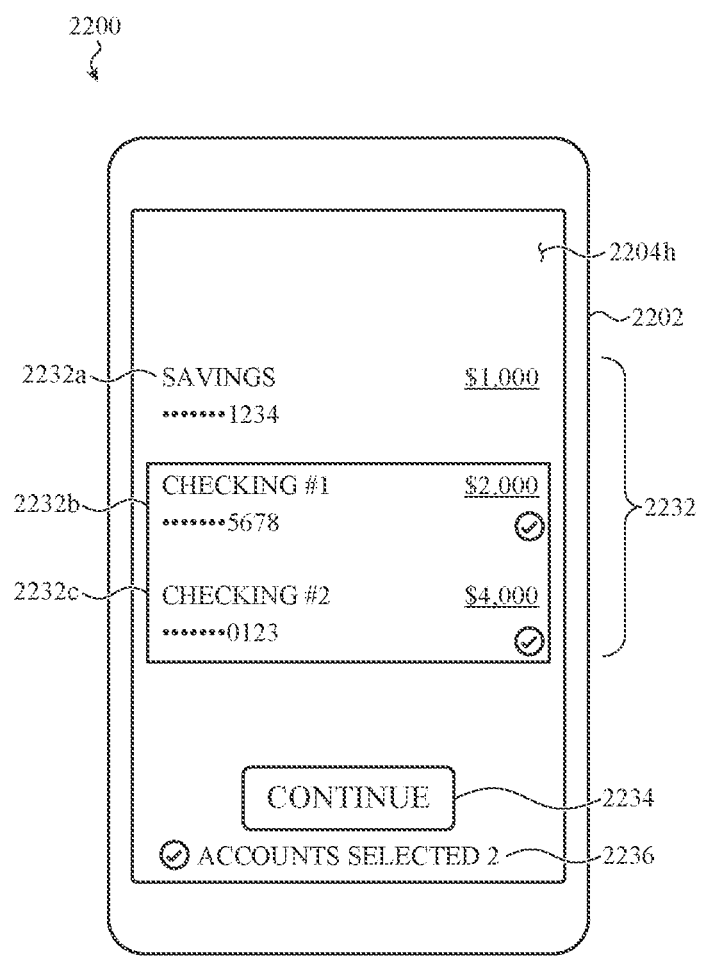
FIG. 22I depicts the electronic device of FIG. 22B, providing another user interface to approve or deny a request by a third-party to review financial records from one or more specific accounts or account types.

In another embodiment, FIGS. 22H-22I depicts the electronic device of FIG. 22A, providing another user interface—identified as the user interface 2204h—that can be presented to the borrower. In this example, as with the example provided in reference to FIG. 22G, an aggregation of data obtained from multiple remote data sources can be summarized on a per-account basis and can be displayed together in an account summary 2232.

In the illustrated embodiment, an arbitrary number of accounts (e.g., the accounts 2232a-2232c) from an arbitrary number of financial institutions can be summarized. As with other examples, the borrower may be provided with a means of filtering and/or otherwise modifying which account data is shown in the account summary 2232. For example, in FIG. 22H, only a single account is selected, whereas in FIG. 22I, two accounts are selected. Once the borrower has made all appropriate selections, the button 2234 can be pressed to advance the user interface 2204h. In some embodiments, such as shown in FIG. 22I, a confirmation 2236 can be shown the displays the total number of accounts selected.

Figure 22J:
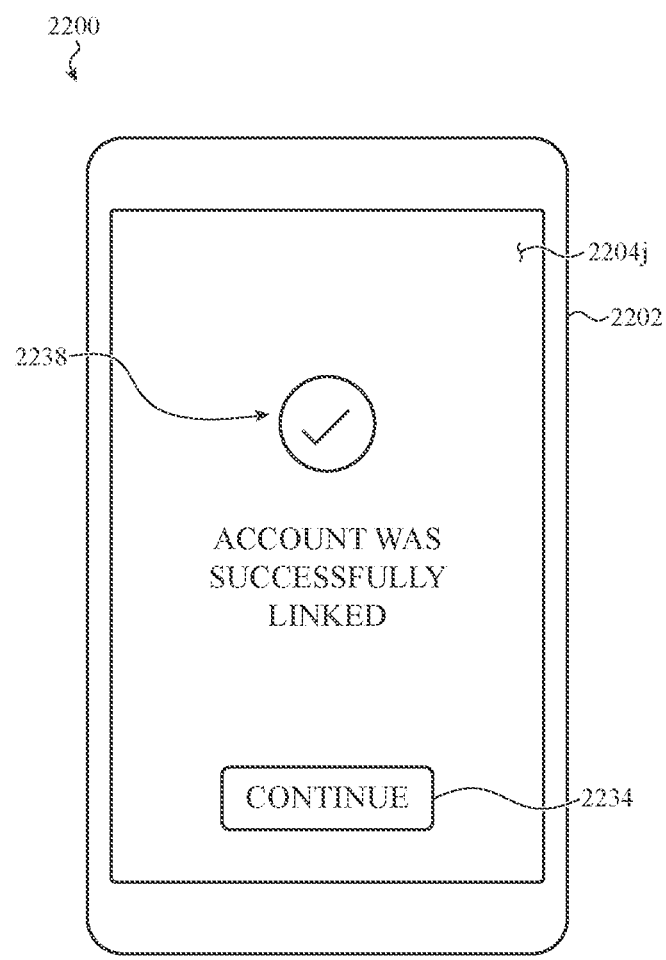
FIG. 22J depicts the electronic device of FIG. 22B, providing another user interface to confirm to a user of the electronic device that an operation has been performed.

Once the user makes certain selections (e.g., FIG. 22H or FIG. 22I), a confirmation dialog can be shown that confirms successful linkage with one or more remote institutions or accounts. FIG. 22J illustrates such an example, including a confirmation graphic 2238.

Figure 22K:
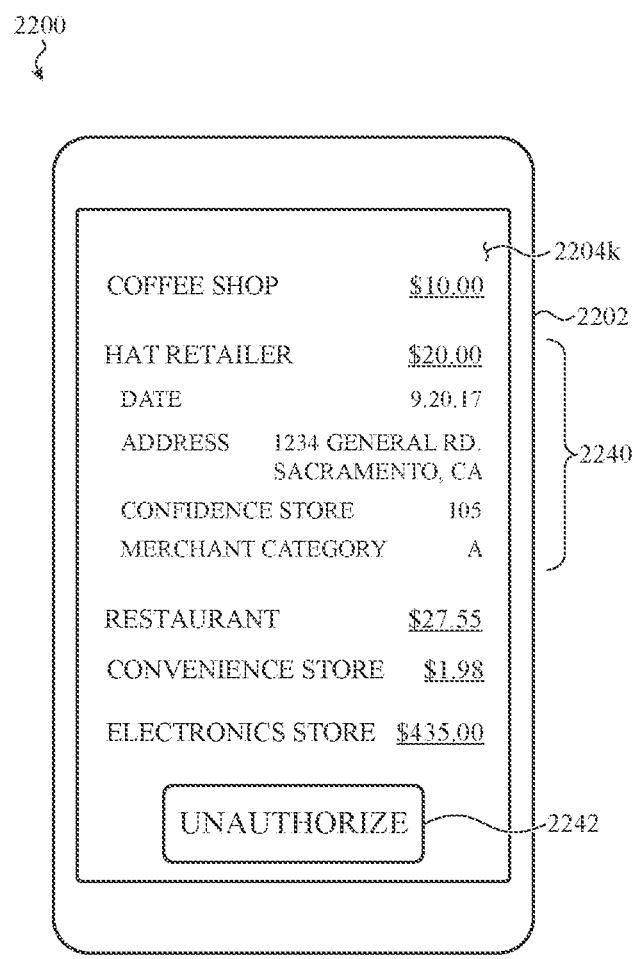
FIG. 22K depicts the electronic device of FIG. 22B, providing another user interface to review financial records stored by the selected banking or financial institution.
Figure 22L:
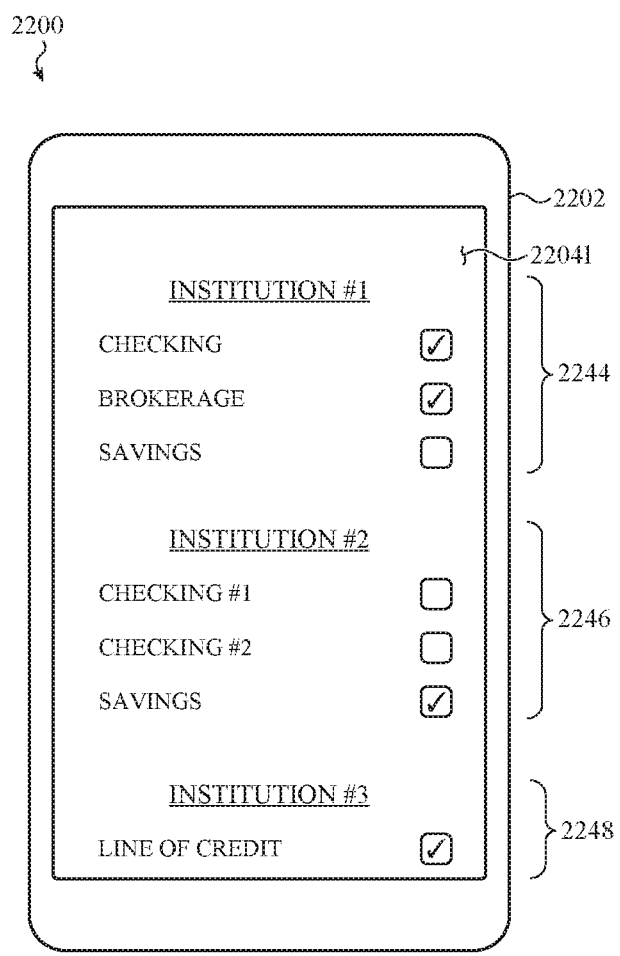
FIG. 22L depicts the electronic device of FIG. 22B, providing another user interface to review financial records stored by a variety of banking or financial institutions.

At a later time, the borrow may wish to change one or more selections. FIGS. 22K-22L each depict user interfaces that may be presented by an electronic device such as described herein. In particular, FIG. 22K depicts the electronic device of FIG. 22A, providing another user interface—identified as the user interface 2204k—that can be presented to the borrower. In this example, an aggregation of data obtained from multiple remote data sources and distributed to or accessible to one or more third parties (e.g., financial institutions) can be summarized or detailed. For example, the aggregation of data can show include transaction data 2240 that details for the borrower the granularity of data exposed to and/or distributed to third parties. If the borrower determines that the data should no longer be shared, the borrower can revoke access to the displayed data by selecting the button 2242.

In still further examples, such as shown in FIG. 22L, a borrower may be able to select and/or de-select individual accounts from individual institutions. In the user interface 2204l, three institutions are shown (e.g., the institutions 2244, 2246, and 2248). In this example, the borrower can select one or more accounts to disclose and/or to permit access to.

It will be appreciated that the foregoing embodiment(s) and example(s) described above, and the various alternatives thereof and variations thereto are presented, generally, for purposes of explanation, and to facilitate an understanding of various configurations and uses of a system, such as described herein. As such, it will be apparent to one skilled in the art that some of the specific details presented herein may not be required in order to practice a particular described embodiment, or an equivalent thereof.

Figure 23:
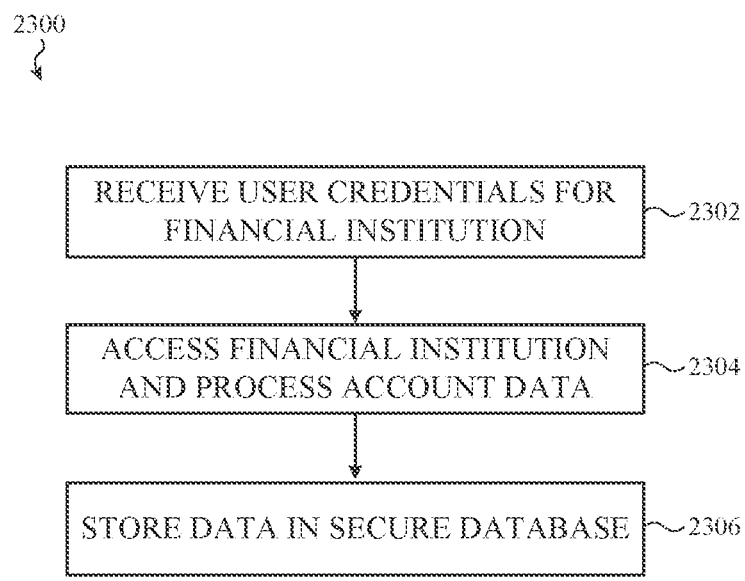
FIG. 23 is a simplified flowchart depicting example operations of a method of accessing financial records stored by a selected banking or financial institution.
Figure 24:
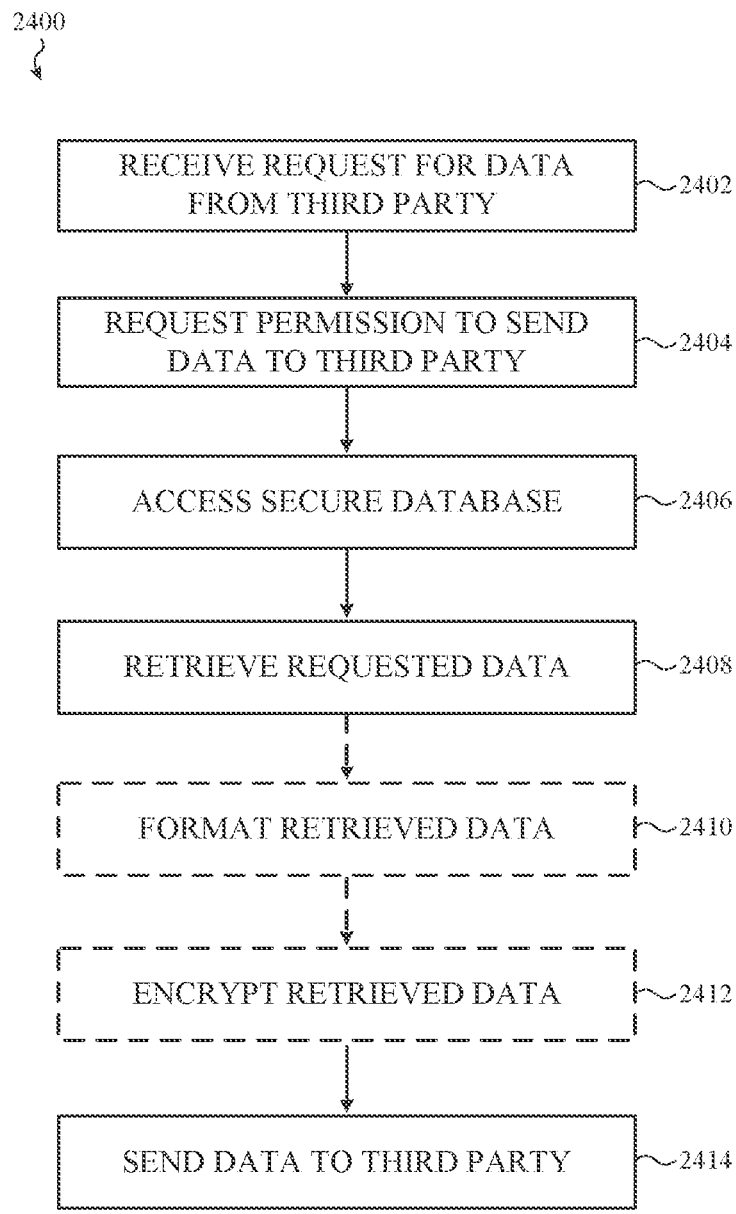
FIG. 24 is a simplified flowchart depicting example operations of a method of securely routing curated financial data to a third-party.
Figure 25:
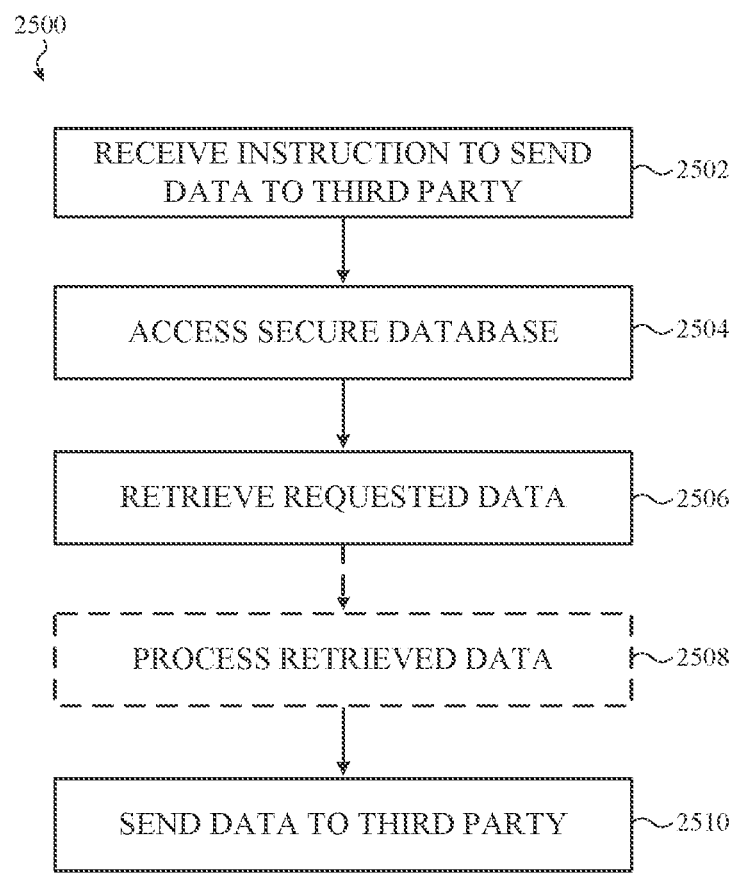
FIG. 25 is a simplified flowchart depicting example operations of another method of securely routing curated financial data to a third-party.

Generally and broadly, FIGS. 23-25 relate to methods of operating data management platform and/or communicating across a network architecture such as described herein.

In particular, FIG. 23 is a simplified flowchart depicting example operations of a method of accessing financial records stored by a selected banking or financial institution. The method 2300 can be implemented in whole or in part by a data management platform such as described herein. As with other embodiments described herein, the method 2300 references aggregation of private financial data, however, it may be appreciated that the method and its various operations can be equivalently applied to aggregation of other types of private and/or data including, but not limited to: public utility data (e.g., utility bill payment history, water bill payment history, and so on); service provider data (e.g., television service provider payment history, internet service provider payment history, mobile phone service provider payment history, and so on); health data; real property ownership data; and so on.

The method 2300 includes operation 2302 in which user credentials for a financial institution are received. In many cases, the credentials are received from a user device in communication with an application interface instantiated by the data management platform, such as described above in reference to FIGS. 20, 21A, and 21B and 22B. The method 2300 also includes operation 2304 in which financial institution data is accessed using the credentials. After the data is accessed, the data can be processed (e.g., formatting, validating, and so on). The method 2300 also includes operation 2306 in which the data processed in operation 2304 is stored in a secure database.

In many embodiments, the method 2300 is repeated periodically, automatically, or on-demand for multiple different institutions. In this manner, up-to-date aggregate financial data can be stored in a single, accessible database.

FIG. 24 is a simplified flowchart depicting example operations of a method of securely routing curated financial data to a third-party. The method 2400 can be implemented in whole or in part by a data management platform such as described herein.

The method 2400 includes operation 2402 in which a request for data from a third-party, such as a lender, is received. In some cases, the request for data can include one or more certificates and/or pieces of information that verify the identity of the third-party. In many cases, the request for data typically includes, without limitation: a name or other identifier to identify the subject of the request (e.g., name, social security number, license number, and so on) and an identification of data requested.

Once the request is received, the method 2400 advances to operation 2404 in which a request for permission to distribute the requested data to the third-party. The request for permission to distribute is sent to a device in control of the subject of the request. As noted with respect to the embodiments described herein, in some examples, the request can be modified by the subject of the request.

Upon receiving permission to distribute, route, and/or disclose the requested data to the third-party from the subject, the method 2400 advances to operation 2406 in which a secure data is accessed. Thereafter, at operation 2408, the requested information can be retrieved from the database. Next, optionally at operations 2410 and 2412, the retrieved data can be formatted and/or encrypted. Finally, at operation 2414, the (optionally formatted and encrypted) retrieved data can be distributed and/or otherwise disclosed to the third-party at operation 2414.

FIG. 25 is a simplified flowchart depicting example operations of another method of securely routing curated financial data to a third-party. As with other methods described herein, the method 2500 can be implemented in whole or in part by a data management platform such as described herein.

The method 2500 includes operation 2502 in which an instruction to distribute/disclose data to a third-party is received. Next at operation 2504, a secure database is accessed and, at operation 2506, the requested data is retrieved. Optionally, at operation 2508, the retrieved data can be processed, such as by formatting, validation, redaction, and so on. Finally, at operation 2510, the processed data can be sent to the third-party instructed in operation 2502.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein—including private financial data—will preferably comply with published and industry-established privacy, data, and network security policies and practices. For example, it is understood that data and/or information obtained from remote or local data sources—only on informed consent of the subject of that data and/or information—should be accessed aggregated only for legitimate, agreed-upon, and reasonable uses.

Machines

In addition, the systems and methods of the embodiment and variations thereof can be embodied and/or implemented at least in part as a machine configured to receive a computer-readable medium storing computer-readable instructions. The instructions are preferably executed by computer-executable components preferably integrated with the financial application programming interface platform. The computer-readable medium can be stored on any suitable computer-readable media such as RAMs, ROMs, flash memory, EEPROMs, optical devices (CD or DVD), hard drives, floppy drives, or any suitable device. The computer-executable component can be a general or application specific processor, but any suitable dedicated hardware or hardware/firmware combination device can alternatively or additionally execute the instructions.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes that come within the meaning and range of equivalency of the claims are to be embraced within their scope.

As a person skilled in the art will recognize from the previous detailed description and from the figures and claims, modifications and changes can be made to the embodiments of the invention without departing from the scope of this invention as defined in the following claims.

We claim:

1. A method for managing secure access to user account data comprising:
    generating a financial report based on account information associated with one or more user accounts, each user account being associated with one or more institutions, where the account information includes financial information;
    receiving a financial report request for a financial report of the user account, wherein the financial report request is identified as being received from a first third-party system;
    generating an audit report token associated with the financial report;
    sharing the audit report token with the first third-party system in response to the financial report request;
    providing the first third-party system account access to the financial report through the report token, where the audit report token can be shared with a second third-party system and provided by the second third-party system in order to confirm authorization to the report and integrity of the report;
    evaluating platform interactions of the second third-party system; and
    automatically regulating access by the second third-party system and selectively permitting or denying access, based on analysis of the platform interactions of the second third-party system.

2. The method of claim 1, wherein the financial report presents transaction data and account balance of a financial user over a designated and fixed time period.

3. The method of claim 1, wherein providing the first third-party system account access to the financial report through the audit report token comprises receiving an access request from the first third-party system and returning the financial report to the first third-party system.

4. The method of claim 3, wherein the access request specifies a media format; and wherein returning the financial report to the first third-party system comprises returning the financial report to the first third-party system in the media format.

5. The method of claim 1, wherein providing the first third-party system access to the financial report through the audit report token comprise receiving an access request accompanied with the audit report token and presenting a financial report access user interface.

6. The method of claim 1, wherein generating a financial report comprises receiving financial account credentials from a user client, authenticating with a financial institution using the financial account credentials and obtaining financial data from the financial institution, and compiling the financial record from at least the financial data.

7. The method of claim 6, the financial report presents transaction data and account balance of a financial user over a designated and fixed time period, and wherein authenticating with a financial institution using the financial account credentials and obtaining financial data from the financial institution comprises:
    authenticating with the financial institution with a virtualized instance of a mobile device application,
    requesting, by the virtualized instance of the mobile device application and via a non-public API of the financial institution, the transaction data and account balance associated with the user account at the financial institution, and
    receiving the transaction data and account balance associated with the user from the external computing device of the external institution.

8. The method of claim 6, wherein compiling the financial record comprises processing the financial data and providing a financial analysis summary metric in the financial report.

9. The method of claim 1, further comprising receiving access permissions through a management user interface and permitting access to the financial report in accordance with the access permissions.

10. The method of claim 9, wherein receiving access permissions through the management user interface and permitting access to the financial report in accordance with the access permissions is comprised of notifying a user through the management user interface of a new access request, receiving user input to the new access request, and permitting the access request in accordance with the user input.

11. The method of claim 1, further comprising receiving an audit report token request from the first third-party system for the second third-party system, the audit report token request specifying an identifier of the second third-party system; creating the secondary audit report token in association with an identifier of the second third-party, and communicating the secondary audit report token to the first third-party system; and providing a second third-party system access to the financial report through the audit report token.

12. The method of claim 1, further comprising providing access history of the financial report within a management user interface to a user account.

13. The method of claim 1, wherein the financial report comprises data of a financial user account obtained from a financial institution server; wherein the financial report comprises a listing of financial transactions and balance information.

14. The method of claim 13, wherein the first third-party system is a first loan management system and the second third-party system is a second loan management system.

15. The method of claim 13, wherein the first third-party system is a first loan management system and the second third-party system is computing system of an auditor.

16. The method of claim 1, further comprising receiving an update request in association with the financial report; and, in response to the update request, creating an updated financial report updated based on new financial data and the original financial report request; sharing an updated report token for the updated financial report.

17. A system for secure access to user account data comprising:
   at least one hardware processor and memory;
   a data management platform configured to:
      generate a financial report based on account information associated with one or more user accounts, each user account being associated with one or more institutions, where the account information includes financial information;
      receive a financial report request for the financial report of the user account, wherein the financial report request is identified as being received from a third-party system;
      generating an audit report token associated with the financial report;
      share the audit report token with the first third-party system in response to the financial report request;
      provide the first third-party system account access to the financial report through the report token;
      share the audit report token for the financial report with the first third-party system; and
      provide the first third-party system account access to the financial report through the report token, where the audit report token can be shared with a second third-party system and provided by the second third-party system in order to confirm authorization to the report and integrity of the report;
   a management user interface accessible by the user account configured to regulate access to the financial report; and
   a financial institution interface system configured to:
      receive financial account credentials;
      authenticate with a financial institution using the financial account credentials with a virtualized instance of a mobile device application;
      obtain financial data from the financial institution through the virtualized instance of the mobile device application; and
      compile the financial record from the financial data.

18. A non-transitory machine-readable storage medium comprising instructions that, when executed by one or more processors of a machine, cause the machine to perform operations comprising:
   generating a financial report based on account information associated with one or more user accounts, each user account being associated with one or more institutions, where the account information includes financial information;
   receiving a financial report request for the financial report of the user account, wherein the financial report request is identified as being received from a third-party system;
   generating an audit report token associated with the financial report;
   sharing the audit report token with the first third-party system in response to the financial report request;
   providing the first third-party system account access to the financial report through the report token, where the audit report token can be shared with a second third-party system and provided by the second third-party system in order to confirm authorization to the report and integrity of the report;
   evaluating platform interactions of the second third-party system; and
   automatically regulating access by the second third-party system and selectively permitting or denying access, based on analysis of the platform interactions of the second third-party system.

19. A method for managing secure access to user account data comprising:
   generating a financial report based on account information associated with one or more user accounts, each user account being associated with one or more institutions, where the account information includes financial information;
   receiving a financial report request for a financial report of the user account, wherein the financial report request is identified as being received from a first third-party system;
   generating an audit report token associated with the financial report;
   sharing the audit report token with the first third-party system in response to the financial report request;
   providing the first third-party system account access to the financial report through the report token, where the audit report token can be shared with a second third-party system and provided by the second third-party system in order to confirm authorization to the report and integrity of the report
   receiving an audit report token request from the first third-party system for the second third-party system, the audit report token request specifying an identifier of the second third-party system;
   creating the secondary audit report token in association with an identifier of the second third-party, and communicating the secondary audit report token to the first third-party system; and
   providing a second third-party system access to the financial report through the audit report token.

20. A method for managing secure access to user account data comprising:
   generating a financial report based on account information associated with one or more user accounts, each user account being associated with one or more institutions, where the account information includes financial information;

receiving a financial report request for a financial report of the user account, wherein the financial report request is identified as being received from a first third-party system;

generating an audit report token associated with the financial report;

sharing the audit report token with the first third-party system in response to the financial report request;

providing the first third-party system account access to the financial report through the report token, where the audit report token can be shared with a second third-party system and provided by the second third-party system in order to confirm authorization to the report and integrity of the report and receiving an update request in association with the financial report; and, in response to the update request, creating an updated financial report updated based on new financial data and the original financial report request; sharing an updated report token for the updated financial report.

21. A method for managing secure access to user account data comprising:

generating a financial report based on account information associated with one or more user accounts, each user account being associated with one or more institutions, where the account information includes financial information, and which comprises receiving financial account credentials from a user client, authenticating with a financial institution using the financial account credentials and obtaining financial data from the financial institution, and compiling the financial record from at least the financial data;

wherein authenticating with a financial institution using the financial account credentials and obtaining financial data from the financial institution comprises:

authenticating with the financial institution with a virtualized instance of a mobile device application, requesting, by the virtualized instance of the mobile device application and via a non-public application programming interface (API) of the financial institution, the transaction data and account balance associated with the user account at the financial institution, and receiving the transaction data and account balance associated with the user from the external computing device of the external institution;

receiving a financial report request for a financial report of the user account, wherein the financial report request is identified as being received from a first third-party system, wherein the financial report presents transaction data and account balance of a financial user over a designated and fixed time period;

generating an audit report token associated with the financial report;

sharing the audit report token with the first third-party system in response to the financial report request; and providing the first third-party system account access to the financial report through the report token, where the audit report token can be shared with a second third-party system and provided by the second third-party system in order to confirm authorization to the report and integrity of the report.

* * * * *